(12) United States Patent
Sorrentino et al.

(10) Patent No.: US 11,640,407 B2
(45) Date of Patent: May 2, 2023

(54) DRIVING APPLICATION EXPERIENCE VIA SEARCH INPUTS

(71) Applicant: salesforce.com, inc., San Francisco, CA (US)

(72) Inventors: Glenn Sorrentino, Oakland, CA (US); Justin Cosentino, Ellicott City, MD (US)

(73) Assignee: Salesforce, Inc., San Francisco, CA (US)

( * ) Notice: Subject to any disclaimer, the term of this patent is extended or adjusted under 35 U.S.C. 154(b) by 106 days.

(21) Appl. No.: 16/264,267

(22) Filed: Jan. 31, 2019

(65) Prior Publication Data

US 2020/0097469 A1 Mar. 26, 2020

Related U.S. Application Data

(60) Provisional application No. 62/735,811, filed on Sep. 24, 2018.

(51) Int. Cl.
*G06F 16/248* (2019.01)
*G06F 16/25* (2019.01)
(Continued)

(52) U.S. Cl.
CPC .......... *G06F 16/248* (2019.01); *G06F 3/0482* (2013.01); *G06F 16/2423* (2019.01);
(Continued)

(58) Field of Classification Search
CPC ...... G06F 16/248; G06F 16/25; G06F 16/252; G06F 3/0482; G06F 16/2425; G06F 16/2423; G06F 16/2471
See application file for complete search history.

(56) References Cited

U.S. PATENT DOCUMENTS 5,333,252 A 7/1994 Brewer, III et al.
5,577,188 A 11/1996 Zhu
(Continued)

FOREIGN PATENT DOCUMENTS

WO WO-2018094355 A1 * 5/2018 ......... G06F 16/9035

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.
(Continued)

*Primary Examiner* — Hosain T Alam
*Assistant Examiner* — Anthony G Gemignani
(74) *Attorney, Agent, or Firm* — Weaver Austin Villeneuve & Sampson LLP

(57) ABSTRACT

Disclosed are some implementations of systems, apparatus, methods, and computer program products for facilitating web site navigation using a search-based navigation interface of a web-based application or browser service. A plurality of sources can be searched to identify a set of items based, at least in part, on user input received via a search input interface element of the search-based navigation interface. Each item of the set of items can correspond to an object of one of a plurality of object types. A user interface object including user-selectable options can be provided for display in proximity to the search input interface element, where each item of the set of items corresponds to a different one of the user-selectable options. In response to a user selection of one of the user-selectable options corresponding to an item of the set of items, access to the corresponding object can be provided.

21 Claims, 26 Drawing Sheets

(51) Int. Cl.
  *G06F 16/2458* (2019.01)
  *G06F 16/242* (2019.01)
  *G06F 3/0482* (2013.01)
(52) U.S. Cl.
  CPC ...... *G06F 16/2425* (2019.01); *G06F 16/2471* (2019.01); *G06F 16/25* (2019.01); *G06F 16/252* (2019.01)

(56) References Cited

U.S. PATENT DOCUMENTS

| | | |
|---|---|---|
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,006,225 A | 12/1999 | Bowman et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,461,077 B1 * | 12/2008 | Greenwood .......... G06F 3/0482 |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,010,523 B2 | 8/2011 | Djabarov |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 9,256,683 B2 | 2/2016 | Richardson et al. |
| 9,865,260 B1 * | 1/2018 | Vuskovic ................ G06F 40/35 |
| 9,875,284 B1 | 1/2018 | Amacker |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |

(56) References Cited

U.S. PATENT DOCUMENTS

| | | |
|---|---|---|
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0267734 A1 | 12/2004 | Toshima |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0033999 A1 | 2/2008 | Gardner |
| 2008/0133570 A1 | 6/2008 | Allen et al. |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0153448 A1* | 6/2010 | Harpur .............. G06F 16/9535 707/779 |
| 2010/0325100 A1* | 12/2010 | Forstall .............. G06F 16/951 707/706 |
| 2011/0047120 A1 | 2/2011 | Kamvar et al. |
| 2011/0218958 A1 | 9/2011 | Warshavsky et al. |
| 2011/0247051 A1 | 10/2011 | Bulumulla et al. |
| 2012/0042218 A1 | 2/2012 | Cinarkaya et al. |
| 2012/0166427 A1 | 6/2012 | Rucker et al. |
| 2012/0233137 A1 | 9/2012 | Jakobson et al. |
| 2012/0290407 A1 | 11/2012 | Hubbard et al. |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2013/0268505 A1 | 10/2013 | Urbanski |
| 2014/0019480 A1 | 1/2014 | Rychikin |
| 2014/0171133 A1* | 6/2014 | Stuttle .............. G06F 16/90332 455/466 |
| 2014/0172562 A1 | 6/2014 | Weatherford |
| 2014/0181084 A1* | 6/2014 | Herron .............. G06F 16/2455 707/722 |
| 2014/0317092 A1 | 10/2014 | Trudeau et al. |
| 2014/0358900 A1 | 12/2014 | Payne et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0052445 A1 | 2/2015 | Villamor et al. |
| 2015/0095162 A1 | 4/2015 | Jakobson et al. |
| 2015/0127634 A1 | 5/2015 | Hong |
| 2015/0142596 A1 | 5/2015 | Jakobson et al. |
| 2015/0172563 A1 | 6/2015 | Jakobson et al. |
| 2016/0063115 A1 | 3/2016 | Ayan et al. |
| 2016/0328367 A1 | 11/2016 | Creekbaum et al. |
| 2017/0097951 A1* | 4/2017 | Nachiappan .......... G06F 16/25 |
| 2017/0371925 A1* | 12/2017 | Arya .............. G06F 16/9024 |
| 2020/0097463 A1 | 3/2020 | Cosentino et al. |
| 2020/0097469 A1 | 3/2020 | Sorrentino et al. |
| 2020/0097481 A1 | 3/2020 | Cosentino et al. |

OTHER PUBLICATIONS

U.S. Appl. No. 16/264,281, filed Jan. 31, 2019, Cosentino et al.
U.S. Appl. No. 16/264,285, filed Jan. 31, 2019, Cosentino et al.
U.S. Office Action dated Aug. 10, 2020, U.S. Appl. No. 16/264,281.
U.S. Office Action dated Sep. 3, 2020, U.S. Appl. No. 16/264,285.
U.S. Final Office Action dated Jan. 29, 2021, U.S. Appl. No. 16/264,281.
U.S. Final Office Action dated Dec. 22, 2020, U.S. Appl. No. 16/264,285.
U.S. Final Office Action dated Dec. 22, 2020 in U.S. Appl. No. 16/264,285.
U.S. Final Office Action dated Feb. 17, 2022 in U.S. Appl. No. 16/264,285.
U.S. Final Office Action dated Mar. 17, 2022, in U.S. Appl. No. 16/264,281.
U.S. Non-Final Office Action dated Aug. 19, 2021 in U.S. Appl. No. 16/264,285.
U.S. Non-Final Office Action dated Sep. 3, 2020 in U.S. Appl. No. 16/264,285.
U.S. Notice of Allowance dated Dec. 14, 2022 in U.S. Appl. No. 16/264,285.
U.S. Office Action dated Aug. 19, 2021 issued in U.S. Appl. No. 16/264,285.
U.S. Office Action dated Sep. 1, 2021 issued in U.S. Appl. No. 16/264,281.

* cited by examiner

DRIVING APPLICATION EXPERIENCE VIA SEARCH INPUTS

PRIORITY DATA

This patent document claims priority to and commonly assigned U.S. Provisional Patent Application No. 62/735,811, titled "DRIVING APPLICATION EXPERIENCE VIA SEARCH-BASED NAVIGATION INTERFACE", by Cosentino et al., filed on Sep. 24, 2018, which is hereby incorporated by reference in its entirety and for all purposes.

COPYRIGHT NOTICE

A portion of the disclosure of this patent document contains material, which is subject to copyright protection. The copyright owner has no objection to the facsimile reproduction by anyone of the patent document or the patent disclosure as it appears in the United States Patent and Trademark Office patent file or records but otherwise reserves all copyright rights whatsoever.

TECHNICAL FIELD

This patent document generally relates to systems and techniques associated with implementation of a search-based graphical user interface (GUI) in an on-demand service environment. More specifically, this patent document discloses techniques for generating and using a search-based GUI to facilitate web site navigation and provide access to objects maintained by an associated database system.

BACKGROUND

"Cloud computing" services provide shared network-based resources, applications, and information to computers and other devices upon request. In cloud computing environments, services can be provided by servers to users' computer systems via the Internet and wireless networks rather than installing software locally on users' computer systems. A user can interact with web sites such as social networking systems, email systems, and instant messaging systems, by way of example, in a cloud computing environment.

When a user interacts with a cloud computing service, the user may access a number of different web sites. Often, a web site will enable a user to navigate within the web site using click-based mechanisms such as tabs or hypertext links. Using these click-based mechanisms, a user must typically perform a number of actions to access a single web page within the web site.

BRIEF DESCRIPTION OF THE DRAWINGS

The included drawings are for illustrative purposes and serve only to provide examples of possible structures and process operations for the disclosed inventive systems, apparatus, and methods for implementing a search-based navigation interface to facilitate web site navigation. These drawings in no way limit any changes in form and detail that may be made by one skilled in the art without departing from the spirit and scope of the disclosed embodiments.

FIG. 2C shows an example of a graphical user interface (GUI) 218 generated for presentation on a display device of a client device responsive to a selection of one of the list views of FIG. 2B, in accordance with some implementations.

FIG. 2G shows an example of a graphical user interface (GUI) 246 including a search-based navigation interface generated for presentation on a display device of a client device in an on-demand database service environment, in accordance with some implementations.

DETAILED DESCRIPTION

Figure 1:
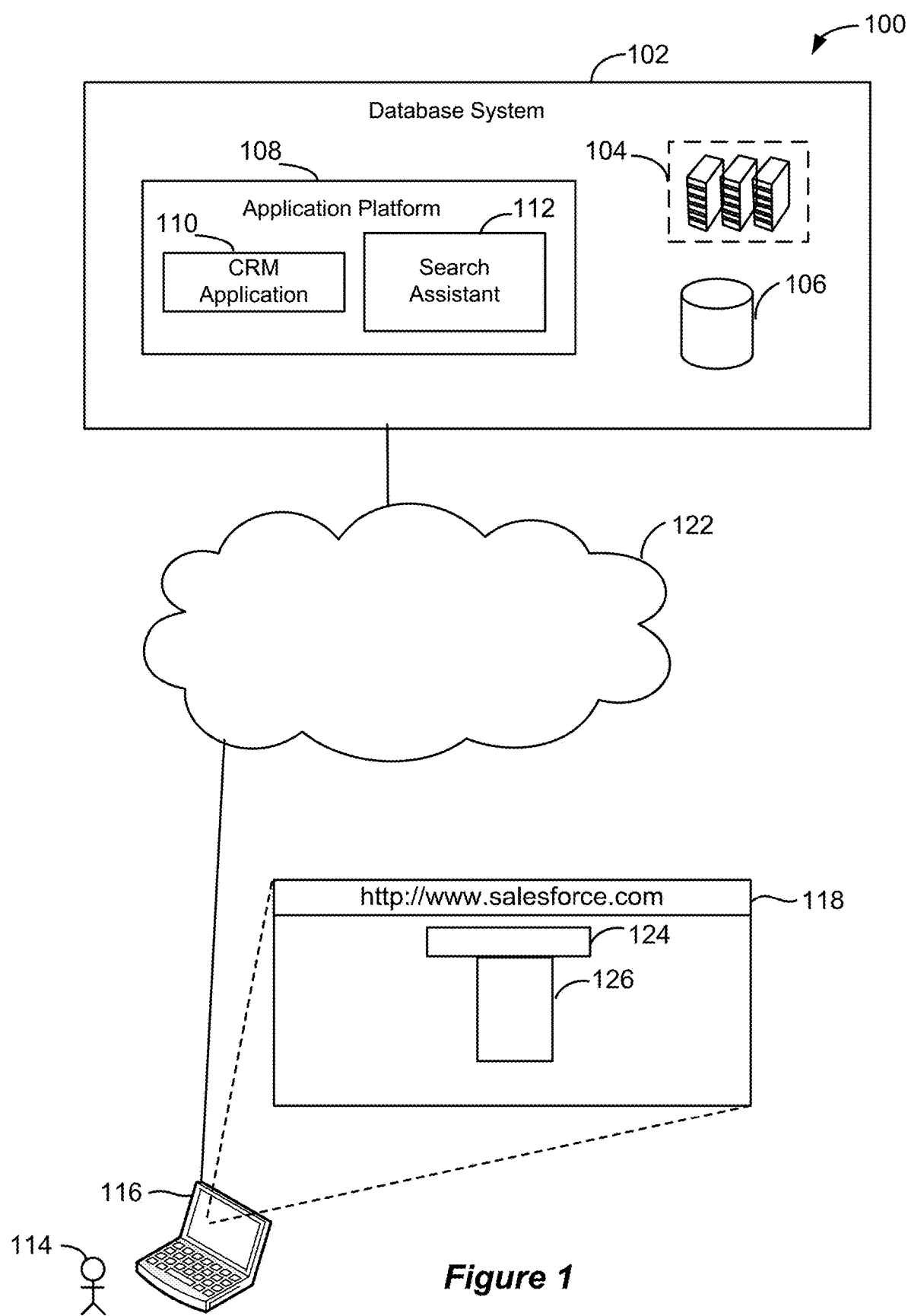
FIG. 1 shows a system diagram of an example of a system 100 in which a search assistant may be implemented, in accordance with some implementations.

Examples of systems, apparatus, methods and computer program products according to the disclosed implementations are described in this section. These examples are being provided solely to add context and aid in the understanding of the disclosed implementations. It will thus be apparent to one skilled in the art that implementations may be practiced without some or all of these specific details. In other instances, certain operations have not been described in detail to avoid unnecessarily obscuring implementations. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosed implementations, it is understood that these examples are not limiting, such that other implementations may be used and changes may be made without departing from their spirit and scope. For example, the operations of methods shown and described herein are not necessarily performed in the order indicated. It should also be understood that the methods may include more or fewer operations than are indicated. In some implementations, operations described herein as separate operations may be combined. Conversely, what may be described herein as a single operation may be implemented in multiple operations.

Various implementations described or referenced herein are directed to different methods, apparatus, systems, and computer program products for facilitating the implementation of a search-based navigation interface in an on-demand service environment. In some implementations, the disclosed methods, apparatus, systems, and computer program products may be configured or designed for use in a multi-tenant database environment.

The disclosed implementations generally relate to implementation of a search-based navigation interface. The search-based navigation interface enables a user to interact with the search-based navigation interface rather than via a click-based mechanism. The search-based navigation interface may provide items corresponding to objects available from a database system. The items may be provided in response to user input received via the search-based navigation interface. An item can represent a corresponding object. In addition, an item may include data obtained or derived from the corresponding object.

In some implementations, the database system is associated with a web site via which a search-based navigation interface is provided for display at a client device. Items presented in the search-based navigation interface may pertain to objects that can be accessed via the web site. In addition, the search-based navigation interface may also present search query suggestions that may be executed by a search engine of the database system in response to selection by a user. For example, search query suggestions may include previously submitted search queries.

In some implementations, objects may be of various object types. Example object types include, but are not limited to, an application, an action, a database record, a report pertaining to one or more database records, a visual representation of a report, a web page, a calendar entry, an article, or a file. A web page can correspond to a database record, an application, or an action. A report may include data obtained from one or more database records and/or derived from data obtained from one or more database records. A visual representation of a report can include, but is not limited to, a chart such as a bar chart, map, graph, table, or spreadsheet.

In some implementations, the search-based navigation interface includes a search input interface element within which a user may submit user input. A user may submit user input, for example, by typing one or more characters in the search input interface element, placing a cursor in the search input interface element, or submitting a search query via the search input interface element. In addition, the search-based navigation interface may provide a user interface object in proximity to the search input interface element, where the user interface object includes items identified or generated by the database system. The user interface object including such items may be provided responsive to user input received via the search input interface element or in the absence of such user input.

In some implementations, the user interface object of the search-based navigation interface provides user-selectable options corresponding to suggestions identified by the database system. A suggestion may include an item corresponding to an object available from the database system. In response to selection of one of the user-selectable options, a user may access or interact with the corresponding object or information associated therewith. In some implementations, data that is obtained from, derived from, or related to the object is provided via the search-based navigation interface in response to the selection. In this manner, a user may access objects or associated information directly from the user interface object.

In some implementations, the search-based navigation interface may simultaneously present items corresponding to objects of different object types. More particularly, the user interface object of the search-based navigation interface may include multiple sections, where each of the sections corresponds to items of a different object type. The sections may be explicitly delineated or defined by another visual indicator. Alternatively, the sections may be implicit and correspond to grouping of items based upon the corresponding object type.

In some implementations, the search-based navigation interface provides items within the user interface object of the search-based navigation interface in the form of a list or column. Each item may correspond to a different row. A row may further include one or more additional columns that include information obtained from, derived from, or related to the corresponding item. For a row having two or more columns, a successive column may be accessed by a user through user-interaction with a previous column. In some implementations, a user may access a column by submitting keyboard input such as a tab.

In some implementations, items are provided within the context of an organization of users of a database system. More particularly, the database system may perform a query against sources that store objects that can be accessed by users within the organization. The sources that are queried may include sources that are internal to the database system. In some instances, the sources, objects or a portion thereof may be accessed only by users within the organization or selected users within the organization that have access rights to the database system, sources, or objects. In addition, the database system may also query sources or objects that can be accessed by users outside the organization. Sources and objects queried can also include sources or objects that are external to the database system.

In some implementations, the database system may obtain items by performing a query against sources based, at least in part, on an organizational filter to identify items that are relevant to the user within the context of the organization. More particularly, the organizational filter may include one or more features that are used to filter search results that are provided in the form of items. The organizational filter may apply information maintained and/or derived from a user profile to identify items that are most pertinent to the user within the context of the organization. Contextual information and/or user input may also be applied in conjunction with the organizational filter to identify the items.

In some implementations, the information maintained in a user profile can include or indicate one or more of the following: preferences of the user, a role of the user within an organization of users of the database system, a group of users within the organization of users of the database system that includes the user, a history of interaction of the user with one or more database records, a history of interaction of the user with user(s) within the organization of users of the database system, or a history of interaction of the user with one or more groups of users within the organization of users of the database system. The user profile may be updated periodically and dynamically by the database system based upon interactions of the user with other users within the organization or interactions with database records of the database system. In some implementations, the user profile may be updated by a machine learning model.

In some implementations, the database system monitors interactions of the user with other users within the organization or database records in real-time to update the user profile. An interaction of the user with another user may include an electronic mail message, an instant message, a video call, or an audio (e.g., telephone) call. An interaction with a database record may include accessing (e.g., viewing) a web page that includes data obtained or derived from a database record, editing a database record, or creating a database record.

In some implementations, the search-based navigation interface provides, in conjunction with the items, an indication of one or more assumptions or features of the organizational filter that were used by the database system to identify the items based upon a user-submitted search query. In addition, the search-based navigation interface may request confirmation from the user that the features of the organizational filter or other assumptions that were implemented during execution of the search query were correct or match the user's intentions or interests within the organization. The search-based interface may also enable the user to modify the features of the organization filter or assumptions used to obtain items for the user.

By interacting with an item provided within the search-based user interface, a user may easily navigate among web pages of a web site with minimal or no user input. In addition, a user may access or interact with various objects accessible from the web site. The disclosed methods, apparatus, and systems are further configured to render interfaces or parts of interfaces in web browser processes running on client machines.

Many web sites enable users to navigate among web pages of the web site using a click-based mechanism. For example, a user may actively select a web page by clicking on a hypertext link or a tab corresponding to the web page. For some tasks, it can take a user multiple steps to reach a desired web page. This can be time consuming for the user, as well as taxing on servers supporting the web site.

While search engines offer users the ability to submit a search for a desired item, the motivation of search engines differs from the motivation of many organizations. More particularly, search engines are typically designed to provide advertisements to maximize profit. Since search engines often provide a significant number of search results to increase the likelihood of a user viewing or clicking on an advertisement, this is opposite the goal of organizations to provide users with a desired result as efficiently as possible.

Some web sites offer users the ability to submit a search query for items offered by the web sites. In response to a search query submitted by the web site, the web site may provide results that match the user's search query. The user must then scroll through the search results that are provided. The user is not given a choice as to which search result he or she wishes to view. In addition, the search results that are provided rely upon the accuracy of the user's search query, which the user may decide to revise after determining that the search results are not relevant to the user's intended goal.

In some implementations, a search-based navigation interface enables a user to access objects maintained by a database system in association with a web site directly from the search-based navigation interface. This may be performed without using a traditional click-based navigation system. As a result, a user may access web pages and other objects with minimal time and effort. This also significantly reduces the amount of processing resources that would be consumed by the database system and client device to provide the user with resources that are most relevant and useful to the user within the context of the web site and associated organization of users.

By way of illustration, John is a sales employee within a Sales group at an organization, Salesforce, Inc. John accesses a console application via his computing device. The console application presents a user interface that includes a search input interface element via which a user may submit a search query. The user interface rendered within a browser window can include information received from a data provider (e.g., the organization).

In previous versions of the console application, the user interface included various tabs to facilitate access to information such as leads, cases, and contacts. However, this became frustrating to employees of the organization since accessing information pertaining to a database record often involved numerous keystrokes, which was a time-consuming and tedious process.

John places the cursor in the search input interface element and begins typing. Upon entering the character "X," a set of items including a list of suggestions is rendered via a user interface object that is presented in proximity to the search input interface element. More particularly, the list of suggestions includes the lead "XYZ" and a contact of XYZ with which John has recently interacted, Jane.

John hovers over the suggested contact within the list of suggestions to select the suggested contact, Jane. Contact information for Jane is then rendered adjacent to the selected contact within the user interface object. The contact information that is rendered includes a phone number and electronic mail (email) address of Jane. John calls Jane to follow up on a recent discussion.

After John's call with Jane, John types "A" in the search input interface element. Upon entering the character "A," a list of user-selectable suggestions is rendered via a user interface object that is presented in proximity to the search input interface element. Since John has previously accessed the lead "ABC" via the console application, the list of suggestions includes the lead "ABC." In addition, the list of suggestions includes the name of a team member, Alice, with whom John often interacts via email. John hovers over the name of the team member, Alice. Contact information for Alice is then rendered adjacent to the selected contact within the user interface object. The contact information that is rendered includes a phone number and an email address of Alice. Since Alice has not responded to John's most recent email, John decides to call Alice using the contact information provided for Alice.

After speaking with Alice, John receives a video call pertaining to a product issue. John enters the character "/" in the search input interface element and a list of user-selectable actions that are available are rendered in proximity to the search input interface element. Since John was recently on a video call with an existing customer, the list of actions includes a "Create New Case" option. John selects the action "Create New Case" and a web page including a new case form is provided. John completes the new case form with information he received during the video call. The new case form identifies the product issue discussed during the video call, enabling John to follow up on the issue at a later time.

FIG. 1 shows a system diagram of an example of a system 100 in which a search assistant may be implemented, in accordance with some implementations. In FIG. 1, a tenant database system 102 associated with an organization includes any number of computing devices such as servers 104. The servers 104 are in communication with one or more storage mediums 106 configured to store and maintain relevant metadata used to perform some of the techniques disclosed herein, as well as to store and maintain relevant data and/or metadata generated by the techniques disclosed herein. In this example, storage mediums 106 include tenant data storage configured to store and maintain tenant data generated by or otherwise maintained by tenants of tenant database system 102. Tenant data can include, for example, database records corresponding to clients, accounts, contacts, orders, cases, leads, opportunities, etc. In addition, storage mediums 106 can include web pages and associated metadata such as corresponding Uniform Resource Locators (URLs). Storage mediums 106 can also store objects such as those described in, which may be accessed as described in further detail below. In some implementations, storage mediums 106 can include a user history database that stores records pertaining to user interactions of users with database system 102, user interactions of users with objects maintained by database system 102, and/or user interactions with other users of database system.

In some implementations, storage mediums 106 can include user profiles associated with users (and corresponding user accounts) of database system 102. Information maintained in a user profile of a user can include or indicate one or more of the following: preferences of the user, a role of the user within an organization of users of the database system, a group of users within the organization of users of the database system that includes the user, a history of interaction of the user with one or more database records, ownership of one or more database records, a history of interaction of the user with user(s) within the organization of users of the database system, or a history of interaction of the user with one or more groups of users within the organization of users of the database system. Ownership of a database record can indicate, for example, creation of the database record, responsibility for the database record, and/or having exclusive rights to edit the database record.

In some implementations, the information maintained in a user profile may include personal information for an individual. The personal information can indicate characteristics of the individual. The characteristics may be explicitly specified by the individual and/or may be implicitly derived based upon behavior of the individual. For example, characteristics of the individual may include an age, gender, marital status, height, weight, hair color, level of education, political affiliation, online purchase history, and/or personality characteristics. The personal information can also indicate the individual's home address, work address, and/or contact information. For example, contact information can include a phone number and/or an electronic mail (email) address.

A user profile of a given user may be updated periodically and dynamically by the database system based upon interactions of the user with other users within the organization, interactions with database records of the database system, or interactions with the web site. The user profile may also be updated in response to a user-initiated update to the user profile. In some implementations, the user profile may be updated by a machine learning model.

Database system 102 also includes application platform 108. Application platform 108 of tenant database system 102 may be a framework that allows applications of the tenant database system 102 to run. For example, application platform 108 may include hardware and/or software, e.g., the operating system. In some implementations, application platform 108 supports the creation, managing and executing of one or more applications.

In this example, application platform 108 is configured to support the execution of an application such as a console application. Console application can include a customer relationship management (CRM) application 110 that enables client devices to access database records maintained in storage mediums 106. CRM application 110 is configured to respond to requests from client devices by providing web pages that can be downloaded by client devices. In addition, application platform 108 is configured to support the execution of a Search Assistant 112 that enables client devices to navigate within a web site of the organization using a search-based navigation interface, as described herein. Servers 104 may be configured to execute Search Assistant 112. Servers 104 may also be configured to access data and/or metadata stored in storage mediums 106, external services offered by servers external to database system 102, and/or data maintained in storage mediums outside database system 102.

Storage mediums 106 may further store computer-readable instructions configured to perform some of the techniques described herein. In addition, the storage mediums 106 may store metadata, data, or other information received and/or generated by a tenant as described herein.

In some implementations, tenant database system 102 is also configured to store privilege information identifying or specifying access rights and restrictions of users according to various attributes such as a specified user ID, type of user, role of a user, a community or group to which the user belongs, and/or a particular organization on behalf of which a community is maintained. Each of the communities may be operated on behalf of an organization. Each organization may have associated therewith one or more tenants, which may each be associated with one or more communities.

The servers 104 may be associated with a network domain, such as www.salesforce.com and may be controlled by a data provider associated with the network domain. A user of client computing device 116 can have an account at salesforce.com®. By logging into this account, the user can access the various services provided by servers 104.

In the following examples, it is assumed that a user 114 accessing CRM application 110 and Search Assistant 112 via client computing device 116 has access rights to data that is maintained in tenant storage. In addition, it is assumed that the user 114 has access rights to CRM application 110. For example, in the following description, it may be assumed that user 114 has successfully logged in to CRM application 110.

During execution of CRM application 110, a web page 118 containing a search-based navigation interface generated by Search Assistant 112 may be downloaded to client computing device 116 via network 122. The search-based navigation interface can include a search input interface element 124 configured to receive user input. In addition, the search-based navigation interface can include a user interface object 126 configured to present items, as described herein. The items can be provided in response to an indication of user input received via search input interface element 124 or, alternatively, can be provided in the absence of user input received via search input interface element 124. User input can include placement of a cursor in search input interface element 124, text typed within search input interface element 124, or a search query submitted via search input interface element 124.

Upon downloading the web page 118, the web page 118 may be rendered by a web browser within a browser window of client computing device 116. A user may then interact with the Search Assistant via the search-based navigation interface, as will be described in further detail below.

The client device 116 may be in communication with the data provider via network 122. More particularly, the web browser may communicate with servers 104 via network 122. For example, network 122 can be the Internet. In another example, network 122 comprises one or more local area networks (LAN) in communication with one or more wide area networks (WAN) such as the Internet.

Embodiments described herein are often implemented in a cloud computing environment, in which the data network 108, servers 104, and possible additional apparatus and systems such as multi-tenant databases may all be considered part of the "cloud."

As will be described in further detail below, a console application may present a search-based navigation interface that includes a user interface element configured to receive user input, as well as a user interface object via which user-selectable items may be rendered. User-selectable items can correspond to various categories or sub-categories of data (e.g., accounts, leads, opportunities, cases, and/or contacts), objects categorized within various categories or subcategories, or information obtained or derived from objects. Example objects include, but are not limited to, database records applications or actions.

In some implementations, the console application also provides a click-based mechanism such as tabs that facilitate access to information pertaining to categories and/or sub-categories of data. In other implementations, the console application does not provide a click-based mechanism for accessing information or navigating within the corresponding web site.

The search-based navigation interface rendered within a browser window can include information received from a data provider (e.g., the organization). For example, the information can be presented via a user interface object of the search-based navigation interface. Examples of a search-based navigation interface that may be presented will be described in further detail below.

A search-based navigation interface may be generated based upon various factors. Such factors may include user input such as a search query, as will be described in further detail below with reference to FIGS. 2A-2F.

Figure 2A:
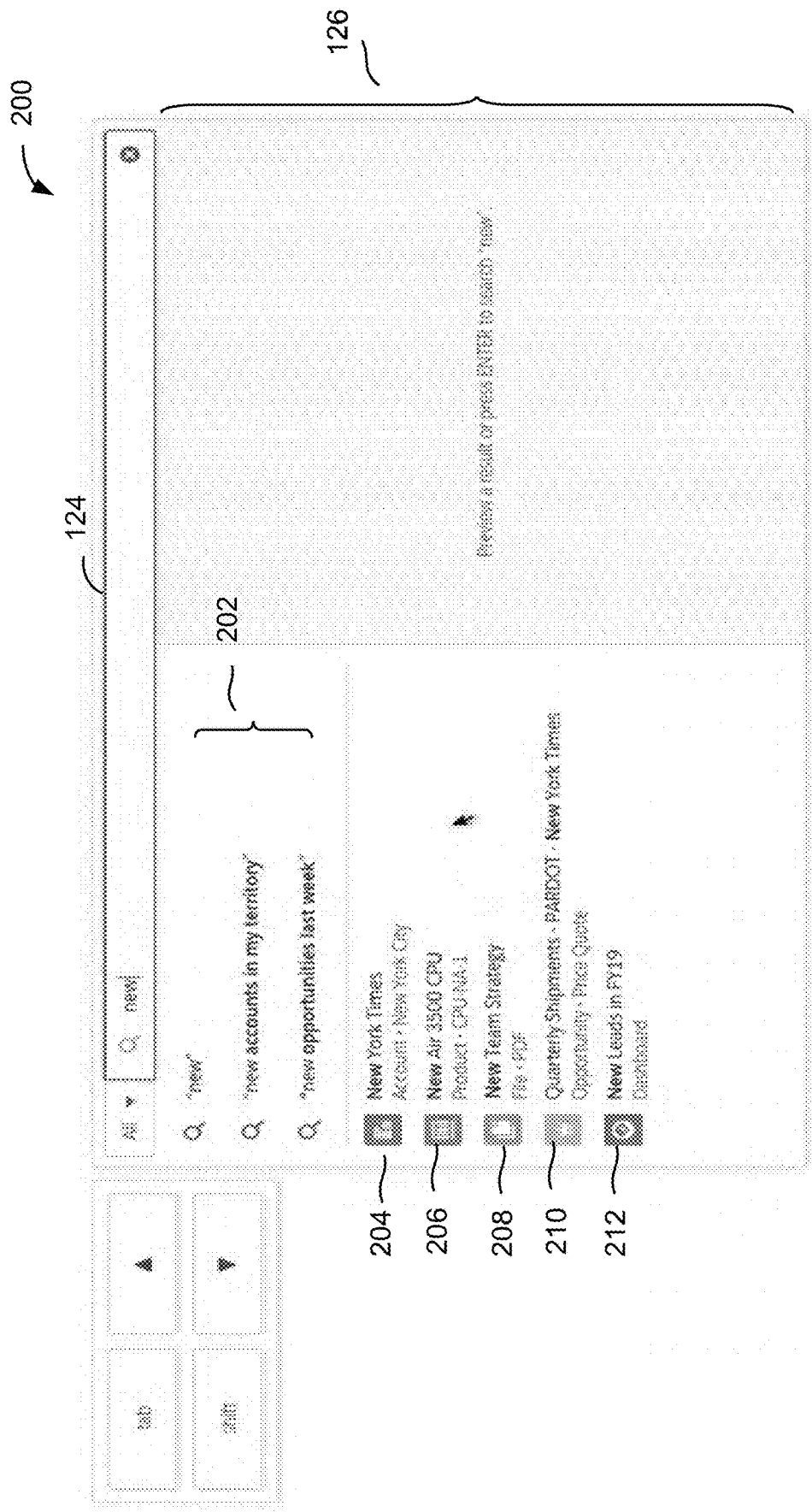
FIG. 2A shows an example of a graphical user interface (GUI) 200 including a search-based navigation interface generated for presentation on a display device of a client device in an on-demand database service environment, in accordance with some implementations.

FIG. 2A shows an example of a graphical user interface (GUI) 200 including a search-based navigation interface generated for presentation on a display device of a client device in an on-demand database service environment, in accordance with some implementations. As described above, GUI 200 may include search input interface element 124. In this example, a user types the word "new" in search input interface element 124. A search assistant identifies search results pertaining to the user's input and provides results in user interface object 126, which is rendered in proximity to search input interface element 124. In this example, the search assistant interprets the user input "new" within the context of the user's profile, which indicates that the user works in the Sales team and is owner of the New York Times Account.

In this example, user interface object 126 includes user-selectable options, where each of the user-selectable options corresponds to a different one of the search results. The user-selectable options may also be referred to as suggestions. In some instances, the user-selectable options include suggested search queries (i.e., query suggestions) 202, which may also be referred to as query suggestions. In addition, the user-selectable options include user-selectable options 204-212, where each of user-selectable options 204-212 corresponds to a different one of a set of items. Each of the items in the set of items may correspond to an object of a corresponding one of a plurality of object types. In this example, each of user-selectable options 204-212 corresponds to a different object type. More particularly, user-selectable option 204 represents an account database record for the New York Times account, user-selectable option 206 represents a product database record for the product New Air 3500, user-selectable option 208 represents a file entitled "New Team Strategy," user-selectable option 210 represents a price quote for an opportunity pertaining to the New York Times account, and user-selectable option 212 represents a dashboard for New Leads. Thus, an object type may include a database record or a particular type of database record. Thus, the object types of items corresponding to user-selectable options 204-212 include an account database record, a product database record, a file, an opportunity database record, and a dashboard. As shown in FIG. 2A, user-selectable options including query suggestions 202 and items 204-212 are presented in the form of one or more vertical lists. However, this example is merely illustrative and user-selectable options may be presented in another format.

For a given item, the corresponding object type may be indicated by a corresponding text and/or visual indicator. For example, a particular object type may be designated by a particular icon or color.

In FIG. 2A, user-selectable options that are presented are customized for the user based, at least in part, on the user input and user profile. In some implementations, user-selectable options may include a set of "list views," where each of the list views corresponds to a list of database records or other objects, as will be described in further detail below with reference to FIGS. 2B-2C.

Figure 2B:
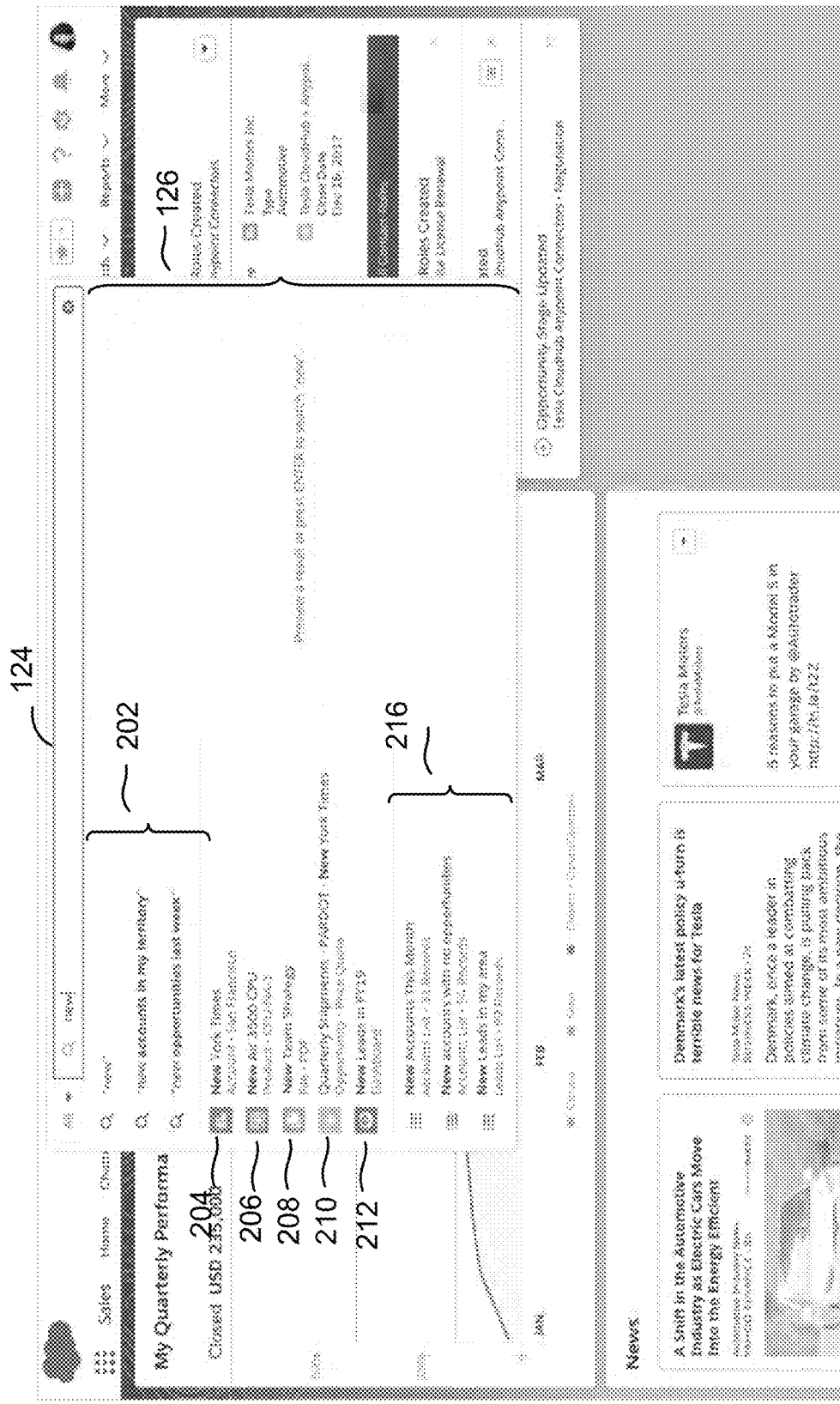
FIG. 2B shows an example of a graphical user interface (GUI) 214 including a search-based navigation interface illustrating a set of list views generated for presentation on a display device of a client device in an on-demand database service environment, in accordance with some implementations.

FIG. 2B shows an example of a graphical user interface (GUI) 214 including a search-based navigation interface illustrating a set of list views generated for presentation on a display device of a client device in an on-demand database service environment, in accordance with some implementations. As shown in FIG. 2B, user interface object 126 includes user-selectable options including a set of "list views" 216. Each of the list views may correspond to a list of database records that may be accessed by the user in response to selection of the corresponding list view. In this example, list views 216 include a first list view "New Accounts This Month," a second list view "New Accounts with No Opportunities," and a third list view "New Leads in My Area." Thus, a given list view may correspond to multiple database records.

In this example, each list view of the list views 216 corresponds to a particular data object type. More particularly, a given list view may correspond to data objects of the particular data object type that also have a corresponding set of characteristics. The set of characteristics may be indicated, at least in part, by values of one or more fields of the objects. The set of characteristics and/or object types for which lists are identified may be ascertained based, at least in part, on a user's search query, information such as that obtained from a user profile of the user navigating the web site, and/or a current context. As shown in FIG. 2B, the first list view corresponds to data objects of the object type Accounts for which the characteristics indicate that the data objects are new (e.g., generated and stored) this month. The second list view corresponds to data objects of the object type Accounts, where the set of characteristics indicate that the account identified in each data object has no associated Opportunity database records. The third list view corresponds to data objects of the object type Leads, where the set of characteristics indicate that the lead identified in each data object is a new lead in the user's area.

Figure 2C:
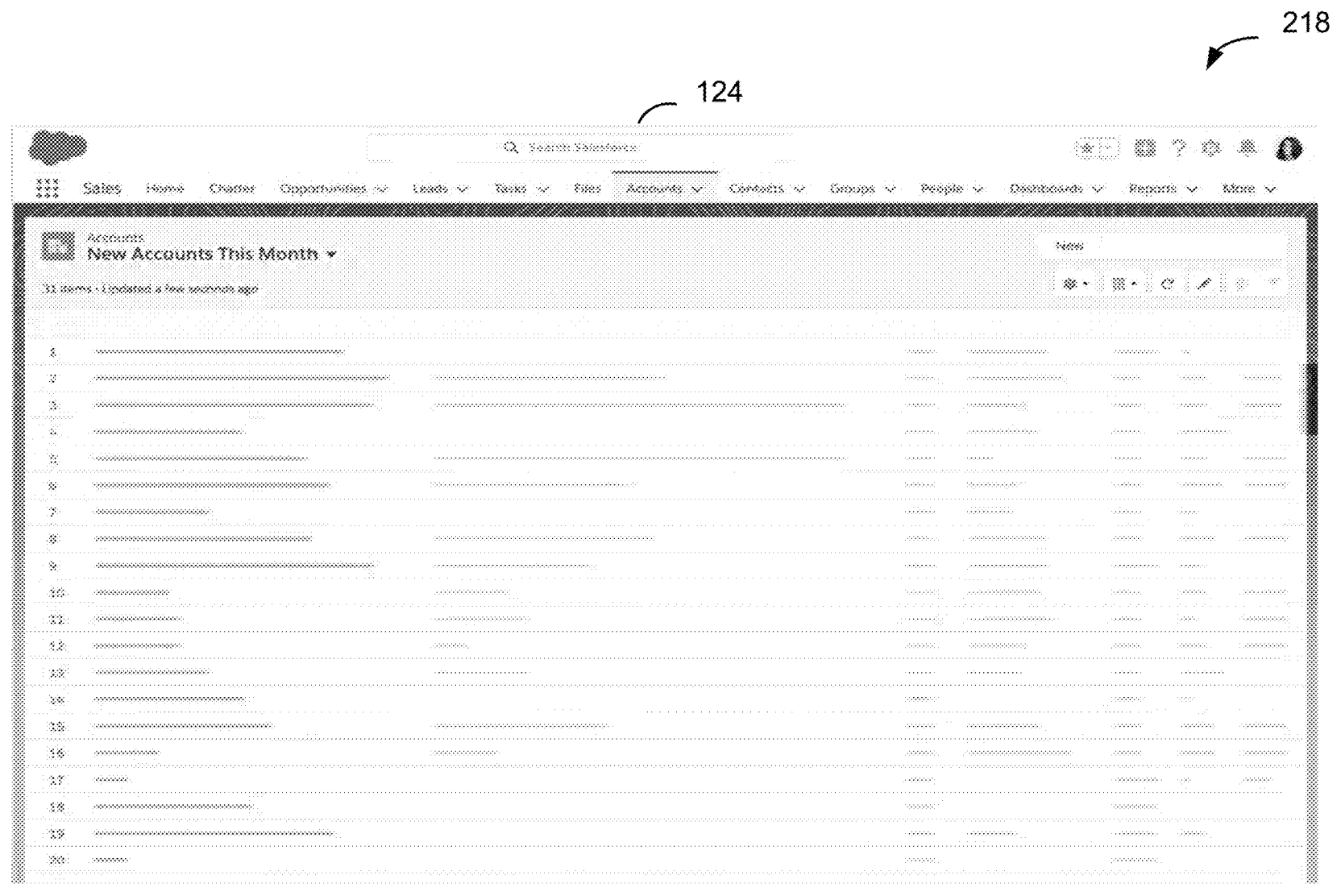

In this example, the user selects the first list view "New Accounts This Month." In response, a corresponding list of database records is presented. FIG. 2C shows an example of a graphical user interface (GUI) 218 generated for presentation on a display device of a client device responsive to a selection of one of the list views of FIG. 2B, in accordance with some implementations. As shown in FIG. 2C, a list of database records may include one or more items, where each item in the list corresponds to a different database record. More particularly, each item in the list may be represented by a corresponding row. The list of database records may also include one or more columns, where each column corresponds to a different one of a plurality of fields of the corresponding database record type. In this example, the record type of the records in the list is an Account database record. Fields of an Account database record may include, for example, a name of the Account, a contact name for the Account, a contact phone number for the Account, and/or any other pertinent information.

The system may interpret a query term such as "new" within the context of an established system dictionary and/or system rules. For example, the term "new" may be interpreted to mean recently generated or generated within the last month.

In some implementations, the database system maintains a list of database records such as "New Accounts This Month." For example, when a new Account database record is opened, it may be added to the list. At the beginning of the next month, the list may be cleared or initialized. In other implementations, the database system may generate a list of database records by querying database records in real-time in response to selection of the list. For example, a server of the database system may query Account database records to identify Account database records that were opened (e.g., generated and stored) between Sep. 1, 2018 and Sep. 30, 2018.

Figure 2D:
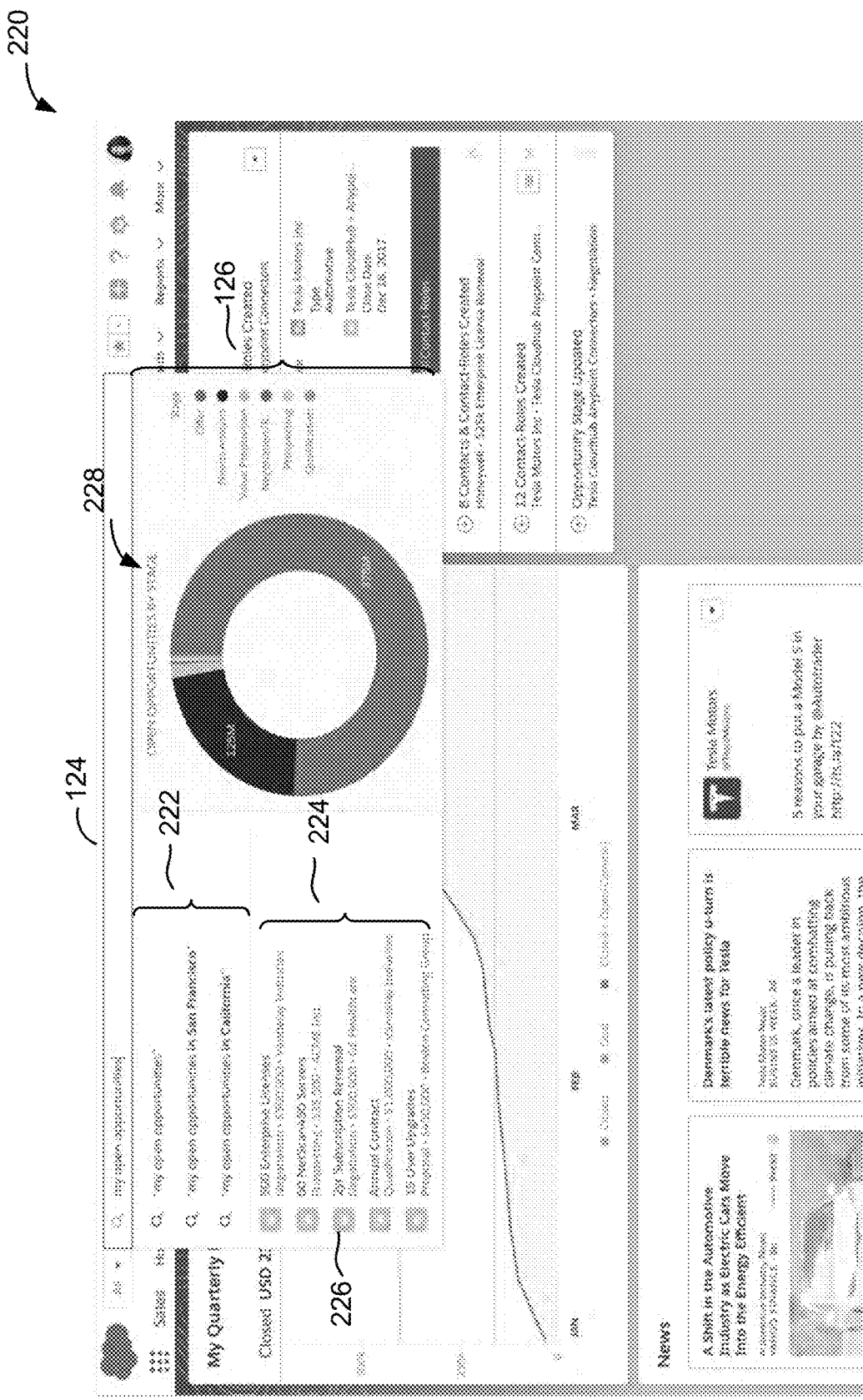
FIG. 2D shows an example of a graphical user interface (GUI) 220 including a search-based navigation interface generated for presentation on a display device of a client device in an on-demand database service environment, in accordance with some implementations.

FIG. 2D shows an example of a graphical user interface (GUI) 220 including a search-based navigation interface generated for presentation on a display device of a client device in an on-demand database service environment, in accordance with some implementations. In this example, the user types "my open opportunities" in search input interface element 124. A server of the database system obtains search results based, at least in part, on the user input and the user profile. For example, the system may identify Opportunity database records owned by the user that have a status field including the value, "open," User-selectable options corresponding to the search results are then presented in user interface object 126. More particularly, as shown in FIG. 2D, user-selectable options presented in user interface object 126 include query suggestions 222 and items 224. Each of the items 224 may correspond to an object of a particular object type. In this example, items 224 correspond to objects of the same object type, as denoted by representative icon 226. More particularly, each of items 224 corresponds to a different Opportunity database record.

Query suggestions 222 may offer alternative queries that will return relevant results for the individual user. For example, a user in the Sales team may receive similar query suggestions to other users in the Sales team, but may not see similar query suggestions to customers.

In this example, the user profile indicates that the user works in the San Francisco office. Therefore, query suggestions 222 including "my open opportunities in San Francisco" and "my open opportunities in California" are presented.

In some implementations, user interface object 126 may include a report representing search results pertaining to both the user input and user profile or, alternatively, may include a visual representation of such a report. In this example, user interface object 126 includes a chart 228 that represents open opportunities by stage.

Figure 2E:
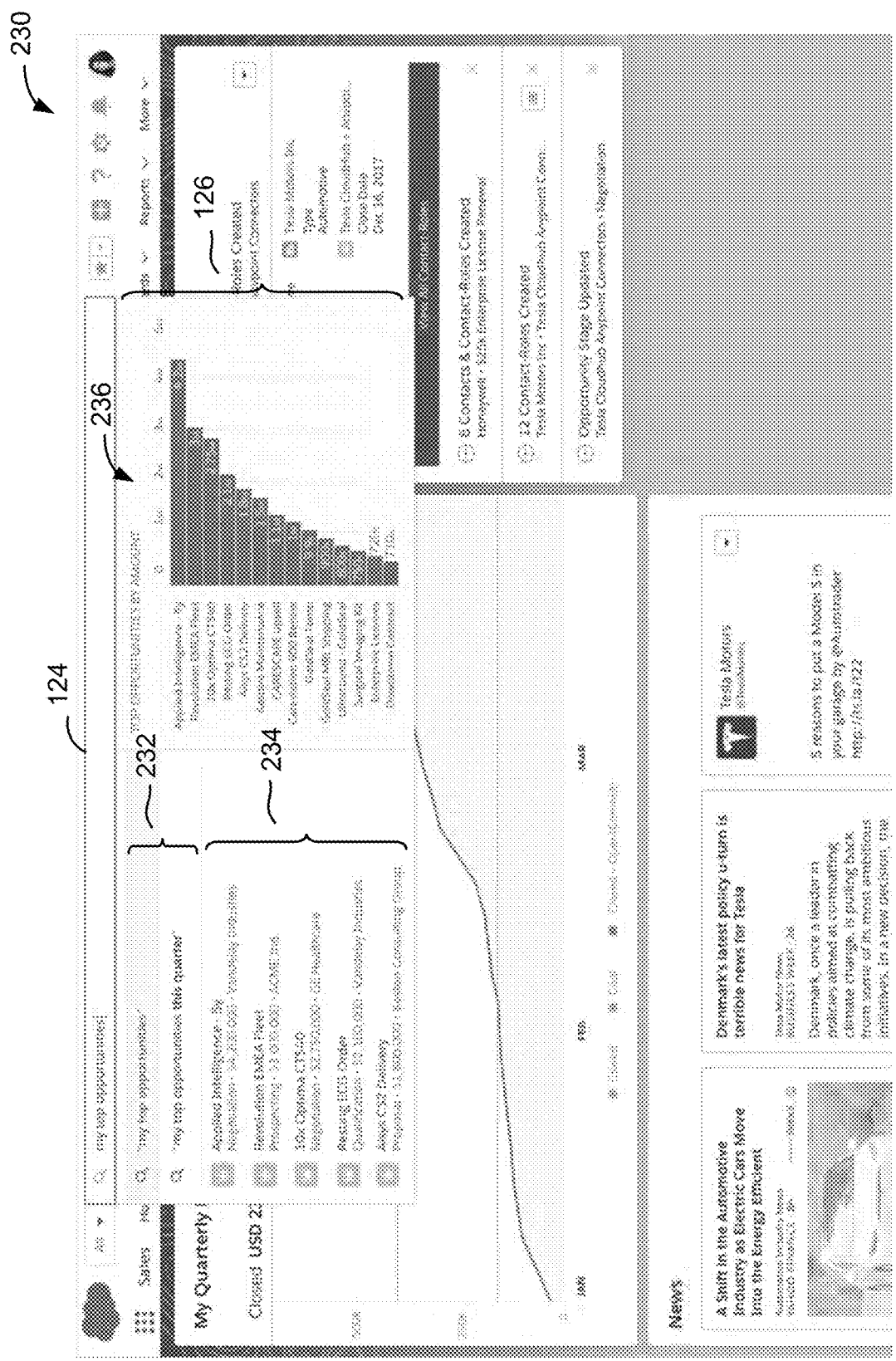
FIG. 2E shows an example of a graphical user interface (GUI) 230 including a search-based navigation interface generated for presentation on a display device of a client device in an on-demand database service environment, in accordance with some implementations.

FIG. 2E shows an example of a graphical user interface (GUI) 230 including a search-based navigation interface generated for presentation on a display device of a client device in an on-demand database service environment, in accordance with some implementations. As shown in FIG. 2E, the user has typed a search query "my top opportunities" in search input interface element 124. In response, a server of the database system obtains search results and user-selectable options corresponding to the search results are provided in user interface object 126 for display at the client device. More particularly, as shown in FIG. 2E, user-selectable options presented in user interface object 126 may include query suggestions 232 and items 234. In this example, each of items 234 corresponds to a different Opportunity database record.

As described above, a search server may obtain search results based, at least in part, on user input such as a user query and a user profile of the user. In addition, the search server may obtain the search results further based, at least in part, on a context of the search-based navigation interface. The context of the search-based navigation interface can include, for example, a web page on which the search-based navigation interface is rendered and/or information rendered within the web page. For example, the web page may display information pertaining to a particular database record. As shown in FIG. 2E, the web page on which the search-based navigation interface is rendered displays a graph entitled "My Quarterly Performance." Therefore, query suggestions 232 include query suggestion "my top opportunities this quarter."

In addition, user interface object 126 may include a visual representation of the search results or a portion thereof. In this example, visual representation 236 includes a chart representing top opportunities of the user by amount. Therefore, visual representation 236 may include information obtained or derived from fields of database records such as Opportunity database records.

Figure 2F:
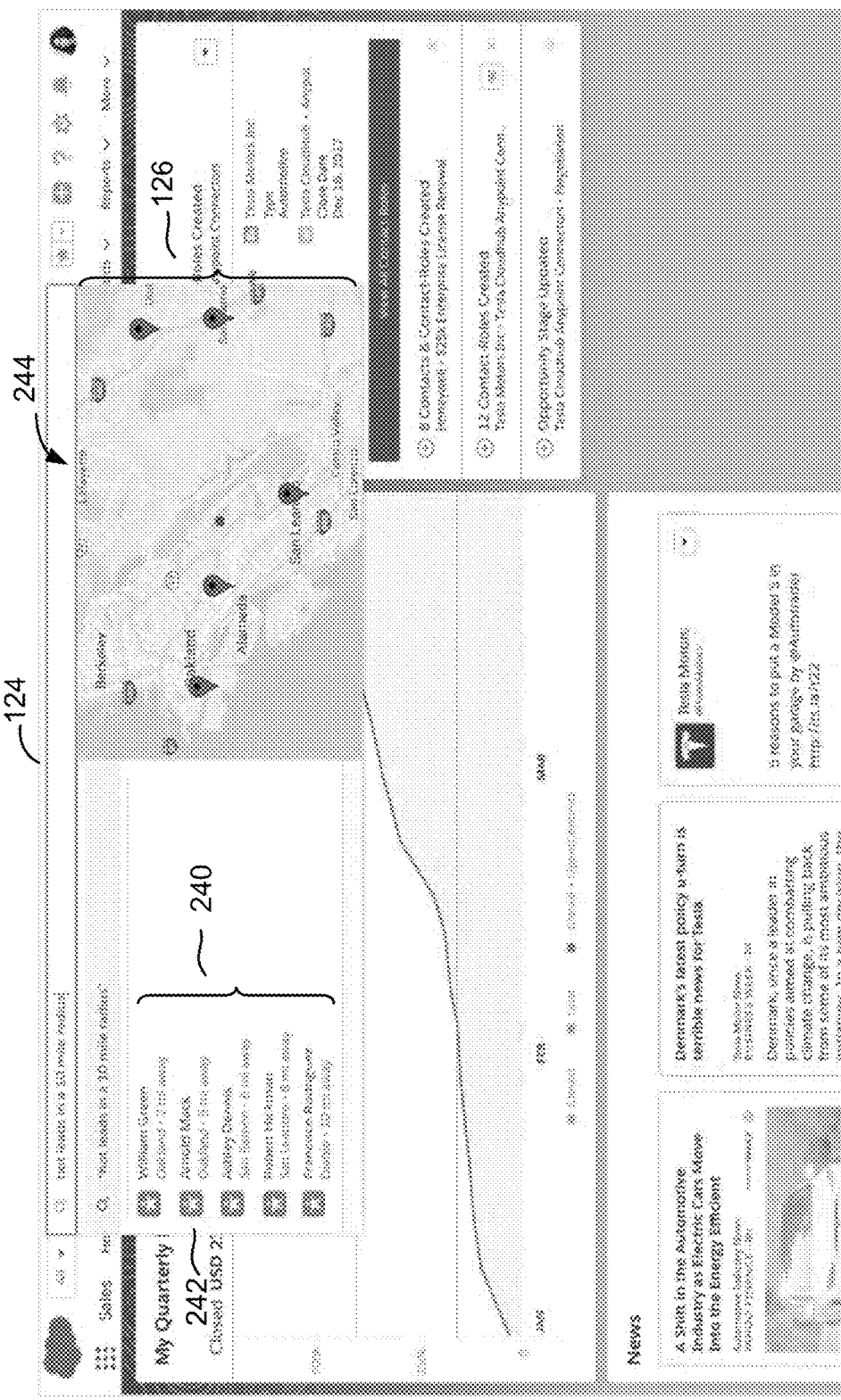
FIG. 2F shows an example of a graphical user interface (GUI) 238 including a search-based navigation interface generated for presentation on a display device of a client device in an on-demand database service environment, in accordance with some implementations.

FIG. 2F shows an example of a graphical user interface (GUI) 238 including a search-based navigation interface generated for presentation on a display device of a client device in an on-demand database service environment, in accordance with some implementations. As shown in FIG. 2F, the user has typed a search query "hot leads in a 10 mile radius" in search input interface element 124. In response, a server of the database system obtains search results and user-selectable options corresponding to the search results are provided in user interface object 126 for display at the client device. More particularly, as shown in FIG. 2F, user-selectable options presented in user interface object 126 include items 240, where each of items 240 corresponds to a different Lead database record. Thus, items 240 are of the same object type, as denoted by icons 242 presented adjacent or in close proximity to items 240.

Each of items 240 may be identified by data obtained from a field of the corresponding database record. In this example, each of items 240 is identified by a name obtained from a name field of the corresponding Lead database record.

To identify the data items 240, a search server may parse and interpret the query of the user. More particularly, the search server may interpret the term "leads" in the submitted search query to refer to an object type, "leads." Thus, the search server of the database system may interpret the intent of the natural language query of the user to refer to leads having a status of "hot" within a particular geographic area rather than a keyword search for a string. In addition, the search server may obtain the search results based, at least in part, on the user's context and/or user profile. For example, the search results may interpret the phrase "within a 10 mile radius" to refer to the user's location, which may include the user's current location, the user's home location as indicated in the user profile, and/or the user's work location as indicated in the user profile. Using this information, the search server may identify Lead database records having a status of "hot" and for which an address, identified within in an address field of the corresponding Lead database record, is within a 10 mile radius of the user's location.

Since the search server understands that the intent of the user pertains to a particular geographic area, a visual representation 244 of the search results represented by user-selectable options 240 may be presented in the form of a map. As shown in FIG. 2F, the identified "hot" leads within a 10 mile radius are represented within the map via corresponding icons.

In the examples described above, results are generated responsive to user input such as a search query. However, results may also be generated in the absence of user input, as will described in further detail below with reference to FIGS. 2G-2I.

Figure 2G:
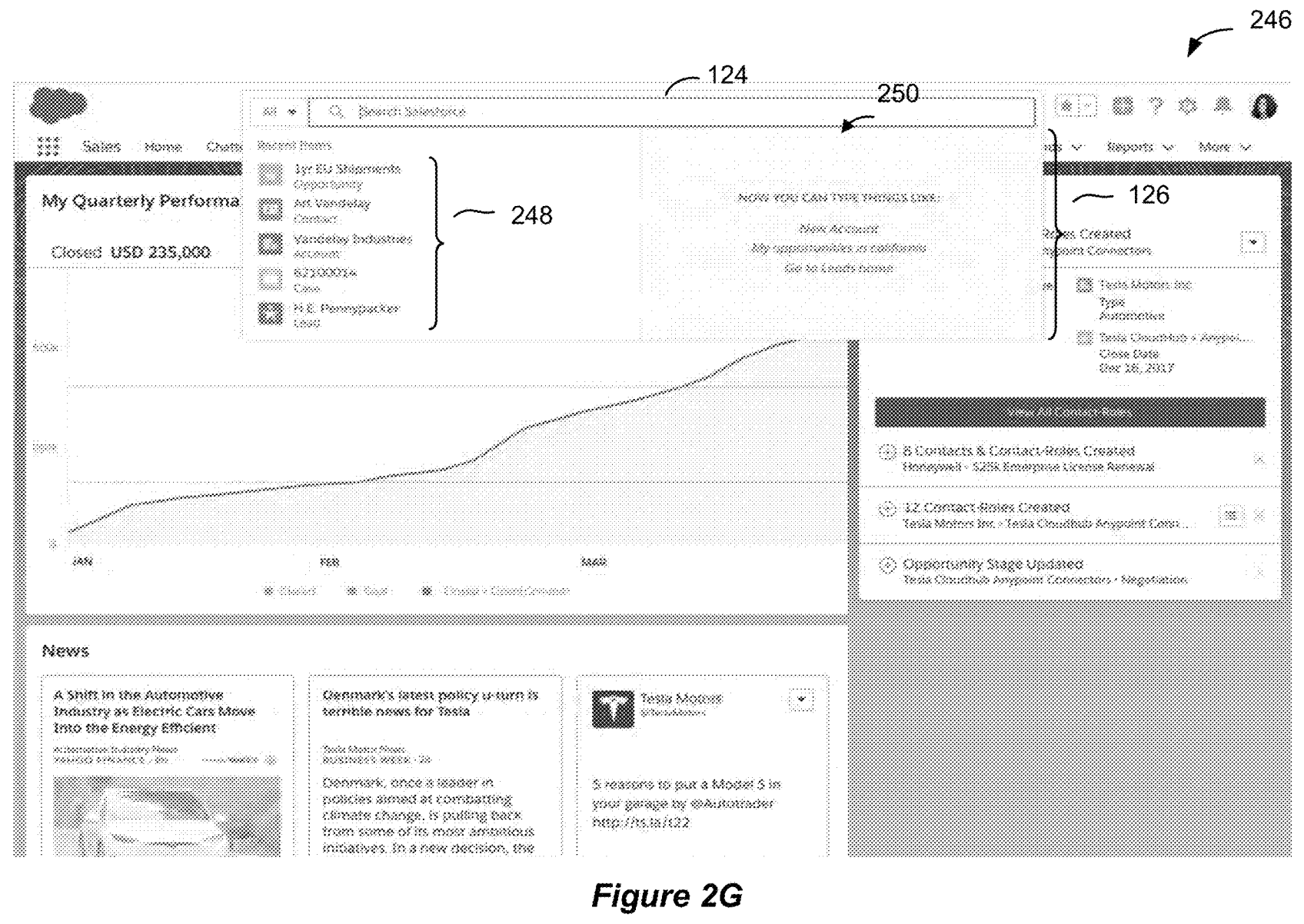

FIG. 2G shows an example of a graphical user interface (GUI) 246 including a search-based navigation interface generated for presentation on a display device of a client device in an on-demand database service environment, in accordance with some implementations. In this example, the user has not typed text in search input interface element 124. The absence of user input may also be referred to as "zero state."

In the absence of user input, suggestions may be identified based, at least in part, on the user profile. For example, the user profile may indicate historical interactions of the user with various database records, frequency of interactions with various database records, and/or recency of interactions with various database records. In this example, user-selectable options 248 presented in user interface object 126 correspond to database records that have been most recently used (MRU) (e.g., most recently accessed) by the user.

In some implementations, user interface object 126 may also include educational information 250. More particularly, educational information 250 may educate the user as to various aspects of the search-based navigation interface. Educational information can include text, an image, a link, button, and/or another user interface object. Educational information 250 can be agnostic of the user's context or actions or can pertain to the user's context or actions. For example, educational information 250 can provide tips that enable a user to execute an action, allow a user to provide search feedback, or teach a user about search features or other functionality of the search-based navigation interface. In this example, educational information 250 includes a message that informs the user of the types of search queries they may submit via search input interface element 124.

Figure 2H:
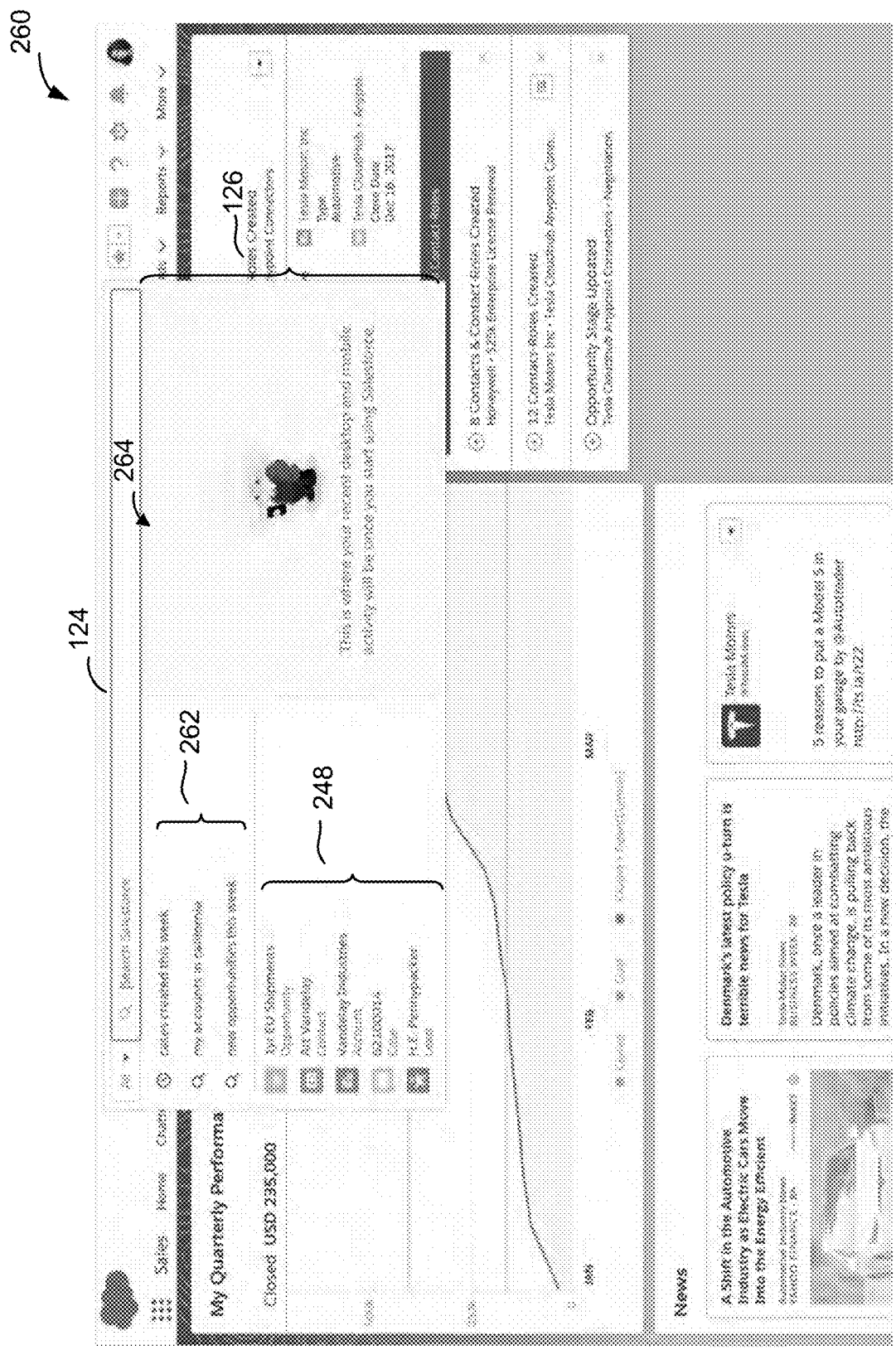
FIG. 2H shows an example of a graphical user interface (GUI) 260 including a search-based navigation interface generated for presentation on a display device of a client device in an on-demand database service environment, in accordance with some implementations.

FIG. 2H shows an example of a graphical user interface (GUI) 260 including a search-based navigation interface generated for presentation on a display device of a client device in an on-demand database service environment, in accordance with some implementations. As shown in FIG. 2H, the user has not typed text in search input interface element 124. In the absence of user input, a server of the database system obtains search results including query suggestions based, at least in part, on the user profile. In this example, the user profile indicates that the user is in the Sales team and works in California. In addition, as described above, the user profile may indicate the user's MRU database records.

User-selectable options corresponding to the search results are provided in user interface object 126 for display at the client device. More particularly, as shown in FIG. 2H, user-selectable options presented in user interface object 126 include query suggestions 262 and items 248. Query suggestions 262 reflect information maintained in the user profile. More particularly, query suggestions 262 reflect that the user is in the Sales team and works in California. For example, query suggestions 262 include "cases created this week," "my accounts in California," and "new opportunities this week."

In this example, user interface object 126 also includes educational information 264 pertaining to the search-based navigation interface. More particularly, educational information 264 notifies the user of the type of information that can be presented in user interface object 126.

Figure 2I:
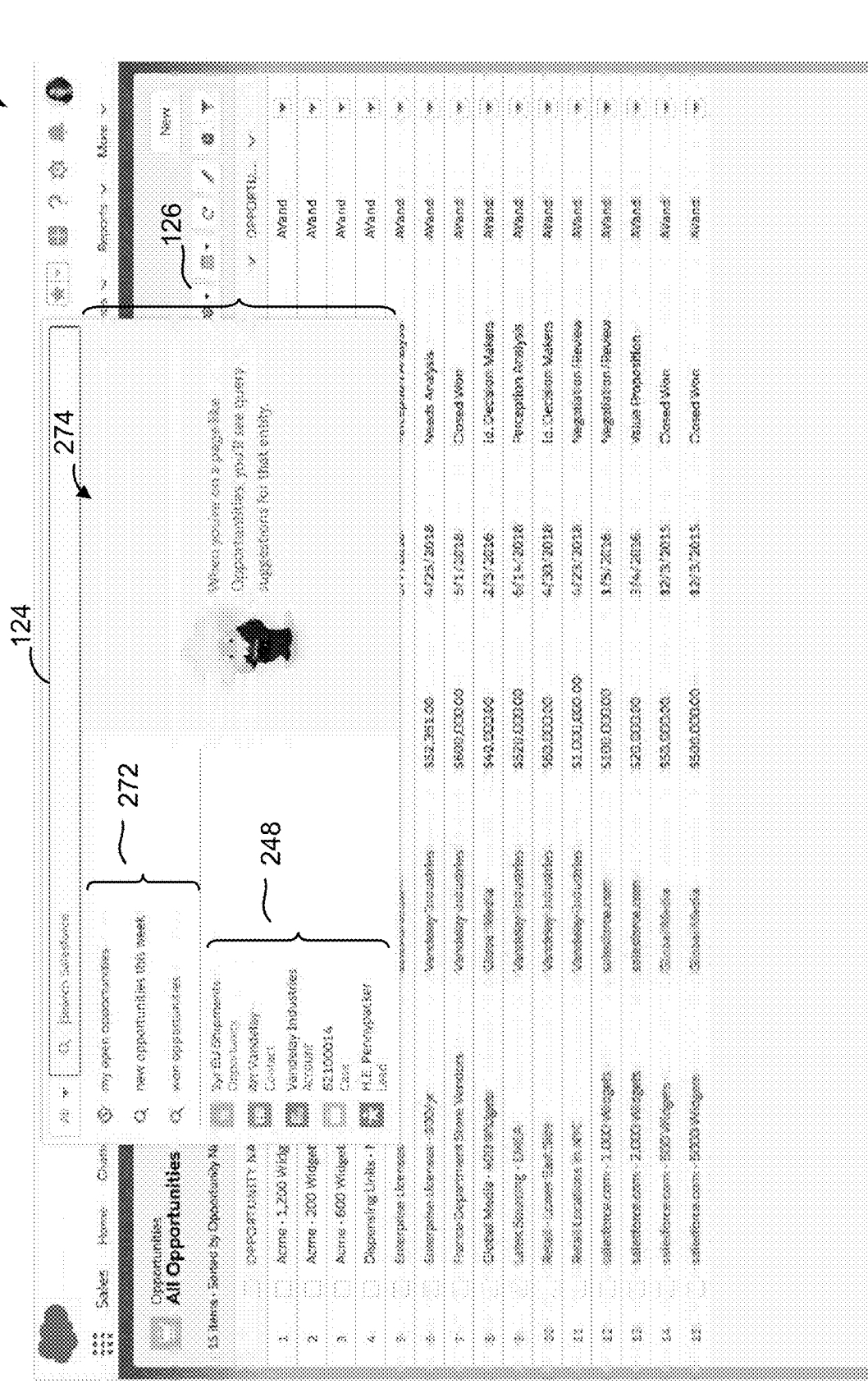
FIG. 2I shows an example of a graphical user interface (GUI) 270 including a search-based navigation interface generated for presentation on a display device of a client device in an on-demand database service environment, in accordance with some implementations.

FIG. 2I shows an example of a graphical user interface (GUI) 270 including a search-based navigation interface generated for presentation on a display device of a client device in an on-demand database service environment, in accordance with some implementations. Since the user has not typed in search input interface element 124, a server of the database system obtains search results based, at least in part, on the user profile. For example, the user profile may indicate that the user is on the Sales team.

In addition, the search server may obtain the search results further based, at least in part, on a context of the search-based navigation interface. The context of the search-based navigation interface can include, for example, a web page on which the search-based navigation interface is rendered and/or information rendered within the web page. For example, the web page may display information pertaining to records of a particular record type. As shown in FIG. 2I, the web page on which the search-based navigation interface is rendered displays information pertaining to a plurality of Opportunity database records in the form of a table entitled, "All Opportunities." Therefore, the search results that are obtained pertain to opportunities.

User-selectable options corresponding to the search results that are provided in user interface object 126 include query suggestions 272 and items 248. Query suggestions 272 include "my open opportunities," "new opportunities this week," and "won opportunities." Therefore, user-selectable options such as query suggestions 272 may pertain to the content of the web page on which the user interface object 126 is rendered.

In this example, user interface object 126 also includes educational information 274 pertaining to the search-based navigation interface. More particularly, educational information 274 notifies the user that query suggestions pertain to the content of the web page.

Figure 2J:
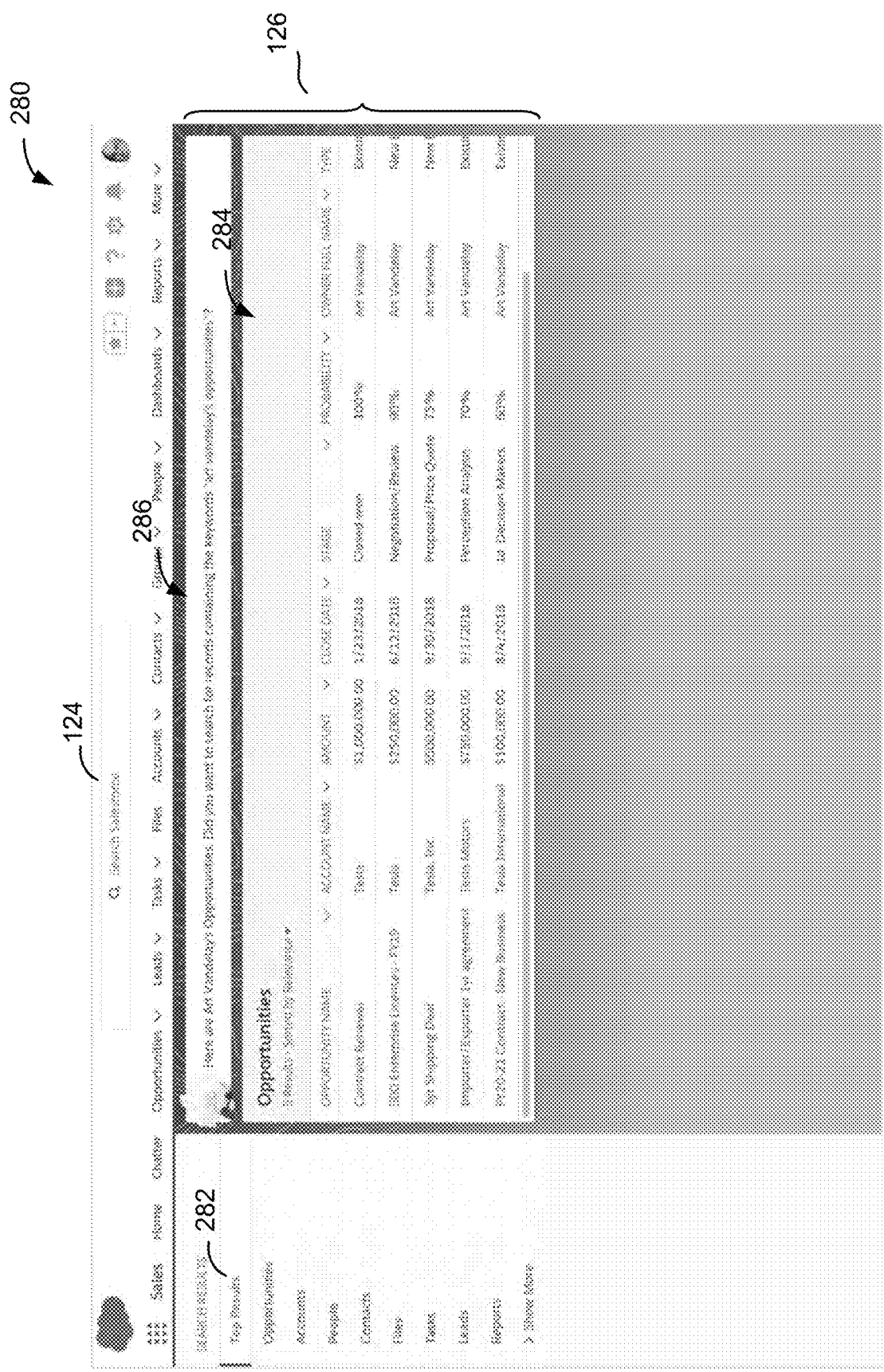
FIG. 2J shows an example of a graphical user interface (GUI) 280 including a search-based navigation interface generated for presentation on a display device of a client device in an on-demand database service environment, in accordance with some implementations.

FIG. 2J shows an example of a graphical user interface (GUI) 280 including a search-based navigation interface generated for presentation on a display device of a client device in an on-demand database service environment, in accordance with some implementations. In this example, the user previously submitted the search query "Art Vandalay." In some implementations, search results may be filtered by the user by selecting from one of a plurality of search filter options. For example, filter options can include categories of results from which the user may select. Categories can include object types such as Accounts, Contacts, Leads, Tasks, and Opportunities. As shown in FIG. 2J, the user selected a search filter category "Top Results" 282 to view top search results returned in response to the search query.

In this example, search results that are returned include five Opportunity database records and are rendered in user interface object 126, as shown at 284. In this example, a report including rows that each corresponds to a different search result provides a summary of the search results. More particularly, each row contains data obtained from fields of a corresponding Opportunity database record.

Since the search query is ambiguous, the database system has made assumptions as to the intent of the user. In this example, the database system makes the assumption that the search query is a conceptual query pertaining to "Art Vandalay's opportunities" rather than a key word search for items including the search query terms "Art Vandalay." In some implementations, the database system exposes the assumptions and/or features it has used to obtain the search results and offers the user the opportunity to submit a different search query, as shown at 286. More particularly, the user is notified that the search results pertain to "Art Vandalay's Opportunities" and offers the user the option to do a key word search for the search query previously submitted.

A search-based navigation interface may be generated according to various frameworks. In some implementations, a layout of a search-based navigation interface is generated using a framework for generating the layout.

Figure 2K:
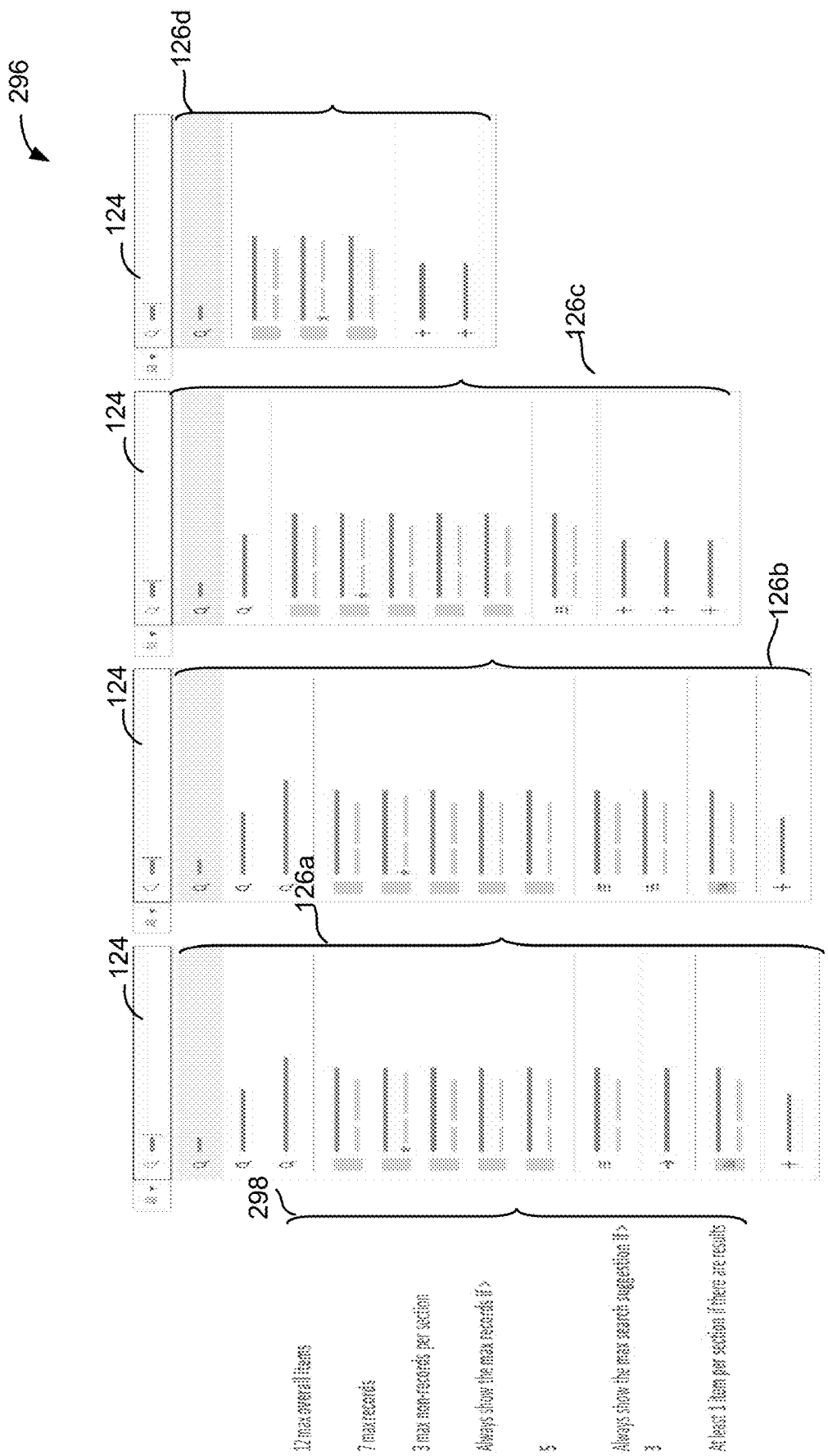
FIG. 2K shows an example of a framework 296 for generating a search-based navigation interface, in accordance with some implementations.

FIG. 2K shows an example of a framework 296 for generating a search-based navigation interface, in accordance with some implementations. In some implementations, a framework for determining a layout used to generate a search-based navigation interface includes set of rules 298, which may be configurable by a user. The set of rules may be statically or dynamically configured such that a layout configuration is stored in a database of the database system. The layout configuration may include or be derived from the set of rules. In some implementations, the set of rules may be configured by a user via a GUI.

A rule may include one or more operators such as AND, OR, NOT, =, >, or <. In addition, a rule may include conditional language such as IF or WHEN. Moreover, a rule may include language such as "MAX," "ALWAYS," or "AT LEAST." A set of rules may be associated with one or more tenants, an organization, a team, a user, and/or a particular context.

A rule may also include one or more operands. Each operand may be static or configurable. For example, an operand may include a variable corresponding to a plurality of user-selectable operands. Example operands include, but are not limited to, database records, non-records, records corresponding to a particular record type (e.g., Account, Case, Contact, etc.), objects of a particular object type, query suggestions, user-selectable options, or items corresponding to one or more objects. Therefore, a rule or portion thereof may correspond to a particular object type (e.g., database record) or subset thereof (e.g., Opportunity, Lead, etc.).

In some implementations, user-selectable options are presented in a plurality of distinct sections of a user interface object 126 within the search-based navigation interface. More particularly, user-selectable options may be presented in a list format, where the list includes a plurality of sections, where each of the sections corresponds to a different result type or object type (e.g., query suggestions, database records, database, applications, actions) or subset of the corresponding object type such as the type of database record (e.g., Account database records, Lead database records, Contact database records, etc).

Sections may be implicit by grouping user-selectable options according to the corresponding result type or object type. Alternatively, sections may be explicit, where a line or other form of delination visually separates sections of results from one another within user interface object 126.

A rule may indicate a number of elements (or user-selectable options) to present within a user interface object 126 or section thereof. The number may correspond to a total number, maximum number, or minimum number of elements. In addition, the number may correspond to a particular type of element. For example, the number may indicate a total, maximum, or minimum number of: user-selectable options, query suggestions, items (e.g., corresponding to objects), or items corresponding to a particular object type (or subset thereof), to present within a user interface object of a search-based navigation interface. In addition, the number may indicate a total, maximum, or minimum number of elements to present within a single section of a user interface object. Example user interface objects generated according to a set of rules such as that shown at 298 are represented in FIG. 2K as user interface objects 126a-126d.

As described above with reference to FIG. 2K, a user may configure a layout used to generate a search-based user interface or user interface object rendered therein. As a result, a user may control the total number of search results, as well as the quantity of items that will be presented for a given type of object or within an associated section within the user interface. In this manner, a user may control the format in which "search results" are presented, as well as the quantity of search results of various types that are presented.

In some implementations, a user may also configure the types of metadata that will be rendered in association with a given search result. For example, a user may wish for data obtained from an Owner field of database records to be rendered in association with a search result or associated record preview. This metadata configuration may be performed in association with all types of objects for which items may be presented. Alternatively, the metadata configuration may be performed in association with a particular type of object (e.g., database record, type of database record).

In some implementations, a user may configure the fields that will be used by a search engine to identify search results to be presented within the search-based user interface. Similarly, a user may configure fields that are to be excluded by a search engine to identify search results to be presented within the search-based user interface. For example, where the name of a client includes the term "Sales," the user may wish to exclude the client name of database records from being used to identify search results. Thus, by enabling the user to configure the fields that are used or excluded during the search process, the user may prevent the search results from being inadvertently and incorrectly skewed toward a particular client or account.

A layout configuration, metadata configuration, and/or search field configuration may be generated via a GUI provided for a display by a client device. Once generated, a configuration may be stored in association with a user, a group of users, or an organization. This enables the search-based user interface to be customized according to user or organization-specific needs.

In some implementations, a user may use pre-scoping to focus a search. The scope may correspond to a category, a particular object, or an object type. Examples of search results and corresponding user-selectable options generated using pre-scoping will be described in further detail below with reference to FIGS. 3A-3B.

Figure 3A:
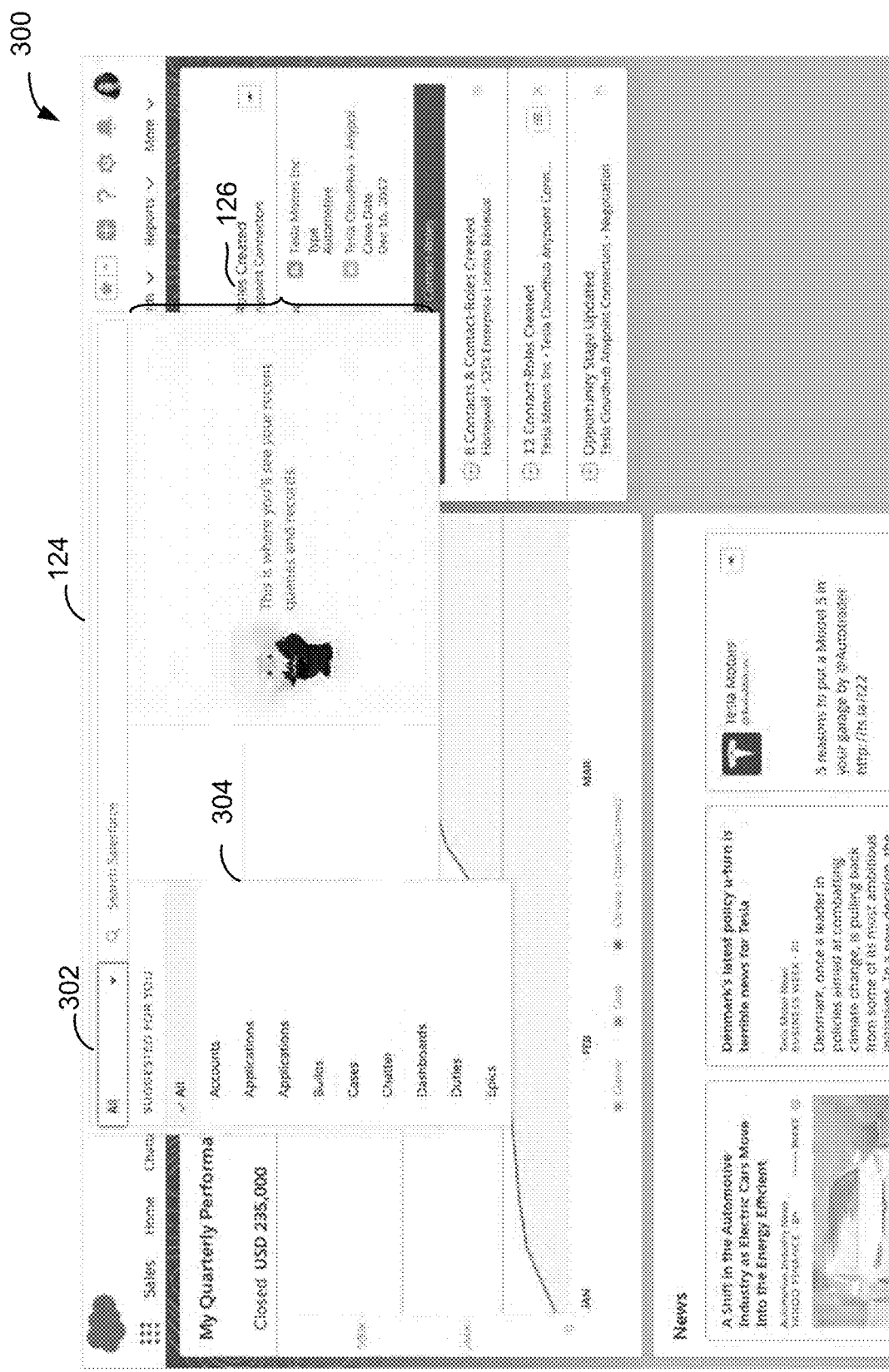
FIG. 3A shows an example of a GUI 300 including a search-based navigation interface generated for presentation on a display device of a client device in an on-demand database service environment, in accordance with some implementations.

FIG. 3A shows an example of a GUI 300 including a search-based navigation interface generated for presentation on a display device of a client device in an on-demand database service environment, in accordance with some implementations. As shown in FIG. 3A, a user may select a scope 302 for a search performed by the database system. More particularly, a user interface object such as a drop-down menu may provide a plurality of user-selectable scope options 304. In some implementations, the pre-scope feature is implemented using a combobox. In this example, the user has selected "All." Therefore, the user has opted not to focus the search.

Figure 3B:
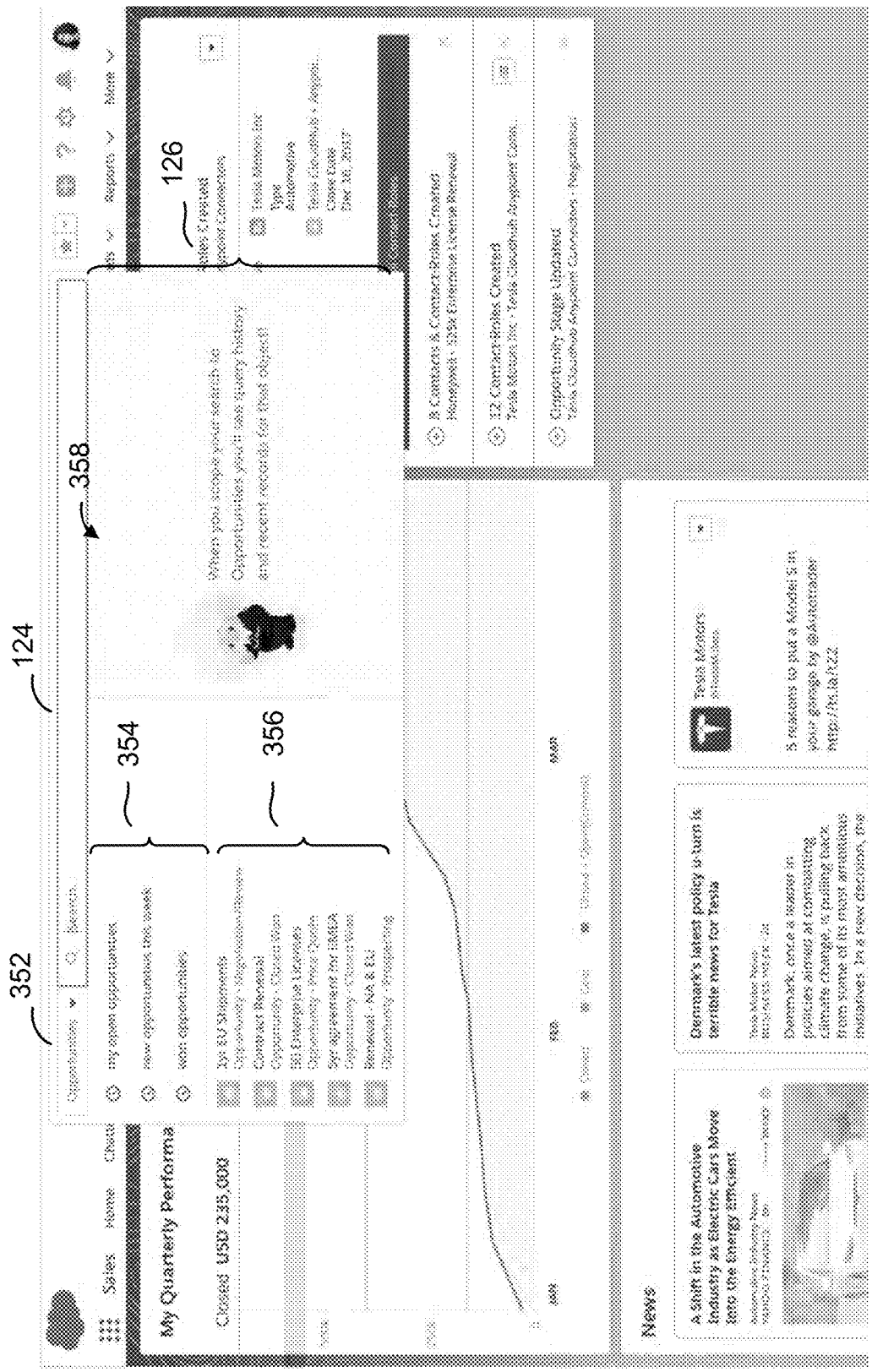
FIG. 3B shows an example of a GUI 350 including a search-based navigation interface generated for presentation on a display device of a client device in an on-demand database service environment, in accordance with some implementations.

FIG. 3B shows an example of a GUI 350 including a search-based navigation interface generated for presentation on a display device of a client device in an on-demand database service environment, in accordance with some implementations. In this example, the user has opted to focus the search by selecting a scope 352, "Opportunities," from the user-selectable scope options. In this example, the user has not submitted input via search input interface element 124. In the absence of receiving input via search input interface element 124, a server of the database system may obtain search results based, at least in part, on the selected scope and the user profile.

As shown in this example, user-selectable options corresponding to the search results that are provided in user interface object 126 include query suggestions 354 and items 356. Both query suggestions 354 and items 356 pertain to the selected scope, "Opportunities." In addition, educational information 358 presented in user interface object 126 also pertains to the selected scope, "Opportunities." As shown in this example, since the user has selected the scope, "Opportunities," the query suggestions 354 and items 356 may include a query history and recent database objects for that object type, respectively. Recent objects can include, for example, objects with which the user has recently interacted.

Query suggestions 354 may include previously submitted queries, which may have been submitted by the user, the user's team, or by users within the organization. For example, query suggestions 354 may include queries that were most recently submitted or most frequently submitted. As another example, query suggestions 354 may include queries that are most popular among a particular team or within the organization.

Similarly, items 356 may include items (e.g., database records) that have recently been accessed by the user or users within the user's team. Items 356 may also include items that have been most frequently accessed by the user or users within the user's team. In addition, items 356 may include items that have recently been created by the user, users within the user's team, or users within the organization.

Items 356 and query suggestions 354 may be selected or rendered according to a configuration by the user, the user's team, or the user's organization. For example, a configuration may indicate criteria used to identify or select query suggestions 354 and/or items 356 for presentation within user interface object 126. For example, a configuration may indicate criteria such as 1) popularity, recency, and/or frequency corresponding to 2) submission, creation, or access of 3) queries or items (e.g., database records) by 4) the user, the user's team, or users within the organization. These criteria may be used separately or in combination with one another. Therefore, the search may be facilitated based, at least in part, on a configuration.

Once search results including suggested queries and/or other items are presented in user interface object 126, the user may interact with the search results. More particularly, the user may select one of the items to access the corresponding object, as will be described in further detail below.

Figure 4A:
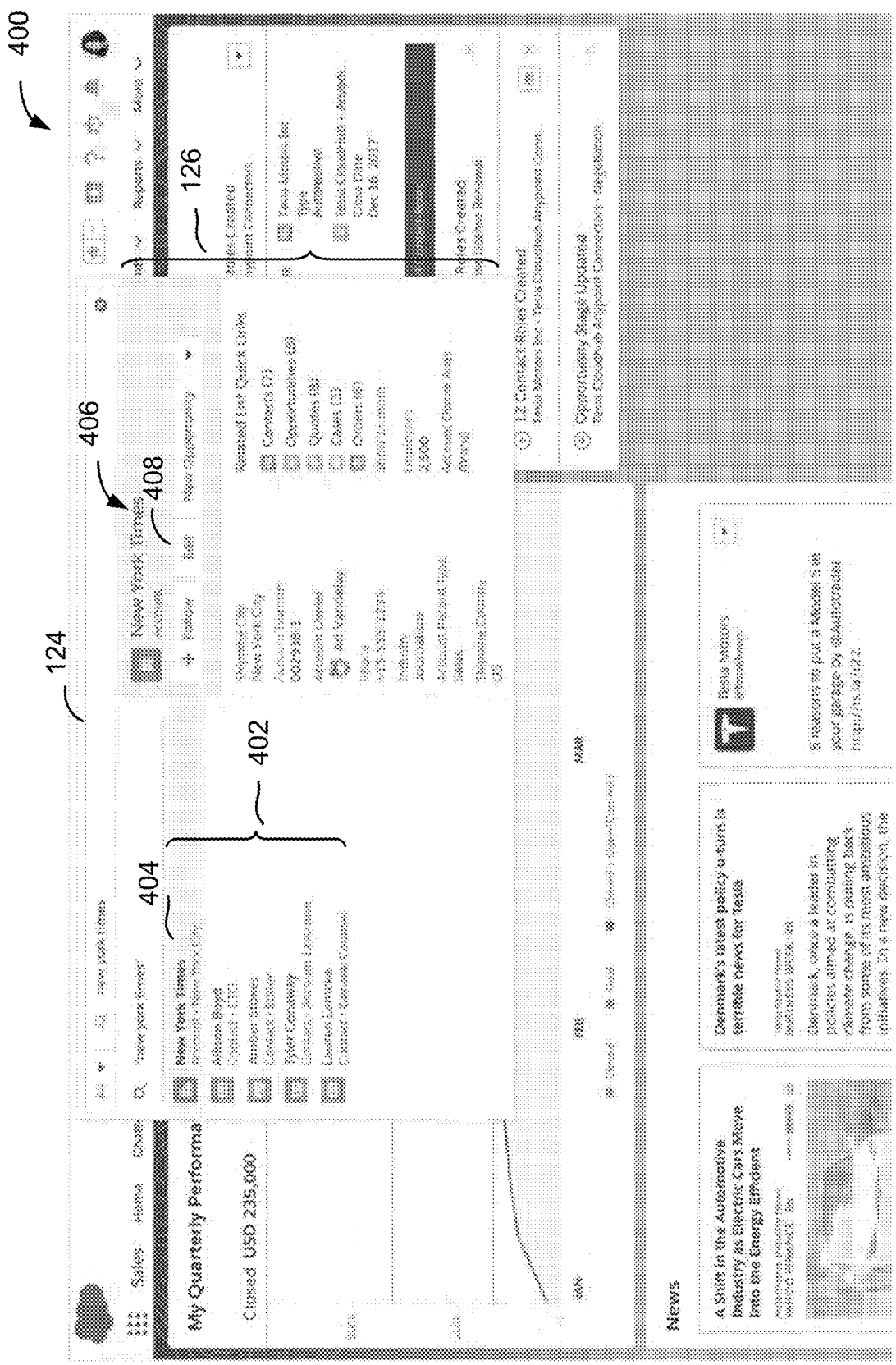
FIG. 4A shows an example of a GUI 400 including a search-based navigation interface generated for presentation on a display device of a client device in an on-demand database service environment, in accordance with some implementations.

In some implementations, a user may access record previews by selecting a search result. FIG. 4A shows an example of a GUI 400 including a search-based navigation interface generated for presentation on a display device of a client device in an on-demand database service environment, in accordance with some implementations. As shown in FIG. 4A, the user enters "new york times" in search input interface element 124. In response, user-selectable options including items 402 are presented within user interface object 126. In this example, items 402 include five different items, where each of the items corresponds to a different object. More particularly, each of items 402 corresponds to an object of the same object type, a database record.

In some implementations, objects of the same object type (e.g., database records) are grouped together in user interface object 126. In addition, objects of the same database record type (e.g., Contact) may be grouped together in user interface object 126. In this example, the first item of items 402 corresponds to an Account database record while the subsequent four items correspond to Contact database records.

In some implementations, the user may interact directly with a database record by interacting with one of items 402 presented in user interface object 126. Interaction with an item may cause a variety of results including, but not limited to, rendering a web page corresponding to the selected database record, rendering a record preview of the selected database record within user interface object 126, and/or providing access to an application or action in relation to the selected database record. Interaction with an item may include selecting the item, for example, by hovering over the item, clicking the item, or arrowing down to select the item.

As shown in FIG. 4A, the user selects item 404 corresponding to the New York Times Account. In response to the user selection of item 404, a record preview of the corresponding database record is presented within user interface object 126 at 406. As shown in this example, user-selectable options 402 may be rendered in a first segment or column of user interface object 126 and a record preview 406 may be rendered in a second segment or column of user interface object 126. Therefore, interaction with a particular item may result in the rendering of information related to the selected database record within one or more columns within user interface object 126.

The user may access a column directly by further interacting with the selected item or another previous column. For example, the user may access a column associated the selected item by selecting a tab option via their keyboard. In this example, the user may access record preview 406 by selecting a "tab" option from their keyboard from selected item 404.

A record preview may include data obtained or derived from one or more fields of the corresponding database record. In addition, a record preview may include one or more user interface objects that enable a user to access the corresponding database record and/or perform a particular action in relation to the corresponding database record. In this example, record preview 406 includes a set of user interface objects (e.g., buttons) with which a user may interact by, for example, clicking on a selected user interface object. As shown in FIG. 4A, the set of user interface objects of record preview 406 can include an Edit button 408.

The user may interact with a user interface object within record preview 406 to select the user interface object. In this example, the user clicks on Edit button 408. In response to the user's interaction with the selected user interface object, a web page that pertains to the selected user interface object may be rendered. For example, the web page may facilitate performing the action represented by the selected user interface object. As another example, the web page may present data obtained or derived from fields of the database record. The user may modify the database record by interacting with the web page. For example, the user may choose to modify data in one of the fields of the database record.

As further shown in FIG. 4A, the user may click on a button to Follow the New York Times account or click on a New Opportunity to create a new Opportunity database record in association with the New York Times account. Therefore, the user may perform an action in relation to a database record directly from a search navigation interface.

As described above, a user may access database records or information associated therewith via a search-based navigation interface. In some implementations, applications that are relevant to the user within the context of the organization may also be provided via the search-based user interface. This may be particularly useful to a user in the zero state.

Figure 4B:
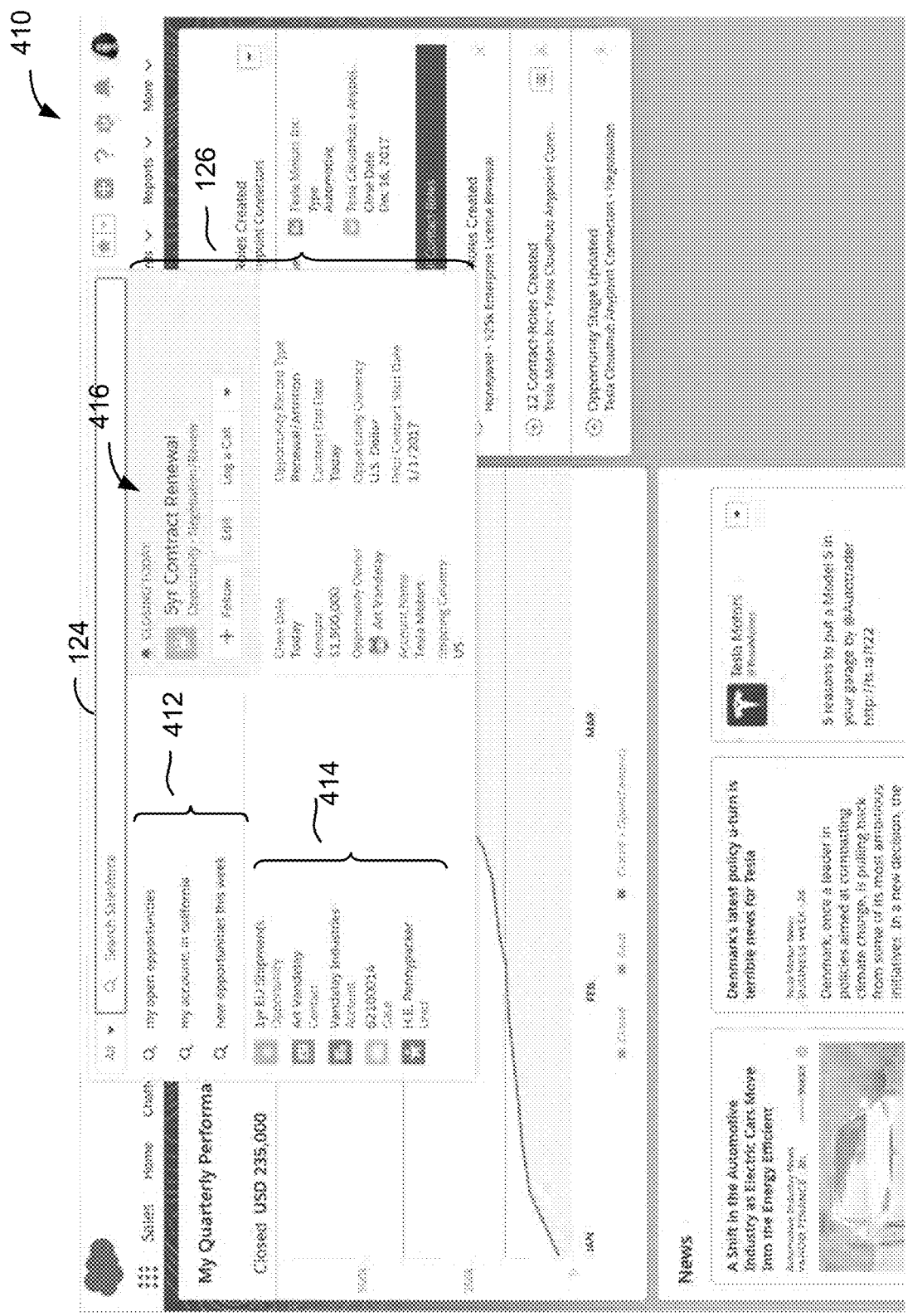
FIG. 4B shows an example of a GUI 410 including a search-based navigation interface generated for presentation on a display device of a client device in an on-demand database service environment, in accordance with some implementations.

FIG. 4B shows an example of a GUI 410 including a search-based navigation interface generated for presentation on a display device of a client device in an on-demand database service environment, in accordance with some implementations. In this example, the user has not entered text in search-input interface element 124. The database system provides user-selectable options including query suggestions 412 and items 414 based, at least in part, on the user profile, context, and/or information maintained in other data sources such as the user's calendar.

As shown in FIG. 4B, items 414 correspond to five database records, where each of the database records corresponds to a different object type. More particularly items 414 correspond to objects of object types: Opportunity, Contact, Account, Case, and Lead.

In some implementations, query results identified by the database system include an application. Such an application may be provided as one of items 414. In addition, an application may be provided via another segment of user interface object 126. In some instances, an application that is highly relevant to the user's day, workflow, and/or other context may be provided. For example, as shown in FIG. 4B, if a database record and/or the user's calendar indicates that today is the close date for a high dollar Opportunity owned by the user, a reminder may be displayed in user interface object 126 in conjunction with a record preview 416 for the Opportunity. Thus, a value of field(s) of the corresponding database record may be used to determine whether to provide a reminder or other application. As another example, if the user's calendar indicates that a meeting is scheduled to occur soon, a calendar may be rendered, as will be described in further detail below with reference to FIG. 4C.

Figure 4C:
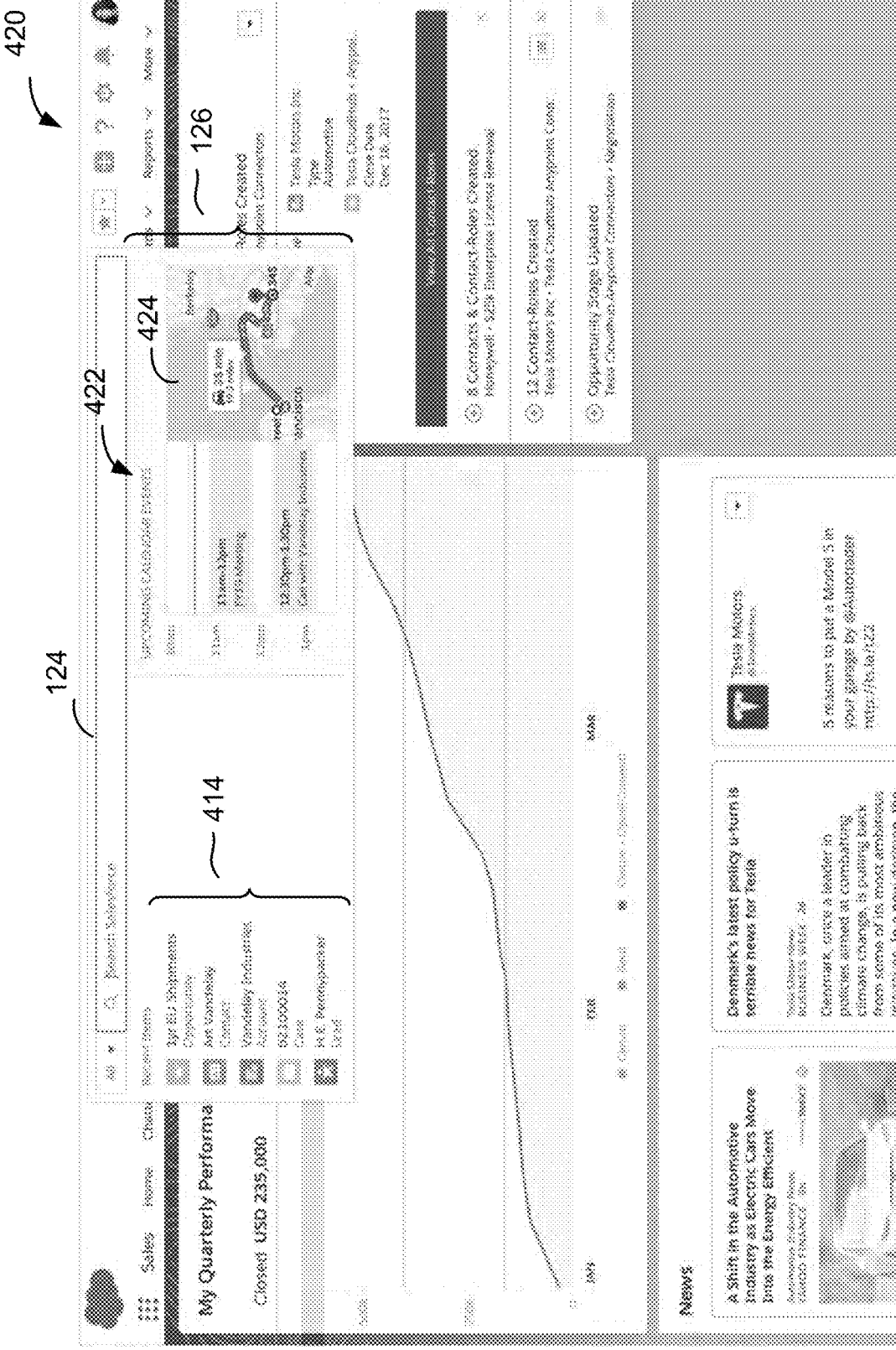
FIG. 4C shows an example of a GUI 420 including a search-based navigation interface generated for presentation on a display device of a client device in an on-demand database service environment, in accordance with some implementations.

FIG. 4C shows an example of a GUI 420 including a search-based navigation interface generated for presentation on a display device of a client device in an on-demand database service environment, in accordance with some implementations. In this example, the user's calendar indicates that a meeting is scheduled to occur at 11:00 am and that the user has a call scheduled for 12:30 pm. As a result, a calendar application or a portion of the user's calendar that pertains to the imminent scheduled event(s) may be rendered within user interface object 126, as shown at 422. In addition, as shown in this example, a map 424 indicating a location of the meeting and/or directions to the meeting may be rendered within user interface object 126.

In some implementations, actions that are relevant to the user within the context of the organization may also be provided via the search-based user interface. Actions may be provided to a user in the zero state or in response to user input, as described in further detail below with reference to FIG. 4D.

Figure 4D:
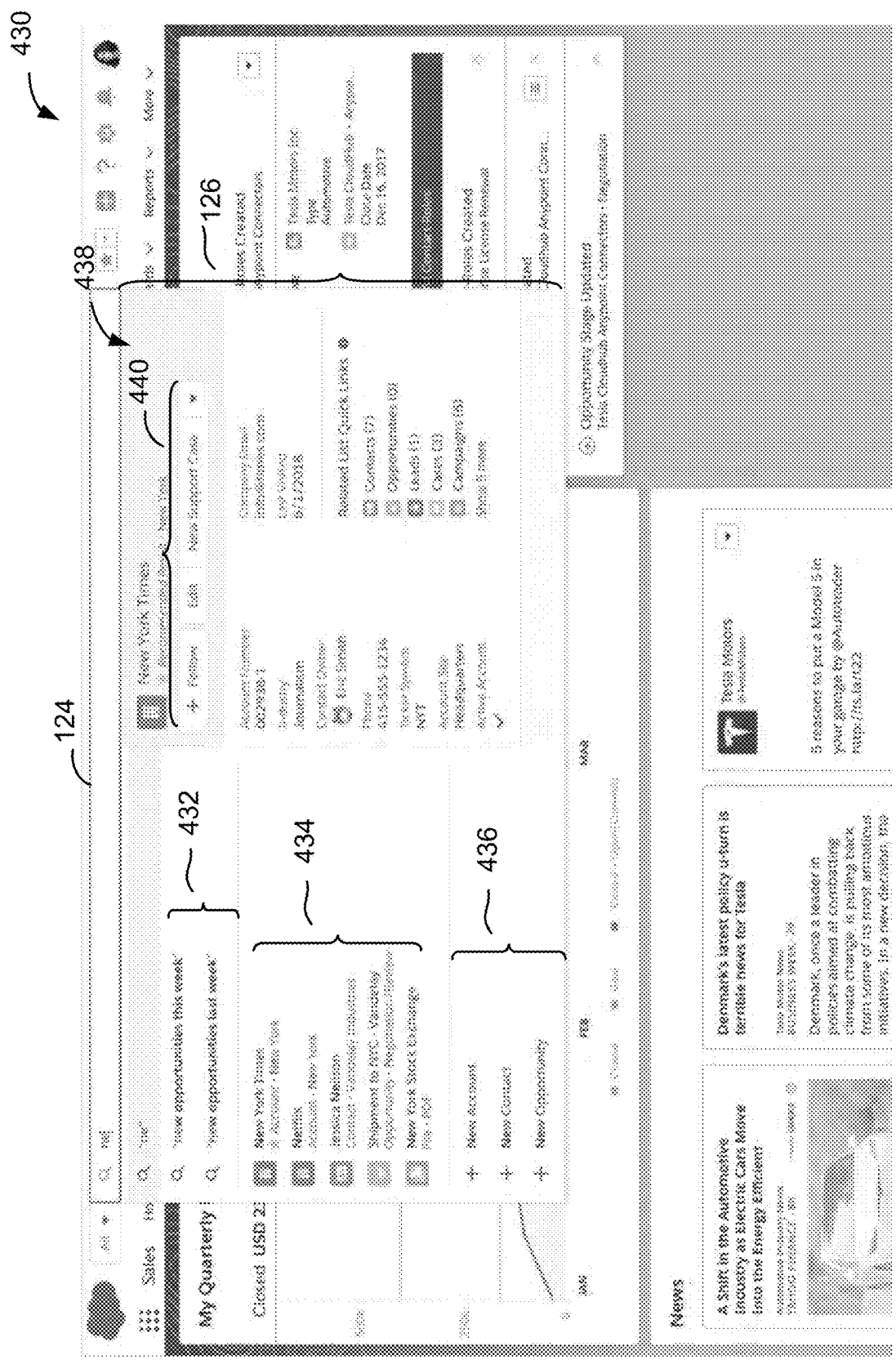
FIG. 4D shows an example of a GUI 430 including a search-based navigation interface generated for presentation on a display device of a client device in an on-demand database service environment, in accordance with some implementations.

FIG. 4D shows an example of a GUI 430 including a search-based navigation interface generated for presentation on a display device of a client device in an on-demand database service environment, in accordance with some implementations. In this example, the user has typed user input "ne" in search input interface element 124. In response, user-selectable options including suggested queries 432 and items 434 are provided in user interface object 126 of the search-based user interface based, at least in part, on the user input. More particularly, the database system may provide user-selectable options including or corresponding to search results that match or include the user input string. In this example, each of the search results includes the text "ne."

User-selectable options may be segmented within user interface object 126 according to various layout schemes. User-selectable options may be provided in the form of one or more lists and/or sections. In this example, user-selectable options are provided in three different sections of user interface object 126.

As shown in FIG. 4D, a first, top section of user interface object 126 includes query suggestions 432, while a second section of user interface object 126 includes items 434. In this example, items 434 correspond to objects of various object types. More particularly, the first four of items 434 correspond to four different database records and the last of items 434 corresponds to a file. Within the database records, the top two database records correspond to Account database records followed by a Contact database record and an Opportunity database record. Therefore, database records are grouped within the same "section," while also grouping database records of the same record type together (e.g., sequentially).

In this example, a third section includes action(s) 436 that are user-selectable. More particularly, action(s) 436 may include actions that can be performed in relation to a database record stored by the database system. By selecting various user-selectable actions, the user may create a new database record, view an existing database record, edit an existing database record, or perform another action in relation to a database record. Actions provided via user interface object 126 may be global (e.g., provided independent from a particular database record) or may be record-specific (e.g., provided in association with a particular database record). Each action may be represented by a corresponding visual indicator or shortcut. A visual indicator may include, but is not limited to, text, an icon, an image, a color, and/or other visual characteristics.

As shown in FIG. 4D, actions 436 include global actions "New Account," "New Contact," and "New Opportunity." By selecting "New Account" from the user-selectable options provided via user interface object 126, the user may create an Account database record. Similarly, the user may select "New Contact" or "New Opportunity" to create a new Contact or Opportunity database record, respectively.

A recommended result 438 may also be provided in user interface object 126. A recommended result 438 may include an identifier of a particular object, as well as a summary or preview of the object. In this example, recommended result 438 includes a record preview of a particular Account database record. In conjunction with the recommended result 438, user interface objects 440 corresponding to record-specific action(s) and/or application(s) such as Follow, Edit, or New Support case may be provided in user interface object 126. The user may interact with one of user interface objects 440 to access an application or initiate a corresponding action in relation to the recommended object. Therefore, the user may perform an action and/or access an application in relation to a particular object directly from the search-based user interface by interacting with a particular user interface object presented within the search-based user interface.

In some implementations, a user may receive suggested actions in response to user input. Actions that are available to the user may be provided in user interface object 126, as will be described in further detail below with reference to FIG. 4E.

Figure 4E:
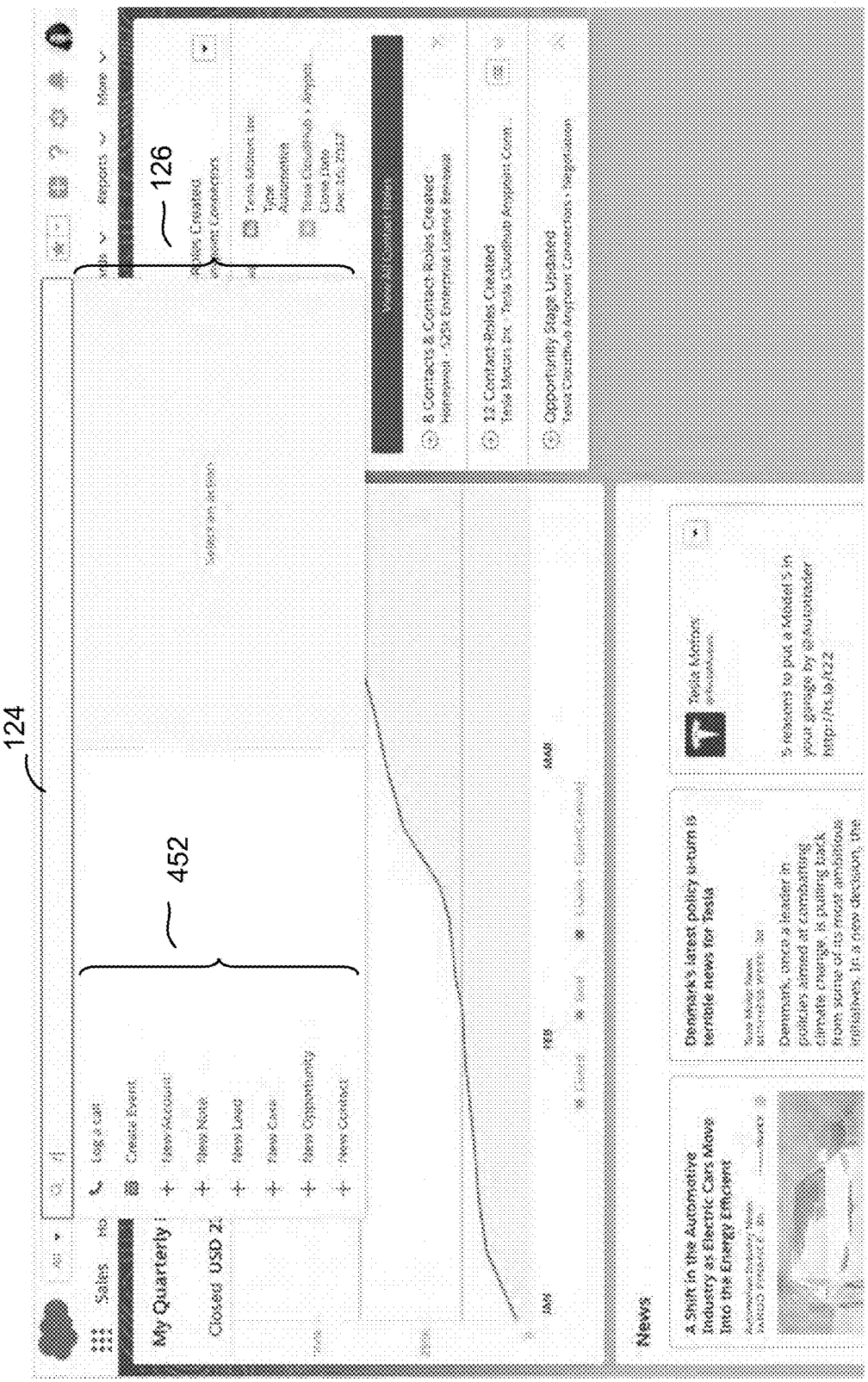
FIG. 4E shows an example of a GUI 450 including a search-based navigation interface generated for presentation on a display device of a client device in an on-demand database service environment, in accordance with some implementations.

FIG. 4E shows an example of a GUI 450 including a search-based navigation interface generated for presentation on a display device of a client device in an on-demand database service environment, in accordance with some implementations. User-selectable options may include or correspond to actions 452 that may be selected by a user. In some implementations, actions 452 are provided in the absence of user input. In other implementations, actions 452 may be provided based, at least in part, on user input. For example, the user input may include a text string that the database system uses to search its database for matching actions that include the string. As another example, the user input may include a key stroke or character such as "/" that indicates to the system that the user is requesting actions that are available to the user. In this example, actions 452 are global actions that enable the user to create or modify a database record.

Figure 4F:
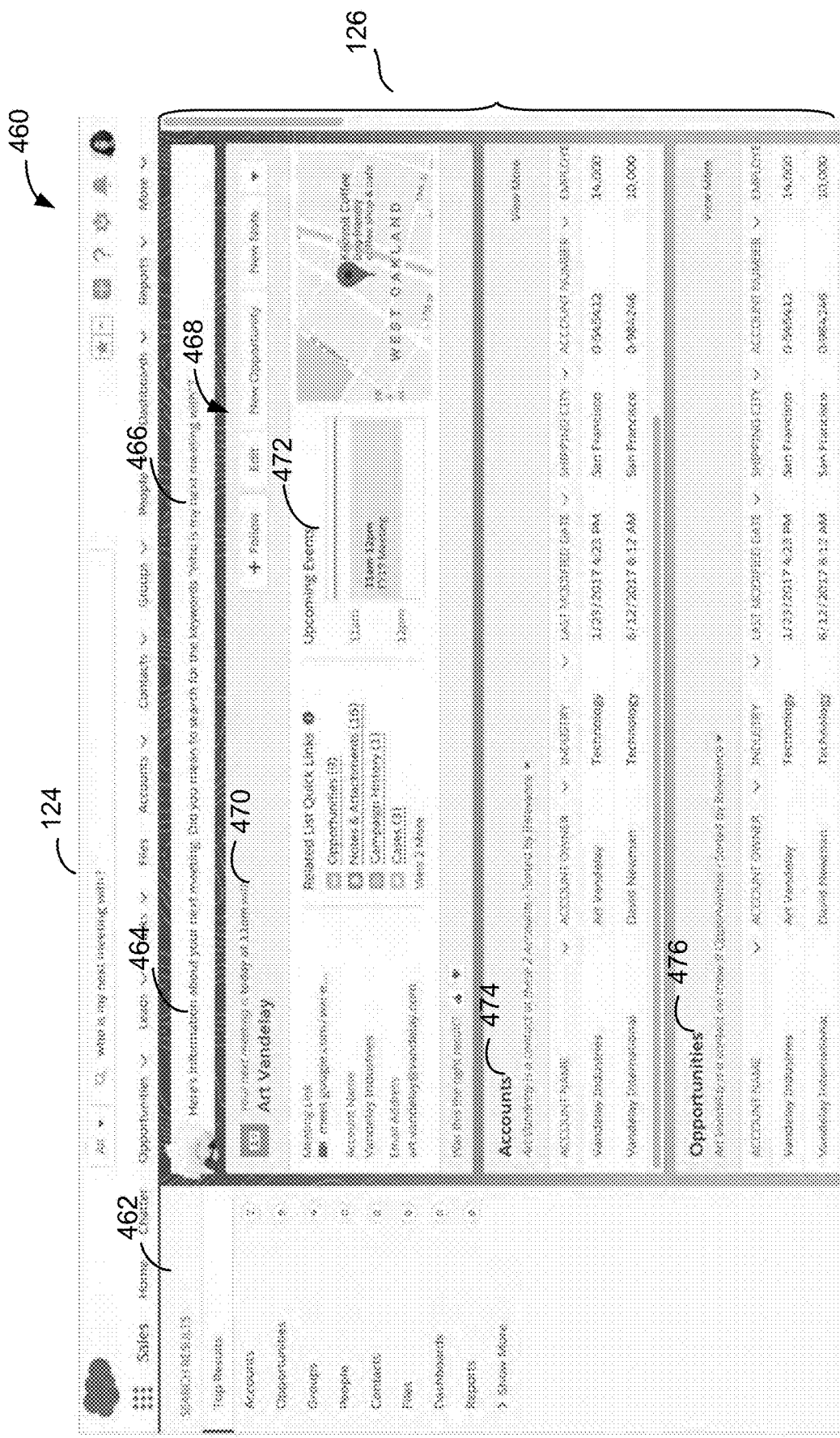
FIG. 4F shows an example of a graphical user interface (GUI) 460 including a search-based navigation interface generated for presentation on a display device of a client device in an on-demand database service environment, in accordance with some implementations.

FIG. 4F shows an example of a graphical user interface (GUI) 460 including a search-based navigation interface generated for presentation on a display device of a client device in an on-demand database service environment, in accordance with some implementations. As shown in FIG. 4F, the user has entered the phrase "who is my next meeting with?" in search input interface element 124. In this example, the database system interprets the user's intent to be a natural language query rather than a keyword search and identifies search results based upon this interpretation. Search results may be categorized and an indication of a total number of search results in each of a plurality of categories may be provided in search interface object 126, as shown at 462.

In this example, the database system provides an indication 464 in user interface object 126 of the database system's interpretation of the user input or search query. More particularly, the system notifies the user that search results pertain to the user's next meeting. In this manner, the database system may expose feature(s) that it used to obtain the search results.

To verify that the database system's interpretation of the user's intent is correct, the database system also offers the user the ability to provide feedback pertaining to the database system's interpretation of the user input. In some implementations, the user may modify the features used by the database system, delete feature(s) used by the database system, and/or provide additional feature(s) that may be used by the database system to provide search results that more accurately reflect the user's intent.

In some implementations, the database system provides the user an alternate search query 466 that the user may select. For example, the database system may provide a suggested query that is a keyword query rather than a natural language query. In this example, the alternate search query 466 is provided in the form of a link that allows the user to submit the alternate search query 466.

In some implementations, user interface object 126 includes a best result segment 468 that includes information pertaining to the "best result" to the user's input or search query. More particularly, an answer to the user's search query may be provided in user interface object 126 at 470. In this example, the answer identifies the contact that they're meeting with next. For example, a "preview" of the contact they're meeting with next and any pertinent information may be provided.

In some implementations, an application such as a calendar application 472 may be provided in user interface object. Calendar application 472 may provide information indicating the date and/or time of the user's next meeting.

In this example, user interface object 126 includes additional search results that are related to the individual with whom the user is meeting. More particularly, search results including objects such as database records may be identified in user interface object 126. For example, database records can include Account database records 474 and Opportunity database records 476. In this example, related search results are provided in the form of tables. Contextual information pertaining to the results may be provided in headers of the tables, as shown in FIG. 4F.

A search-based navigation interface may be provided according to various methods. Example methods of providing a search-based navigation interface will be described in further detail below with reference to FIGS. 5-7.

Figure 5:
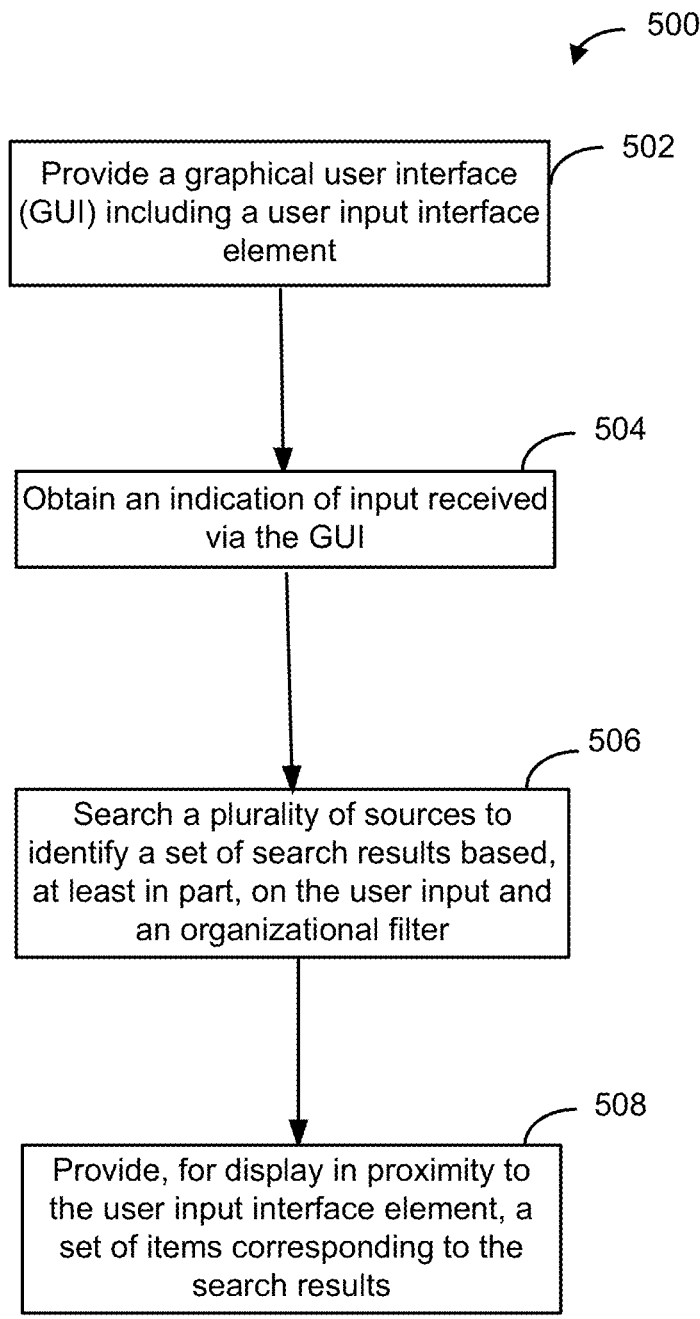
FIG. 5 shows a flow diagram of a method 500 for providing a search-based navigation interface within an organizational context for presentation on a display device of a client device in an on-demand database service environment, in accordance with some implementations.

FIG. 5 shows a flow diagram of a method 500 for providing a search-based navigation interface within an organizational context for presentation on a display device of a client device in an on-demand database service environment, in accordance with some implementations. The database system may provide a GUI including a search input interface element for display by a client device (502). In some instances, an indication of user input received via the search input interface element may be obtained (504). In other instances, the user may choose not enter a search query or other input.

The database system may search a plurality of sources to identify a set of search results based, at least in part, on an organizational filter (506). In addition, the set of search results may be identified based, at least in part, on an indication of user input, if received. The set of search results may also be obtained based, at least in part, on a context such as a web page on which the GUI is rendered (e.g., a record identifier associated with the web page) or contents thereof. Each search result may correspond to at least one object of a corresponding object type, as described herein. In some instances, the database system may also identify a set of suggested queries based, at least in part, on the organizational filter and/or other criteria such as those described herein.

Each of the sources may include or store items of one or more corresponding object types. More particularly, the sources may include at least one database storing a plurality of database records. For example, the database records may be those generated and stored by the database system. In addition, the sources may include a calendar of the user, a repository of applications, and/or a repository of actions.

In some implementations, the organizational filter may be implemented based, at least in part, on a user profile of a user of the client device. The user profile may indicate one or more features of the user in relation to an organization. More particularly, the user profile may indicate at least one of: a role of the user within an organization of users of the database system, membership of the user in a group of users within the organization, ownership of the user of one or more of the database records, a history of interaction of the user with one or more of the database records, a history of interaction of the user with one or more users within the organization, or a history of interaction of the user with one or more groups of users within the organization of users of the database system.

User input can include one or more alphanumeric characters. In some instances, the user input can include one or more terms. Often, a user's input is ambiguous, and therefore can be interpreted in different ways. Therefore, the database system may attempt to determine the intent of the user to facilitate the search of the sources.

The database system may process the indication of user input according to various algorithms. In some implementations, the database system may resolve the user input or a portion thereof based, at least in part, on an organizational filter using a user profile of the user. The database system may perform the search based, at least in part, on a result of resolving the user input or portion thereof. The result of resolving the user input (or portion thereof) may indicate source(s) to be searched and/or specific objects or search results that are relevant to the user input.

In some implementations, the database system may apply an organizational filter to identify or filter search results. The organizational filter may be implemented based, at least in part, on organizational information maintained in a user profile of the user. More particularly, the database system may identify or filter search results such that at least one of the search results pertains to: an organization of users of the database system, a role of the user within the organization, a group of users within the organization of which the user is a member, or database record(s) maintained by the database system of which the user is identified as an owner in a field of the database records.

The organizational filter may also use or analyze historical information to filter or identify search results. The historical information may be maintained or associated with a user profile. The historical information can include, but is not limited to, historical interactions of the user with one or more of the database records, historical interactions of the user with one or more users within the organization, and/or a history of interaction of the user with one or more groups of users within the organization. Interaction can include, for example, a meeting scheduled via scheduling software, an email, a text, a phone call, or a video call.

In some implementations, the organizational filter may identify search results, filter search results, and/or interpret search input based, at least in part, on the historical information associated with users within the organization or a group within the organization (e.g., a group of which a user is a member). For example, user profiles of multiple users may be accessed to resolve ambiguities in the search input, identify search results, or filter search results. The historical information obtained or derived from one or more user profiles can indicate, for example, most frequently accessed objects (e.g., database records), most recently accessed objects, least frequently accessed objects, least recently accessed objects, and/or most popular objects (e.g., objects accessed more than other objects by the user, accessed more than other objects by users within the group, or accessed more than other objects by users within the organization).

In some implementations, the organizational filter can be used to identify objects of a particular object type. More particularly, database records may be identified based, at least in part, on the historical information. For example, database record(s) that are pertinent to user-submitted input may include a database record that has been most recently accessed or most frequently accessed by the user, group, or organization.

In some implementations, the database system can resolve the user input based, at least in part, on a digital calendar of the user that is accessible via a network. For example, the calendar entry on the current day may be accessed to assist in resolving the user input. Search results may be identified or filtered based, at least in part, on the calendar of the user (e.g., information retrieved from a calendar entry of the calendar). More particularly, information in a calendar entry may be used to identify a relevant source to be searched or an object to be provided as a search result. For example, where the calendar entry indicates a meeting scheduled with Tim Jones and the user enters the characters "Ti," the database system may identify database records pertaining to Tim Jones with which the user has recently interacted. In addition, the database system may search the calendar as a source of search results and identify a search result that includes information retrieved from at least one calendar entry of the calendar.

In some implementations, the database system can resolve the user input based, at least in part, on a context of the GUI. For example, the context can include a web page on which the GUI is rendered or contents thereof. For example, the context can include a record identifier associated with the web page.

The database system may provide, for display by the client device in proximity to the search input interface element, a set of items, where each item corresponds to a different search result of the set of search results (508). In some instances, the set of items can include a plurality of items. As described herein, an item can correspond to at least one object such as a database record, an application, an action, or a calendar entry. In some instances, an item can include information obtained or derived from a search result or corresponding object (e.g., database record).

Each item may be user selectable, enabling the user to access the corresponding object or information associated therewith. For example, the database system may provide the set of items such that each item is identified by a corresponding user-selectable option.

Each of the items may correspond to at least one object of one of a plurality of object types. The object types can include, but are not limited to, an application of the database system, a database record of the database system, a database record of a particular record type, an action to be performed with respect to at least one database record of the database system, or a calendar entry in a calendar of the database system. In addition, one or more items may correspond to or identify suggested search queries.

The set of items may be provided such that items corresponding to the same object type are grouped together or listed sequentially. As will be described in further detail below, the set of items may be provided via a user interface object including two or more sections, where each of the sections corresponds to a different one of the plurality of object types. Each of the sections can include one or more user-selectable options that each corresponds to one of the set of items. Each item in the set of items can correspond to a different one of the user-selectable options.

A user may select one of the items by, for example, selecting a corresponding user-selectable option. For example, the user may click on the user-selectable option to select the corresponding item. The database system may then process the item. In some instances, the database system may process the item by providing access to an object corresponding to the selected item. More particularly, where an item corresponds to a database record, the database system may provide access to the database record. For example, information retrieved from one or more fields of the database record may be provided for display via the interface. As another example, a user interface object may present the user with an option to modify (e.g., delete) the database record in response to the user selection.

Various algorithms may be applied to generate and provide a search-based navigation interface including "search results" such as those described above. Example methods of providing a search-based navigation interface will be described in further detail below with reference to FIGS. 6 and 7.

Figure 6:
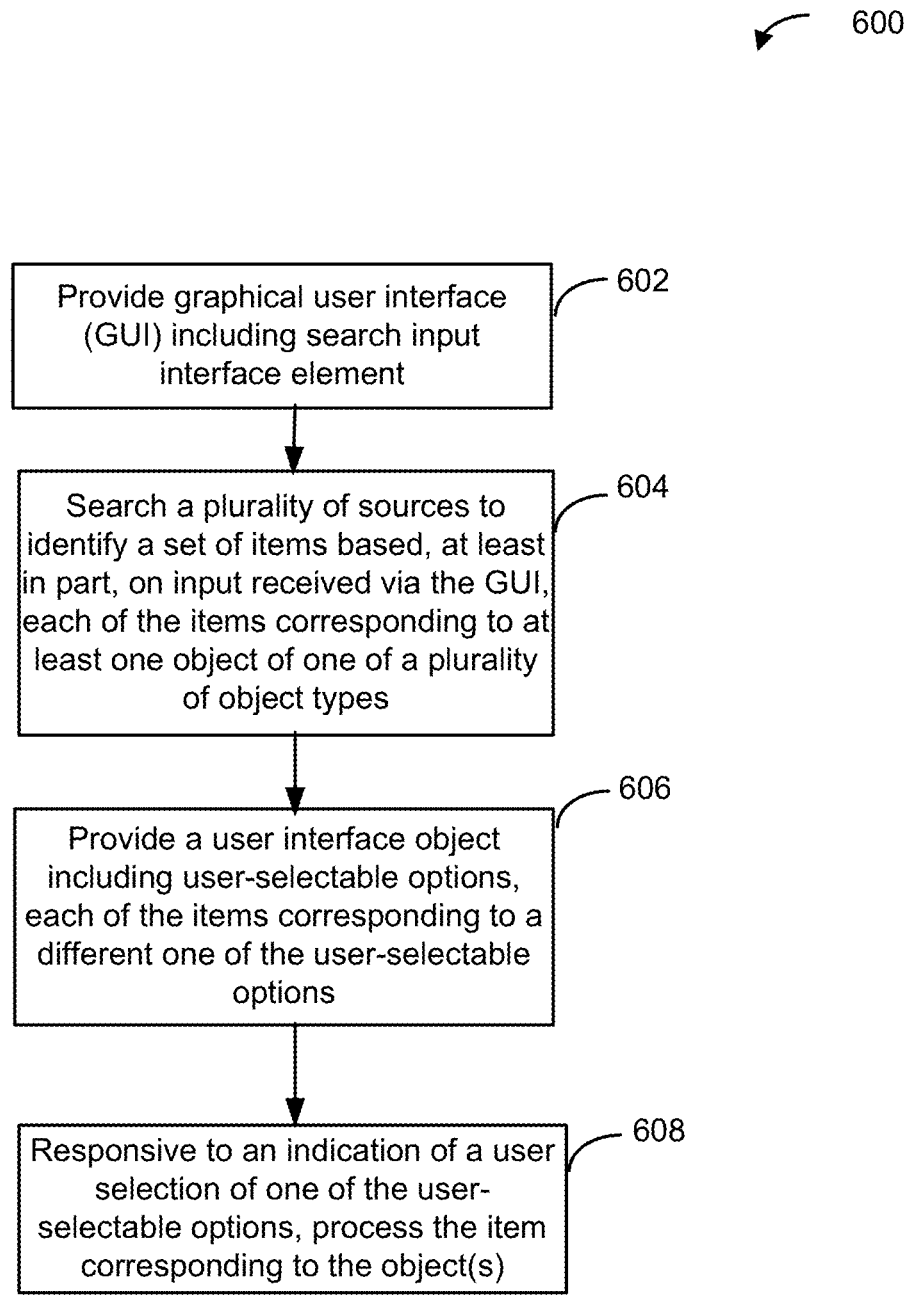
FIG. 6 shows a flow diagram of a method 600 for providing a search-based navigation interface for presentation on a display device of a client device in an on-demand database service environment, in accordance with some implementations.

FIG. 6 shows a flow diagram of a method 600 for providing a search-based navigation interface for presentation on a display device of a client device in an on-demand database service environment, in accordance with some implementations. A database system may provide a GUI including a search input interface element for display by a client device (602). In some instances, an indication of user input may be received via the search input interface element.

The database system may search a plurality of sources to identify a set of items (604). For example, the sources can include a database storing a plurality of database records. The search may be performed based upon a variety of factors, as described herein. Where the user has submitted user input via the search input interface element, the set of items may be identified based, at least in part, on an indication of the user input received via the search input interface element of the GUI. The set of items may also be identified based, at least in part, on an organizational filter and/or context such as a web page on which the GUI is rendered (e.g., a record identifier associated with the web page) or contents thereof.

Each item of the set of items may correspond to at least one object of one of a plurality of object types. The object types may include at least one of: an application of the database system, a database record of the database system, a database record of a particular record type, an action to be performed with respect to at least one database record of the database system, a web page of the database system, a calendar of the user maintained by the database system, or a calendar entry of the calendar of the user. For example, an item may correspond to a single database record or a list of database records. An action may be a global action not pertaining to a particular record of the database system. Alternatively, an action may pertain to a particular database record of the database system.

The database system may provide a user interface object including one or more user-selectable options for display by the client device in proximity to the search input interface element (606), where each of the user-selectable options corresponds to a different item of the set of items. In some implementations, the user interface object includes two or more sections, where each of the sections includes one or more of the user-selectable options and corresponds to a different one of the object types. In other words, user-selectable options corresponding to items of a given object type may be limited to a single section within the user interface object. As described herein, sections may be implicit or explicit. Sections may be presented sequentially and adjacent to one another within a single vertical or horizontal (e.g., rectangular) region of the search-based interface. For example, the sections may be presented together in the form of a list of user-selectable options. The user interface object may be delineated by the single vertical or horizontal region of the search-based interface.

Responsive to an indication of a user selection of a particular one of the user-selectable options corresponding to an item of the set of items, the database system may process the item corresponding to the object(s) (608). The item may be processed based, at least in part, on the type of the object(s). More particularly, where the item is an action such as "Create Account," the database system may provide a GUI to facilitate the creation of an account database record. Alternatively, where the item corresponds to a list of multiple database records, the database system may provide access to data obtained from one or more fields of each of the database records in the list. For example, the database system may provide a user interface object or visual representation such as a table, where the rows correspond to the database records within the list and the columns of the table correspond to fields of the database records.

In some instances, the database system may process the item corresponding to an object by providing access to the corresponding object. Where the object includes a particular database record, the database system may provide access to the corresponding object by providing a preview of the particular database record. For example, the preview may be provided in close proximity to or adjacent to the particular user-selectable option that has been selected. In addition, the database system may provide access to the corresponding object by providing a web page including data obtained or derived from the corresponding object.

In some implementations, the database system may provide access to the corresponding object (e.g., database record) by providing, adjacent to the particular user-selectable option, one or more columns. As described above, the user may select the particular user-selectable option to select the corresponding object. Responsive to an indication of a successive user interaction with the particular user-selectable option or associated column, the database system may provide access to contents of a successive one of the columns. For example, the user may use a "tab" key to access to the next column in a row corresponding to the selected object. A column may include, for example, a hypertext link to the object, a preview of the object, or information pertaining to or related to the object. For example, where the object is a database record, at least one of the columns can include data obtained from one or more fields of the database record.

In some instances, the object may include an action. In response to the selection of the action, the database system may facilitate execution of the action. This may include, for example, providing a user interface object that enables the user to complete the action. An action that does not pertain to a particular database record can include, for example, "Create New Account" or "Open New Case." Thus, an action may include the creation of a database record of a particular database record type. The database system may provide a user interface object to facilitate the creation of a database record of the particular database record type. For example, where the action includes "Create New Account," the database system may provide a GUI configured to receive user input in relation to the Account database record type.

In other instances, the action may pertain to a particular record of the database system. For example, the action may include "Delete" or "Forward." By selecting the action, the user may cause an action to be performed in relation to the particular record. In some instances, this may include providing a user interface object that enables the user to complete the action, as described above.

Figure 7:
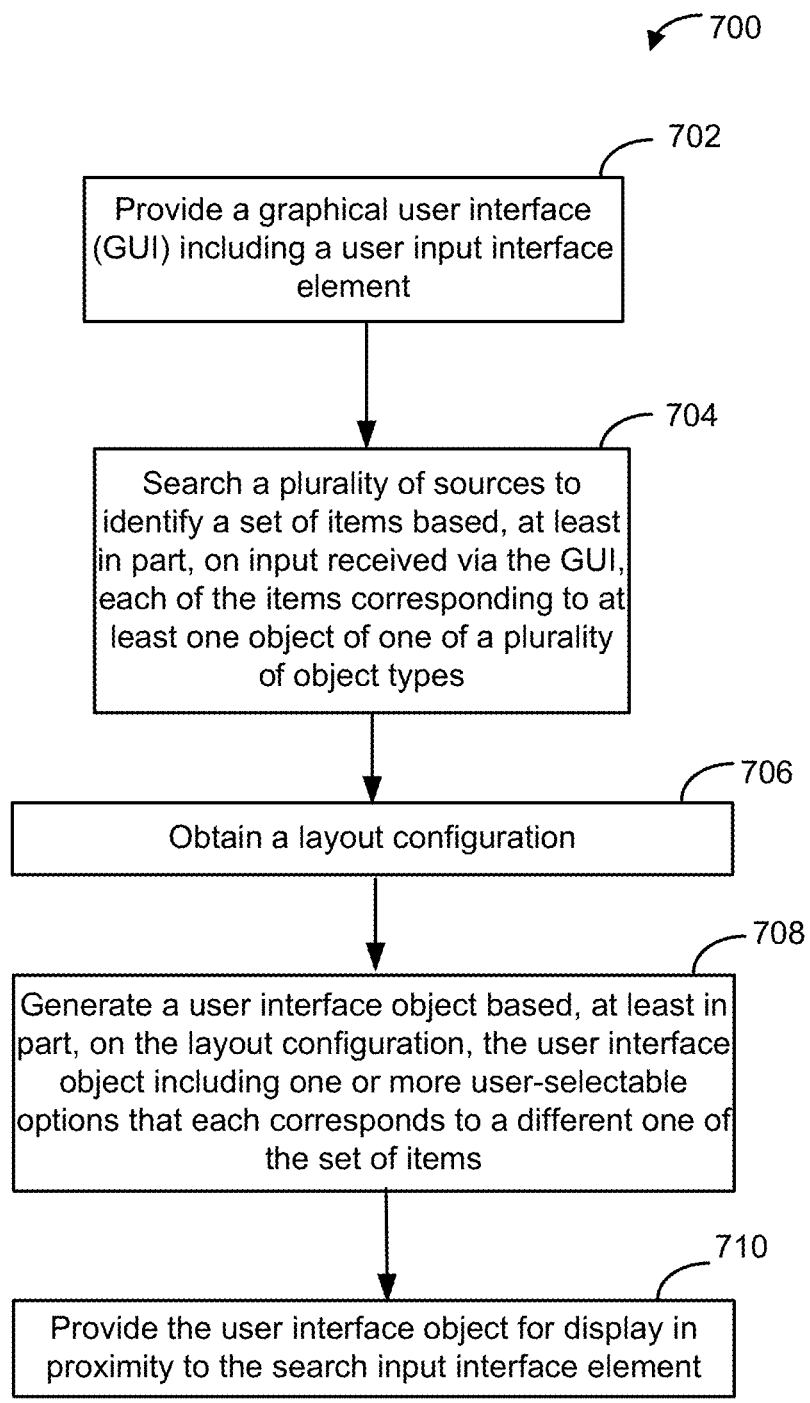
FIG. 7 shows a flow diagram of a method 700 for providing a configurable search-based navigation interface for presentation on a display device of a client device in an on-demand database service environment, in accordance with some implementations.

In some implementations, the search-based navigation interface is configurable. FIG. 7 shows a flow diagram of a method 700 for providing a configurable search-based navigation interface for presentation on a display device of a client device in an on-demand database service environment, in accordance with some implementations. The database system may provide a GUI including a search input interface element for display by a client device (702). Where the user submits user input via the search input interface element, the database system may obtain an indication of the user input received via the search input interface element.

The database system may then search a plurality of sources to identify a set of items based, at least in part on input received via the GUI (704). The search results may be obtained in response to user input such as a search query. Alternatively, the search results may be obtained from a "zero state" in which the user has not submitted input.

As described herein, the database system may search a plurality of sources. Each of the sources may include or store items of one or more corresponding object types. The search may be performed based, at least in part, on user input, a context of the GUI, and/or an organizational filter, as described above.

Each of the items may correspond to at least one object of one of a plurality of object types. The object types can include, but are not limited to, an application of the database system, a database record of the database system, a database record of a particular record type, an action to be performed with respect to at least one database record of the database system, or a calendar entry in a calendar of the database system. Therefore, items such as database records may be identified and presented using a search-based user interface.

The database system may obtain a layout configuration (706). A layout configuration may include or be derived from a set of rules, as described herein. The layout configuration may be obtained via a GUI such as that described above with reference to FIG. 2K. Alternatively, the layout configuration may be retrieved from memory. For example, the layout configuration may be stored in a file in association with the user, the user's team or group, the organization, or another entity.

The layout configuration may pertain to at least one of the object types. More particularly, the layout configuration may specify or otherwise indicate a quantity of objects for which to present items corresponding to a particular one of the object types. For example, the layout configuration may specify or indicate a quantity of database records for which to present items within the user interface object or a quantity of database records of a particular record type for which to present items within the user interface object.

In some implementations, the layout configuration may indicate the quantity of objects for which to present items for a particular one of the object types via a particular numerical value. More particularly, the layout configuration may indicate or specify a numerical value that indicates a minimum quantity of objects of the particular object type to be presented or a maximum quantity of objects of the particular object type to be presented.

In some implementations, the sources may be searched based, at least in part, on the layout configuration. More particularly, at least a portion of the items may be selected based, at least in part, on the layout configuration. Alternatively, items that have been identified may be filtered based, at least in part, on the layout configuration. For example, where the layout configuration indicates a minimum quantity of objects of a particular object type to be presented, the database system may ensure that the minimum quantity of objects of the particular object type is selected for presentation. As another example, where the layout configuration indicates a maximum quantity of objects of a particular object type to be presented, the database system may ensure that no more than the maximum quantity of objects of the particular object type is selected for presentation.

In some implementations, the sources that are searched may be selected based, at least in part, on the layout configuration. For example, where the layout configuration mandates that no items of a particular object type be presented, source(s) that include that particular object type may be excluded from the searching process. As another example, where the layout configuration indicates that a minimum number of items of a particular object type be presented, the source(s) may include those that include items of the particular object type.

The database system may generate a user interface object based, at least in part, on the layout configuration (708) and provide the user interface object for display by the client device in proximity to the search input interface element (710). For example, the layout configuration may specify or indicate a first quantity of objects for which to present items corresponding to a first one of the object types and a second quantity of objects for which to present items corresponding to a second one of the object types.

The user interface object may include two or more sections, where each of the sections corresponds to a different one of the plurality of object types. More particularly, the number of items in a first one of the sections corresponding to the first object type may be determined based, at least in part, on the first quantity indicated in the layout configuration, while the number of items in a second one of the sections corresponding to the second object type may be determined based, at least in part, on the second quantity indicated in the layout configuration. Each of the sections may include one or more user-selectable options that each corresponds to a different item of the corresponding object type. A user may proceed to interact with the user-selectable options, as described herein.

While the examples described above pertain primarily to the identification and presentation of items corresponding to objects, these examples are merely illustrative. Thus, suggested queries may also be identified and presented in a similar manner using similar processes.

According to various implementations, a search-based navigation interface of a web-based application or browser service enables a user to "navigate" within a web site using a search-based rather than a click-based user interface. By providing a single search-based navigation interface, a user may identify, access, and interact with objects of various object types in an efficient manner. Since a user may take action immediately by interacting with a "search result" rendered within the search-based navigation interface, the user may complete tasks within minimal effort and user input. This is particular advantageous for tasks that would otherwise be tedious to complete using a click-based navigation interface. Therefore, a user may achieve a desired result with minimal user input in a timely manner.

In some implementations, the database system provides access to items corresponding to database records within the search-based navigation interface. As a result, a user can access and act on database records using a text-based search. Since it can take numerous clicks to access a desired database record in a traditional click-based navigation interface, the disclosed implementations facilitate access to and interaction with database records while minimizing processing and memory resources consumed by the database system, as well as by the client device via which the user interacts with the navigation interface.

The disclosed implementations can be implemented in systems that maintain database records of any number of database record types. These can include, for example, custom database record types that include custom fields. Therefore, the disclosed implementations are scalable to accommodate systems of various sizes, capacities, and complexities.

In some of the examples described above, it is assumed that the user submits input via the search-based navigation interface, which is used by the server(s) to obtain search results. However, it is important to note that these examples are merely illustrative. In other implementations, the server(s) may obtain and provide search results that are relevant to the user in the absence of user input via the search-based user interface.

Although various implementations are described, these implementations are merely illustrative. Various features disclosed herein may be used separately or in combination with one another. Therefore, various implementations may enable servers to perform a search, generate and provide a user interface object corresponding to results of the search, and process input in relation to the user interface object according any combination of features described herein.

Some implementations may incorporate various technologies for constructing pages. For example, one or more components or pages may be constructed using Lumen, Ext, ExtJS, Flex, and/or VisualForce™ technologies available from Salesforce.com®. As another example, one or more components or pages may be constructed using Flash, Ajax, HTML, JavaScript®, or other publicly available technologies.

In some implementations, one or more technologies developed by Salesforce.com®, such as the Web Services API, VisualForce™, and/or Apex Service-oriented Architecture ("SOA") may be used to display and/or integrate disparate data sources from across multiple systems. The apparatus and methods described herein may be designed or configured for use with various web browsers, such as IE 7+, Firefox 3.5+, Safari, etc.

In some implementations, performance may be improved by optimizing pages for high performance in a browser environment. Some web analytics and/or on-line business optimization platforms such as Omniture® may be used to measure the performance and adjust it as needed. In some embodiments, a network operations center ("NOC") may be used to monitor performance and react quickly to performance degradation.

Ext is a JavaScript® platform developed by Salesforce-.com® that includes a broad variety of UI components that can be used to develop highly interactive browser UIs. Ext may allow a complex layout. It also has a well-defined event model which facilitates component communication. JavaScript components may be created by subclassing Ext's components.

In some implementations, some or all of the content viewable through the service cloud console will be inside of HTML iframes. The content included inside HTML iframes may include, but is not limited to: detail/edit pages, enhanced list views, customer and Salesforce®-created VisualForce™ pages and any random sites that customers put into custom links. HTML iframes may be useful because they may facilitate putting content of multiple detail/edit pages on the same browser page. Without iframes, for example, there may be conflicting ids and/or broken JavaScript®.

In some implementations, the client machine may communicate with a server via Ajax. The workspace context panel may display a layout-driven grid of fields from the detail page to the user. The HTML for these fields may differ from that in the Detail page because, for example, some complex elements (e.g., lookup) may have specific HTML IDs and output JavaScript® that references those HTML IDs. In order to reconstruct those elements and reassign HTML IDs to redisplay them, the workspace context panel may request the HTML for its fields from a servlet that resolves the HTML ID and JavaScript® issues.

While the present embodiments are described with reference to an on-demand service environment capable of supporting multiple tenants, these embodiments are not limited to multi-tenant databases or deployment on application servers. Embodiments may be practiced using other database architectures, for instance, ORACLE®, DB2® by IBM, and the like without departing from the scope of the embodiments claimed.

Techniques described or referenced herein can be implemented using or in conjunction with a social networking system. Social networking systems have become a popular way to facilitate communication among people, any of whom can be recognized as users of a social networking system. One example of a social networking system is Chatter®, provided by salesforce.com, inc. of San Francisco, Calif. salesforce.com, inc. is a provider of social networking services, CRM services and other database management services, any of which can be accessed and used in conjunction with the techniques disclosed herein in some implementations. In some but not all implementations, these various services can be provided in a cloud computing environment, for example, in the context of a multi-tenant database system. Thus, the disclosed techniques can be implemented without having to install software locally, that is, on computing devices of users interacting with services available through the cloud. While the disclosed implementations are often described with reference to Chatter®, those skilled in the art should understand that the disclosed techniques are neither limited to Chatter® nor to any other services and systems provided by salesforce.com, inc. and can be implemented in the context of various other database systems and/or social networking systems such as Facebook®, LinkedIn®, Twitter®, Google+®, Yammer® and Jive® by way of example only.

Some social networking systems can be implemented in various settings, including organizations. For instance, a social networking system can be implemented to connect users within an enterprise such as a company or business partnership, or a group of users within such an organization. For instance, Chatter® can be used by employee users in a division of a business organization to share data, communicate, and collaborate with each other for various social purposes often involving the business of the organization. In the example of a multi-tenant database system, each organization or group within the organization can be a respective tenant of the system, as described in greater detail below.

In some social networking systems, users can access one or more social network feeds, which include information updates presented as items or entries in the feed. Such a feed item can include a single information update or a collection of individual information updates. A feed item can include various types of data including character-based data, audio data, image data and/or video data. A social network feed can be displayed in a graphical user interface (GUI) on a display device such as the display of a computing device as described below. The information updates can include various social network data from various sources and can be stored in a database system. In some but not all implementations, the disclosed methods, apparatus, systems, and computer program products may be configured or designed for use in a multi-tenant database environment.

In some implementations, a social networking system may allow a user to follow data objects in the form of CRM records such as cases, accounts, or opportunities, in addition to following individual users and groups of users. The "following" of a record stored in a database, as described in greater detail below, allows a user to track the progress of that record when the user is subscribed to the record. Updates to the record, also referred to herein as changes to the record, are one type of information update that can occur and be noted on a social network feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be social media messages submitted by a user or can be otherwise generated in response to user actions or in response to events. Examples of social media messages include: posts, comments, indications of a user's personal preferences such as "likes" and "dislikes", updates to a user's status, uploaded files, and user-submitted hyperlinks to social network data or other network data such as various documents and/or web pages on the Internet. Posts can include alpha-numeric or other character-based user inputs such as words, phrases, statements, questions, emotional expressions, and/or symbols. Comments generally refer to responses to posts or to other information updates, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed. A user's profile feed is also referred to herein as the user's "wall," which is one example of a social network feed displayed on the user's profile page.

In some implementations, a social network feed may be specific to a group of users of a social networking system. For instance, a group of users may publish a feed. Members of the group may view and post to this group feed in accordance with a permissions configuration for the feed and the group. Information updates in a group context can also include changes to group status information.

In some implementations, when data such as posts or comments input from one or more users are submitted to a social network feed for a particular user, group, object, or other construct within a social networking system, an email notification or other type of network communication may be transmitted to all users following the user, group, or object in addition to the inclusion of the data as a feed item in one or more feeds, such as a user's profile feed, a news feed, or a record feed. In some social networking systems, the occurrence of such a notification is limited to the first instance of a published input, which may form part of a larger conversation. For instance, a notification may be transmitted for an initial post, but not for comments on the post. In some other implementations, a separate notification is transmitted for each such information update.

The term "multi-tenant database system" generally refers to those systems in which various elements of hardware and/or software of a database system may be shared by one or more customers. For example, a given application server may simultaneously process requests for a great number of customers, and a given database table may store rows of data such as feed items for a potentially much greater number of customers.

An example of a "user profile" or "user's profile" is a database object or set of objects configured to store and maintain data about a given user of a social networking system and/or database system. The data can include general information, such as name, title, phone number, a photo, a biographical summary, and a status, e.g., text describing what the user is currently doing. As mentioned below, the data can include social media messages created by other users. Where there are multiple tenants, a user is typically associated with a particular tenant. For example, a user could be a salesperson of a company, which is a tenant of the database system that provides a database service.

The term "record" generally refers to a data entity having fields with values and stored in database system. An example of a record is an instance of a data object created by a user of the database service, for example, in the form of a CRM record about a particular (actual or potential) business relationship or project. The record can have a data structure defined by the database service (a standard object) or defined by a user (custom object). For example, a record can be for a business partner or potential business partner (e.g., a client, vendor, distributor, etc.) of the user, and can include information describing an entire company, subsidiaries, or contacts at the company. As another example, a record can be a project that the user is working on, such as an opportunity (e.g., a possible sale) with an existing partner, or a project that the user is trying to get. In one implementation of a multi-tenant database system, each record for the tenants has a unique identifier stored in a common table. A record has data fields that are defined by the structure of the object (e.g., fields of certain data types and purposes). A record can also have custom fields defined by a user. A field can be another record or include links thereto, thereby providing a parent-child relationship between the records.

The terms "social network feed" and "feed" are used interchangeably herein and generally refer to a combination (e.g., a list) of feed items or entries with various types of information and data. Such feed items can be stored and maintained in one or more database tables, e.g., as rows in the table(s), that can be accessed to retrieve relevant information to be presented as part of a displayed feed. The term "feed item" (or feed element) generally refers to an item of information, which can be presented in the feed such as a post submitted by a user. Feed items of information about a user can be presented in a user's profile feed of the database, while feed items of information about a record can be presented in a record feed in the database, by way of example. A profile feed and a record feed are examples of different types of social network feeds. A second user following a first user and a record can receive the feed items associated with the first user and the record for display in the second user's news feed, which is another type of social network feed. In some implementations, the feed items from any number of followed users and records can be combined into a single social network feed of a particular user.

As examples, a feed item can be a social media message, such as a user-generated post of text data, and a feed tracked update to a record or profile, such as a change to a field of the record. Feed tracked updates are described in greater detail below. A feed can be a combination of social media messages and feed tracked updates. Social media messages include text created by a user, and may include other data as well. Examples of social media messages include posts, user status updates, and comments. Social media messages can be created for a user's profile or for a record. Posts can be created by various users, potentially any user, although some restrictions can be applied. As an example, posts can be made to a wall section of a user's profile page (which can include a number of recent posts) or a section of a record that includes multiple posts. The posts can be organized in chronological order when displayed in a GUI, for instance, on the user's profile page, as part of the user's profile feed. In contrast to a post, a user status update changes a status of a user and can be made by that user or an administrator. A record can also have a status, the update of which can be provided by an owner of the record or other users having suitable write access permissions to the record. The owner can be a single user, multiple users, or a group.

In some implementations, a comment can be made on any feed item. In some implementations, comments are organized as a list explicitly tied to a particular feed tracked update, post, or status update. In some implementations, comments may not be listed in the first layer (in a hierarchal sense) of feed items, but listed as a second layer branching from a particular first layer feed item.

A "feed tracked update," also referred to herein as a "feed update," is one type of information update and generally refers to data representing an event. A feed tracked update can include text generated by the database system in response to the event, to be provided as one or more feed items for possible inclusion in one or more feeds. In one implementation, the data can initially be stored, and then the database system can later use the data to create text for describing the event. Both the data and/or the text can be a feed tracked update, as used herein. In various implementations, an event can be an update of a record and/or can be triggered by a specific action by a user. Which actions trigger an event can be configurable. Which events have feed tracked updates created and which feed updates are sent to which users can also be configurable. Social media messages and other types of feed updates can be stored as a field or child object of the record. For example, the feed can be stored as a child object of the record.

A "group" is generally a collection of users. In some implementations, the group may be defined as users with a same or similar attribute, or by membership. In some implementations, a "group feed", also referred to herein as a "group news feed", includes one or more feed items about any user in the group. In some implementations, the group feed also includes information updates and other feed items that are about the group as a whole, the group's purpose, the group's description, and group records and other objects stored in association with the group. Threads of information updates including group record updates and social media messages, such as posts, comments, likes, etc., can define group conversations and change over time.

An "entity feed" or "record feed" generally refers to a feed of feed items about a particular record in the database. Such feed items can include feed tracked updates about changes to the record and posts made by users about the record. An entity feed can be composed of any type of feed item. Such a feed can be displayed on a page such as a web page associated with the record, e.g., a home page of the record. As used herein, a "profile feed" or "user's profile feed" generally refers to a feed of feed items about a particular user. In one example, the feed items for a profile feed include posts and comments that other users make about or send to the particular user, and status updates made by the particular user. Such a profile feed can be displayed on a page associated with the particular user. In another example, feed items in a profile feed could include posts made by the particular user and feed tracked updates initiated based on actions of the particular user.

Some non-limiting examples of systems, apparatus, and methods are described below for implementing database systems and enterprise level social networking systems in conjunction with the disclosed techniques. Such implementations can provide more efficient use of a database system. For instance, a user of a database system may not easily know when important information in the database has changed, e.g., about a project or client. Such implementations can provide feed tracked updates about such changes and other events, thereby keeping users informed.

Figure 8A:
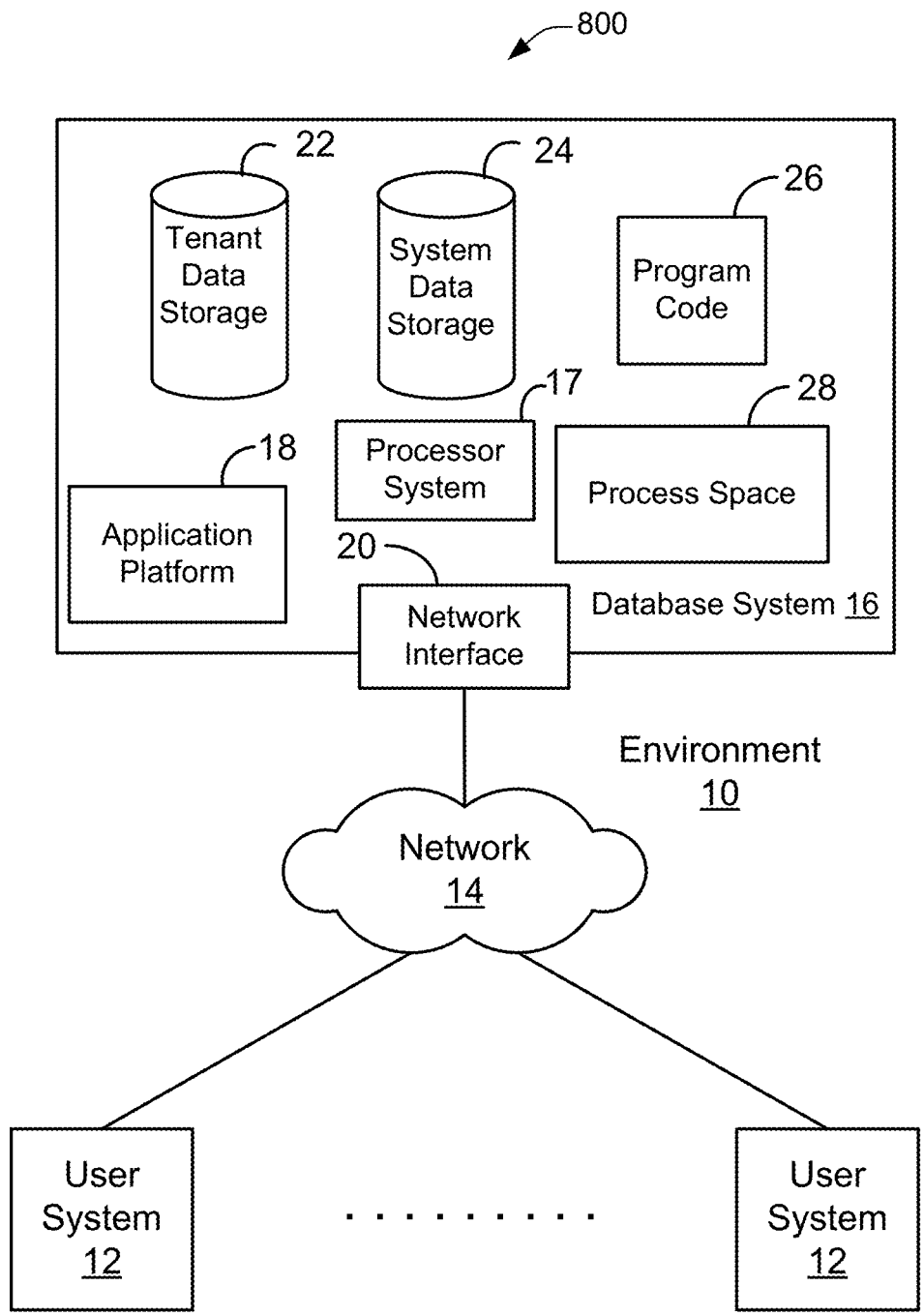
FIG. 8A shows a block diagram of an example of an environment 800 in which an on-demand database service can be used, in accordance with some implementations.

FIG. 8A shows a block diagram of an example of an environment 800 in which an on-demand database service can be used, in accordance with some implementations. Environment 10 may include user systems 12, network 14, database system 16, processor system 17, application platform 18, network interface 20, tenant data storage 22, system data storage 24, program code 26, and process space 28. In other implementations, environment 10 may not have all of these components and/or may have other components instead of, or in addition to, those listed above.

A user system 12 may be implemented as any computing device(s) or other data processing apparatus such as a machine or system used by a user to access a database system 16. For example, any of user systems 12 can be a handheld and/or portable computing device such as a mobile phone, a smartphone, a laptop computer, or a tablet. Other examples of a user system include computing devices such as a work station and/or a network of computing devices. As illustrated in FIG. 8A (and in more detail in FIG. 8B) user systems 12 might interact via a network 14 with an on-demand database service, which is implemented in the example of FIG. 8A as database system 16.

An on-demand database service, implemented using system 16 by way of example, is a service that is made available to users who do not need to necessarily be concerned with building and/or maintaining the database system. Instead, the database system may be available for their use when the users need the database system, i.e., on the demand of the users. Some on-demand database services may store information from one or more tenants into tables of a common database image to form a multi-tenant database system (MTS). A database image may include one or more database objects. A relational database management system (RDBMS) or the equivalent may execute storage and retrieval of information against the database object(s). Application platform 18 may be a framework that allows the applications of system 16 to run, such as the hardware and/or software, e.g., the operating system. In some implementations, application platform 18 enables creation, managing and executing one or more applications developed by the provider of the on-demand database service, users accessing the on-demand database service via user systems 12, or third party application developers accessing the on-demand database service via user systems 12.

The users of user systems 12 may differ in their respective capacities, and the capacity of a particular user system 12 might be entirely determined by permissions (permission levels) for the current user. For example, when a salesperson is using a particular user system 12 to interact with system 16, the user system has the capacities allotted to that salesperson. However, while an administrator is using that user system to interact with system 16, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level, also called authorization.

Network 14 is any network or combination of networks of devices that communicate with one another. For example, network 14 can be any one or any combination of a LAN (local area network), WAN (wide area network), telephone network, wireless network, point-to-point network, star network, token ring network, hub network, or other appropriate configuration. Network 14 can include a TCP/IP (Transfer Control Protocol and Internet Protocol) network, such as the global internetwork of networks often referred to as the Internet. The Internet will be used in many of the examples herein. However, it should be understood that the networks that the present implementations might use are not so limited.

User systems 12 might communicate with system 16 using TCP/IP and, at a higher network level, use other common Internet protocols to communicate, such as HTTP, FTP, AFS, WAP, etc. In an example where HTTP is used, user system 12 might include an HTTP client commonly referred to as a "browser" for sending and receiving HTTP signals to and from an HTTP server at system 16. Such an HTTP server might be implemented as the sole network interface 20 between system 16 and network 14, but other techniques might be used as well or instead. In some implementations, the network interface 20 between system 16 and network 14 includes load sharing functionality, such as round-robin HTTP request distributors to balance loads and distribute incoming HTTP requests evenly over a plurality of servers. At least for users accessing system 16, each of the plurality of servers has access to the MTS' data; however, other alternative configurations may be used instead.

In one implementation, system 16, shown in FIG. 8A, implements a web-based CRM system. For example, in one implementation, system 16 includes application servers configured to implement and execute CRM software applications as well as provide related data, code, forms, web pages and other information to and from user systems 12 and to store to, and retrieve from, a database system related data, objects, and Webpage content. With a multi-tenant system, data for multiple tenants may be stored in the same physical database object in tenant data storage 22, however, tenant data typically is arranged in the storage medium(s) of tenant data storage 22 so that data of one tenant is kept logically separate from that of other tenants so that one tenant does not have access to another tenant's data, unless such data is expressly shared. In certain implementations, system 16 implements applications other than, or in addition to, a CRM application. For example, system 16 may provide tenant access to multiple hosted (standard and custom) applications, including a CRM application. User (or third party developer) applications, which may or may not include CRM, may be supported by the application platform 18, which manages creation, storage of the applications into one or more database objects and executing of the applications in a virtual machine in the process space of the system 16.

Figure 8B:
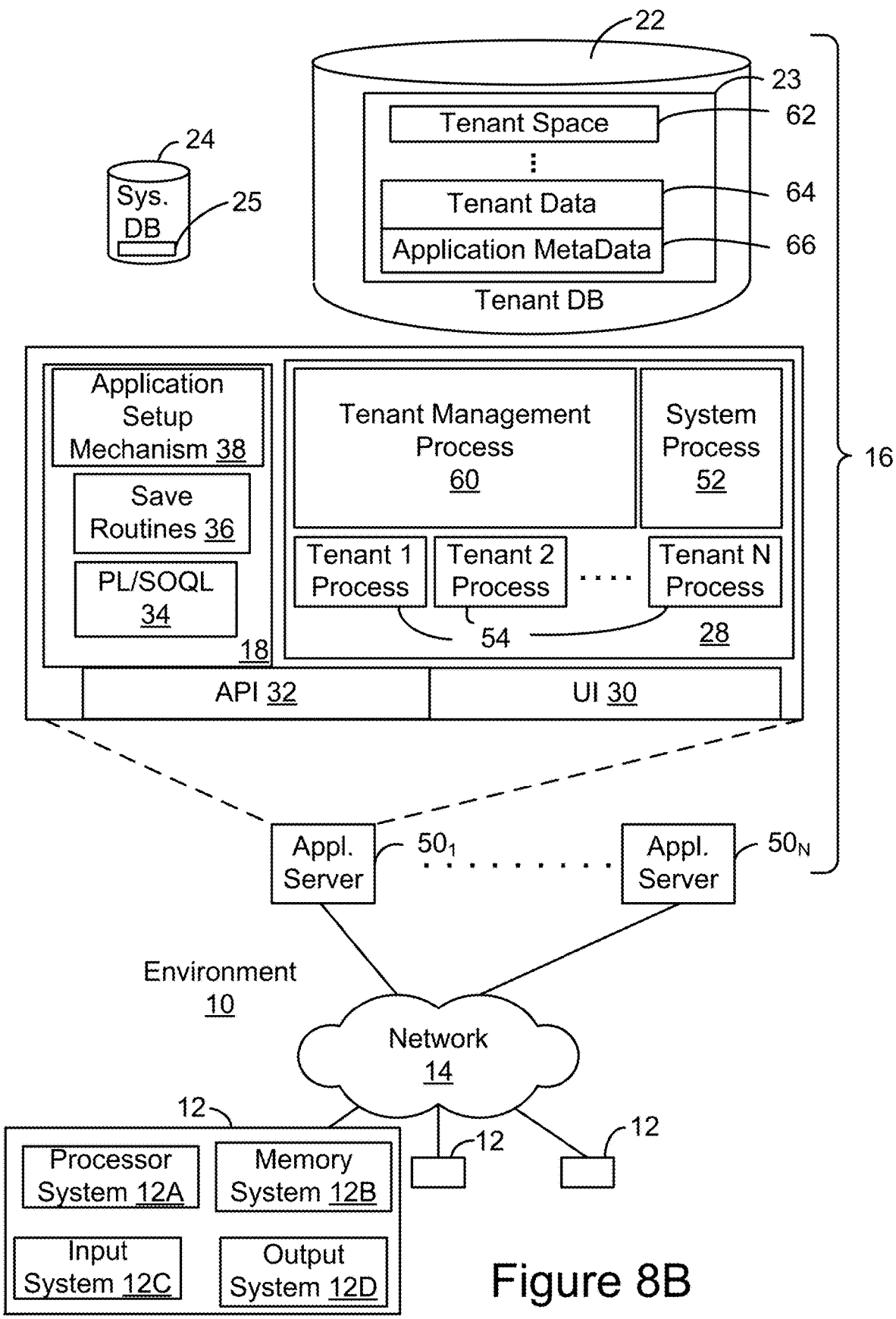
FIG. 8B shows a block diagram of an example of some implementations of elements of FIG. 8A and various possible interconnections between these elements, in accordance with some implementations.

One arrangement for elements of system 16 is shown in FIGS. 8A and 8B, including a network interface 20, application platform 18, tenant data storage 22 for tenant data 23, system data storage 24 for system data 25 accessible to system 16 and possibly multiple tenants, program code 26 for implementing various functions of system 16, and a process space 28 for executing MTS system processes and tenant-specific processes, such as running applications as part of an application hosting service. Additional processes that may execute on system 16 include database indexing processes.

Several elements in the system shown in FIG. 8A include conventional, well-known elements that are explained only briefly here. For example, each user system 12 could include a desktop personal computer, workstation, laptop, PDA, cell phone, or any wireless access protocol (WAP) enabled device or any other computing device capable of interfacing directly or indirectly to the Internet or other network connection. The term "computing device" is also referred to herein simply as a "computer". User system 12 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 12 to access, process and view information, pages and applications available to it from system 16 over network 14. Each user system 12 also typically includes one or more user input devices, such as a keyboard, a mouse, trackball, touch pad, touch screen, pen or the like, for interacting with a GUI provided by the browser on a display (e.g., a monitor screen, LCD display, OLED display, etc.) of the computing device in conjunction with pages, forms, applications and other information provided by system 16 or other systems or servers. Thus, "display device" as used herein can refer to a display of a computer system such as a monitor or touch-screen display, and can refer to any computing device having display capabilities such as a desktop computer, laptop, tablet, smartphone, a television set-top box, or wearable device such Google Glass® or other human body-mounted display apparatus. For example, the display device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

According to one implementation, each user system 12 and all of its components are operator configurable using applications, such as a browser, including computer code run using a central processing unit such as an Intel Pentium® processor or the like. Similarly, system 16 (and additional instances of an MTS, where more than one is present) and all of its components might be operator configurable using application(s) including computer code to run using processor system 17, which may be implemented to include a central processing unit, which may include an Intel Pentium® processor or the like, and/or multiple processor units. Non-transitory computer-readable media can have instructions stored thereon/in, that can be executed by or used to program a computing device to perform any of the methods of the implementations described herein. Computer program code 26 implementing instructions for operating and configuring system 16 to intercommunicate and to process web pages, applications and other data and media content as described herein is preferably downloadable and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any other type of computer-readable medium or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for the disclosed implementations can be realized in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to refer to one type of computing device such as a system including processing hardware and process space(s), an associated storage medium such as a memory device or database, and, in some instances, a database application (e.g., OODBMS or RDBMS) as is well known in the art. It should also be understood that "server system" and "server" are often used interchangeably herein. Similarly, the database objects described herein can be implemented as single databases, a distributed database, a collection of distributed databases, a database with redundant online or offline backups or other redundancies, etc., and might include a distributed database or storage network and associated processing intelligence.

FIG. 8B shows a block diagram of an example of some implementations of elements of FIG. 8A and various possible interconnections between these elements. That is, FIG. 8B also illustrates environment 10. However, in FIG. 5B elements of system 16 and various interconnections in some implementations are further illustrated. FIG. 8B shows that user system 12 may include processor system 12A, memory system 12B, input system 12C, and output system 12D. FIG. 8B shows network 14 and system 16. FIG. 8B also shows that system 16 may include tenant data storage 22, tenant data 23, system data storage 24, system data 25, User Interface (UI) 30, Application Program Interface (API) 32, PL/SOQL 34, save routines 36, application setup mechanism 38, application servers $50_1$-$50_N$, system process space 52, tenant process spaces 54, tenant management process space 60, tenant storage space 62, user storage 64, and application metadata 66. In other implementations, environment 10 may not have the same elements as those listed above and/or may have other elements instead of, or in addition to, those listed above.

User system 12, network 14, system 16, tenant data storage 22, and system data storage 24 were discussed above in FIG. 8A. Regarding user system 12, processor system 12A may be any combination of one or more processors. Memory system 12B may be any combination of one or more memory devices, short term, and/or long term memory. Input system 12C may be any combination of input devices, such as one or more keyboards, mice, trackballs, scanners, cameras, and/or interfaces to networks. Output system 12D may be any combination of output devices, such as one or more monitors, printers, and/or interfaces to networks. As shown by FIG. 8B, system 16 may include a network interface 20 (of FIG. 8A) implemented as a set of application servers 50, an application platform 18, tenant data storage 22, and system data storage 24. Also shown is system process space 52, including individual tenant process spaces 54 and a tenant management process space 60. Each application server 50 may be configured to communicate with tenant data storage 22 and the tenant data 23 therein, and system data storage 24 and the system data 25 therein to serve requests of user systems 12. The tenant data 23 might be divided into individual tenant storage spaces 62, which can be either a physical arrangement and/or a logical arrangement of data. Within each tenant storage space 62, user storage 64 and application metadata 66 might be similarly allocated for each user. For example, a copy of a user's most recently used (MRU) items might be stored to user storage 64. Similarly, a copy of MRU items for an entire organization that is a tenant might be stored to tenant storage space 62. A UI 30 provides a user interface and an API 32 provides an application programmer interface to system 16 resident processes to users and/or developers at user systems 12. The tenant data and the system data may be stored in various databases, such as one or more Oracle® databases.

Application platform 18 includes an application setup mechanism 38 that supports application developers' creation and management of applications, which may be saved as metadata into tenant data storage 22 by save routines 36 for execution by subscribers as one or more tenant process spaces 54 managed by tenant management process 60 for example. Invocations to such applications may be coded using PL/SOQL 34 that provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications may be detected by one or more system processes, which manage retrieving application metadata 66 for the subscriber making the invocation and executing the metadata as an application in a virtual machine.

Each application server 50 may be communicably coupled to database systems, e.g., having access to system data 25 and tenant data 23, via a different network connection. For example, one application server $50_1$ might be coupled via the network 14 (e.g., the Internet), another application server $50_{N-1}$ might be coupled via a direct network link, and another application server $50_N$ might be coupled by yet a different network connection. Transfer Control Protocol and Internet Protocol (TCP/IP) are typical protocols for communicating between application servers 50 and the database system. However, it will be apparent to one skilled in the art that other transport protocols may be used to optimize the system depending on the network interconnect used.

In certain implementations, each application server 50 is configured to handle requests for any user associated with any organization that is a tenant. Because it is desirable to be able to add and remove application servers from the server pool at any time for any reason, there is preferably no server affinity for a user and/or organization to a specific application server 50. In one implementation, therefore, an interface system implementing a load balancing function (e.g., an F5 Big-IP load balancer) is communicably coupled between the application servers 50 and the user systems 12 to distribute requests to the application servers 50. In one implementation, the load balancer uses a least connections algorithm to route user requests to the application servers 50. Other examples of load balancing algorithms, such as round robin and observed response time, also can be used. For example, in certain implementations, three consecutive requests from the same user could hit three different application servers 50, and three requests from different users could hit the same application server 50. In this manner, by way of example, system 16 is multi-tenant, wherein system 16 handles storage of, and access to, different objects, data and applications across disparate users and organizations.

As an example of storage, one tenant might be a company that employs a sales force where each salesperson uses system 16 to manage their sales process. Thus, a user might maintain contact data, leads data, customer follow-up data, performance data, goals and progress data, etc., all applicable to that user's personal sales process (e.g., in tenant data storage 22). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 16 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 16 might also maintain system level data usable by multiple tenants or other data. Such system level data might include industry reports, news, postings, and the like that are sharable among tenants.

In certain implementations, user systems 12 (which may be client systems) communicate with application servers 50 to request and update system-level and tenant-level data from system 16 that may involve sending one or more queries to tenant data storage 22 and/or system data storage 24. System 16 (e.g., an application server 50 in system 16) automatically generates one or more SQL statements (e.g., one or more SQL queries) that are designed to access the desired information. System data storage 24 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for case, account, contact, lead, and opportunity data objects, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In certain implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Figure 9A:
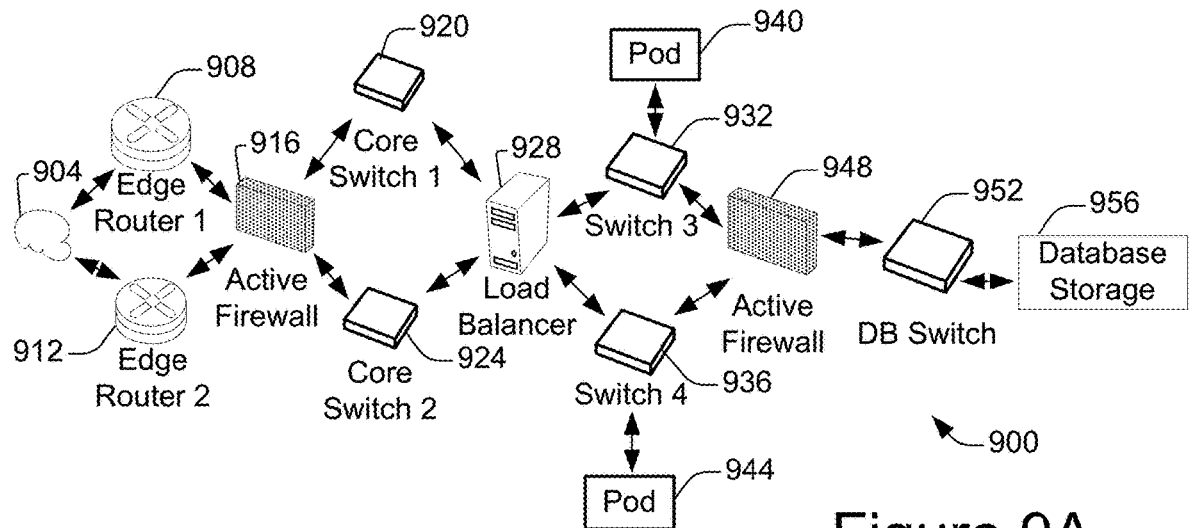
FIG. 9A shows a system diagram of an example of architectural components of an on-demand database service environment 900, in accordance with some implementations.

FIG. 9A shows a system diagram of an example of architectural components of an on-demand database service environment 900, in accordance with some implementations. A client machine located in the cloud 904, generally referring to one or more networks in combination, as described herein, may communicate with the on-demand database service environment via one or more edge routers 908 and 912. A client machine can be any of the examples of user systems 12 described above. The edge routers may communicate with one or more core switches 920 and 924 via firewall 916. The core switches may communicate with a load balancer 928, which may distribute server load over different pods, such as the pods 940 and 944. The pods 940 and 944, which may each include one or more servers and/or other computing resources, may perform data processing and other operations used to provide on-demand services. Communication with the pods may be conducted via pod switches 932 and 936. Components of the on-demand database service environment may communicate with a database storage 956 via a database firewall 948 and a database switch 952.

Figure 9B:
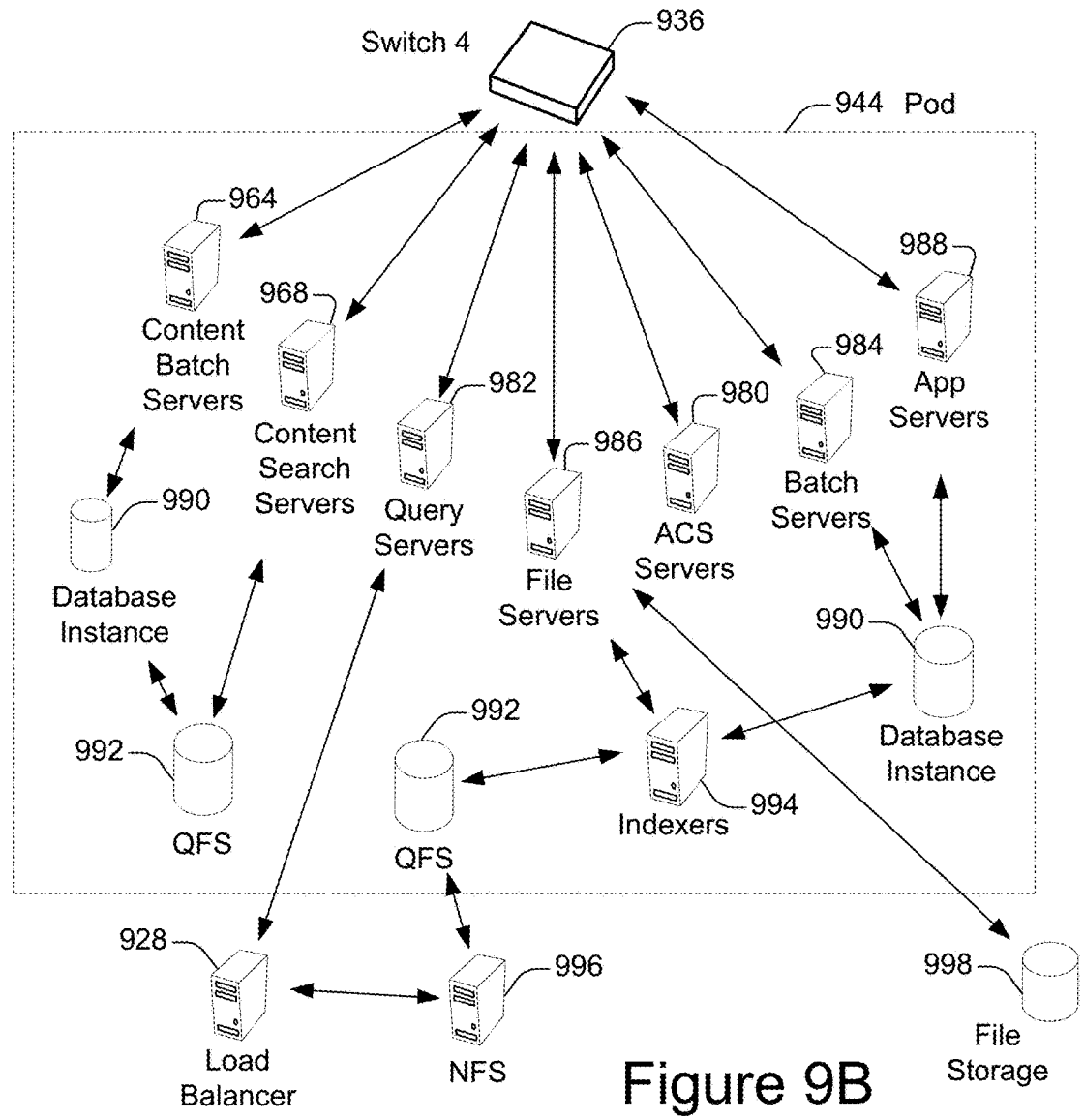
FIG. 9B shows a system diagram further illustrating an example of architectural components of an on-demand database service environment, in accordance with some implementations.

As shown in FIGS. 9A and 9B, accessing an on-demand database service environment may involve communications transmitted among a variety of different hardware and/or software components. Further, the on-demand database service environment 900 is a simplified representation of an actual on-demand database service environment. For example, while only one or two devices of each type are shown in FIGS. 9A and 9B, some implementations of an on-demand database service environment may include anywhere from one to many devices of each type. Also, the on-demand database service environment need not include each device shown in FIGS. 9A and 9B, or may include additional devices not shown in FIGS. 9A and 9B.

Moreover, one or more of the devices in the on-demand database service environment 900 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 904 is intended to refer to a data network or combination of data networks, often including the Internet. Client machines located in the cloud 904 may communicate with the on-demand database service environment to access services provided by the on-demand database service environment. For example, client machines may access the on-demand database service environment to retrieve, store, edit, and/or process information.

In some implementations, the edge routers 908 and 912 route packets between the cloud 904 and other components of the on-demand database service environment 900. The edge routers 908 and 912 may employ the Border Gateway Protocol (BGP). The BGP is the core routing protocol of the Internet. The edge routers 908 and 912 may maintain a table of IP networks or 'prefixes', which designate network reachability among autonomous systems on the Internet.

In one or more implementations, the firewall 916 may protect the inner components of the on-demand database service environment 900 from Internet traffic. The firewall 916 may block, permit, or deny access to the inner components of the on-demand database service environment 900 based upon a set of rules and other criteria. The firewall 916 may act as one or more of a packet filter, an application gateway, a stateful filter, a proxy server, or any other type of firewall.

In some implementations, the core switches 920 and 924 are high-capacity switches that transfer packets within the on-demand database service environment 900. The core switches 920 and 924 may be configured as network bridges that quickly route data between different components within the on-demand database service environment. In some implementations, the use of two or more core switches 920 and 924 may provide redundancy and/or reduced latency.

In some implementations, the pods 940 and 944 may perform the core data processing and service functions provided by the on-demand database service environment. Each pod may include various types of hardware and/or software computing resources. An example of the pod architecture is discussed in greater detail with reference to FIG. 6B.

In some implementations, communication between the pods 940 and 944 may be conducted via the pod switches 932 and 936. The pod switches 932 and 936 may facilitate communication between the pods 940 and 944 and client machines located in the cloud 904, for example via core switches 920 and 924. Also, the pod switches 932 and 936 may facilitate communication between the pods 940 and 944 and the database storage 956.

In some implementations, the load balancer 928 may distribute workload between the pods 940 and 944. Balancing the on-demand service requests between the pods may assist in improving the use of resources, increasing throughput, reducing response times, and/or reducing overhead. The load balancer 928 may include multilayer switches to analyze and forward traffic.

In some implementations, access to the database storage 956 may be guarded by a database firewall 948. The database firewall 948 may act as a computer application firewall operating at the database application layer of a protocol stack. The database firewall 948 may protect the database storage 956 from application attacks such as structure query language (SQL) injection, database rootkits, and unauthorized information disclosure.

In some implementations, the database firewall 948 may include a host using one or more forms of reverse proxy services to proxy traffic before passing it to a gateway router. The database firewall 948 may inspect the contents of database traffic and block certain content or database requests. The database firewall 948 may work on the SQL application level atop the TCP/IP stack, managing applications' connection to the database or SQL management interfaces as well as intercepting and enforcing packets traveling to or from a database network or application interface.

In some implementations, communication with the database storage 956 may be conducted via the database switch 952. The multi-tenant database storage 956 may include more than one hardware and/or software components for handling database queries. Accordingly, the database switch 952 may direct database queries transmitted by other components of the on-demand database service environment (e.g., the pods 940 and 944) to the correct components within the database storage 956.

In some implementations, the database storage 956 is an on-demand database system shared by many different organizations. The on-demand database service may employ a multi-tenant approach, a virtualized approach, or any other type of database approach. On-demand database services are discussed in greater detail with reference to FIGS. 9A and 9B.

FIG. 9B shows a system diagram further illustrating an example of architectural components of an on-demand database service environment, in accordance with some implementations. The pod 944 may be used to render services to a user of the on-demand database service environment 900. In some implementations, each pod may include a variety of servers and/or other systems. The pod 944 includes one or more content batch servers 964, content search servers 968, query servers 982, file servers 986, access control system (ACS) servers 980, batch servers 984, and app servers 988. Also, the pod 944 includes database instances 990, quick file systems (QFS) 992, and indexers 994. In one or more implementations, some or all communication between the servers in the pod 944 may be transmitted via the switch 936.

The content batch servers 964 may handle requests internal to the pod. These requests may be long-running and/or not tied to a particular customer. For example, the content batch servers 964 may handle requests related to log mining, cleanup work, and maintenance tasks.

The content search servers 968 may provide query and indexer functions. For example, the functions provided by the content search servers 968 may allow users to search through content stored in the on-demand database service environment.

The file servers 986 may manage requests for information stored in the file storage 998. The file storage 998 may store information such as documents, images, and basic large objects (BLOBs). By managing requests for information using the file servers 986, the image footprint on the database may be reduced.

The query servers 982 may be used to retrieve information from one or more file systems. For example, the query system 982 may receive requests for information from the app servers 988 and then transmit information queries to the NFS 996 located outside the pod.

The pod 944 may share a database instance 990 configured as a multi-tenant environment in which different organizations share access to the same database. Additionally, services rendered by the pod 944 may call upon various hardware and/or software resources. In some implementations, the ACS servers 980 may control access to data, hardware resources, or software resources.

In some implementations, the batch servers 984 may process batch jobs, which are used to run tasks at specified times. Thus, the batch servers 984 may transmit instructions to other servers, such as the app servers 988, to trigger the batch jobs.

In some implementations, the QFS 992 may be an open source file system available from Sun Microsystems® of Santa Clara, Calif. The QFS may serve as a rapid-access file system for storing and accessing information available within the pod 944. The QFS 992 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 968 and/or indexers 994 to identify, retrieve, move, and/or update data stored in the network file systems 996 and/or other storage systems.

In some implementations, one or more query servers 982 may communicate with the NFS 996 to retrieve and/or update information stored outside of the pod 944. The NFS 996 may allow servers located in the pod 944 to access information to access files over a network in a manner similar to how local storage is accessed.

In some implementations, queries from the query servers 922 may be transmitted to the NFS 996 via the load balancer 928, which may distribute resource requests over various resources available in the on-demand database service environment. The NFS 996 may also communicate with the QFS 992 to update the information stored on the NFS 996 and/or to provide information to the QFS 992 for use by servers located within the pod 944.

In some implementations, the pod may include one or more database instances 990. The database instance 990 may transmit information to the QFS 992. When information is transmitted to the QFS, it may be available for use by servers within the pod 944 without using an additional database call.

In some implementations, database information may be transmitted to the indexer 994. Indexer 994 may provide an index of information available in the database 990 and/or QFS 992. The index information may be provided to file servers 986 and/or the QFS 992.

In some implementations, one or more application servers or other servers described above with reference to FIGS. 8A and 8B include a hardware and/or software framework configurable to execute procedures using programs, routines, scripts, etc. Thus, in some implementations, one or more of application servers $50_1$-$50_N$ of FIG. 8B can be configured to initiate performance of one or more of the operations described above by instructing another computing device to perform an operation. In some implementations, one or more application servers $50_1$-$50_N$ carry out, either partially or entirely, one or more of the disclosed operations. In some implementations, app servers 988 of FIG. 9B support the construction of applications provided by the on-demand database service environment 900 via the pod 944. Thus, an app server 988 may include a hardware and/or software framework configurable to execute procedures to partially or entirely carry out or instruct another computing device to carry out one or more operations disclosed herein. In alternative implementations, two or more app servers 988 may cooperate to perform or cause performance of such operations. Any of the databases and other storage facilities described above with reference to FIGS. 8A, 8B, 9A and 9B can be configured to store lists, articles, documents, records, files, and other objects for implementing the operations described above. For instance, lists of available communication channels associated with share actions for sharing a type of data item can be maintained in tenant data storage 22 and/or system data storage 24 of FIGS. 5A and 5B. By the same token, lists of default or designated channels for particular share actions can be maintained in storage 22 and/or storage 24. In some other implementations, rather than storing one or more lists, articles, documents, records, and/or files, the databases and other storage facilities described above can store pointers to the lists, articles, documents, records, and/or files, which may instead be stored in other repositories external to the systems and environments described above with reference to FIGS. 8A, 8B, 9A and 9B.

While some of the disclosed implementations may be described with reference to a system having an application server providing a front end for an on-demand database service capable of supporting multiple tenants, the disclosed implementations are not limited to multi-tenant databases nor deployment on application servers. Some implementations may be practiced using various database architectures such as ORACLE®, DB2® by IBM and the like without departing from the scope of the implementations claimed.

It should be understood that some of the disclosed implementations can be embodied in the form of control logic using hardware and/or computer software in a modular or integrated manner. Other ways and/or methods are possible using hardware and a combination of hardware and software.

Any of the disclosed implementations may be embodied in various types of hardware, software, firmware, and combinations thereof. For example, some techniques disclosed herein may be implemented, at least in part, by computer-readable media that include program instructions, state information, etc., for performing various services and operations described herein. Examples of program instructions include both machine code, such as produced by a compiler, and files containing higher-level code that may be executed by a computing device such as a server or other data processing apparatus using an interpreter. Examples of computer-readable media include, but are not limited to: magnetic media such as hard disks, floppy disks, and magnetic tape; optical media such as flash memory, compact disk (CD) or digital versatile disk (DVD); magneto-optical media; and hardware devices specially configured to store program instructions, such as read-only memory (ROM)

devices and random access memory (RAM) devices. A computer-readable medium may be any combination of such storage devices.

Any of the operations and techniques described in this application may be implemented as software code to be executed by a processor using any suitable computer language such as, for example, Java, C++ or Perl using, for example, object-oriented techniques. The software code may be stored as a series of instructions or commands on a computer-readable medium. Computer-readable media encoded with the software/program code may be packaged with a compatible device or provided separately from other devices (e.g., via Internet download). Any such computer-readable medium may reside on or within a single computing device or an entire computer system, and may be among other computer-readable media within a system or network. A computer system or computing device may include a monitor, printer, or other suitable display for providing any of the results mentioned herein to a user.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system for efficient navigation of a database environment, the system comprising:
 a database system implemented using a server system, the database system configurable to cause:
 providing a graphical user interface (GUI) including a search input interface element for display by a client device of a user;
 identifying, based at least in part on user input received via the search input interface element, a data source as being relevant to data of a digital calendar of the user;
 searching, using at least the user input and a user profile of the user, a plurality of data sources including the identified data source to identify a set of search results including one or more data objects relevant to the digital calendar data, the user profile indicating two or more of: a role of the user within an organization of users of the database system, membership of the user in a group of users within the organization of users of the database system, ownership of the user of one or more database records, a history of interaction of the user with one or more database records, a history of interaction of the user with one or more users within the organization of users of the database system, a history of interaction of the user with one or more groups of users within the organization of users of the database system, or a history of interaction of the user with one or more applications of the database system;
 providing, for simultaneous display by the client device in proximity to the search input interface element, a plurality of different types of user interface objects representing respective search results, the different types of user interface objects including a query section identifying one or more suggested database queries as a first one or more user-selectable options, a customer record section identifying one or more customer records as a second one or more user-selectable options, a files section identifying one or more files as a third one or more user-selectable options, and an action section identifying one or more actions determined to be available in relation to one or more customer records as a fourth one or more user-selectable options; and
 executing, responsive to user selection of an available action in the action section, the available action in relation to a customer record, the available action including one or more of: following the customer record, editing the customer record, or creating a further customer record associated with the customer record.

2. The system as recited in claim 1, the database system further configurable to cause:
 resolving the user input based, at least in part, on the user profile;
 wherein searching is performed based, at least in part, on a result of resolving the user input.

3. The system as recited in claim 1, the database system further configurable to cause:
 resolving the user input based, at least in part, on a context of the GUI;
 wherein searching is performed based, at least in part, on a result of resolving the user input.

4. The system as recited in claim 1, wherein a search result corresponds to at least one object of one of a plurality of object types, the plurality of object types including at least one of: an application of the database system, a database record of the database system, a database record of a particular record type, an action to be performed with respect to at least one database record of the database system, or a calendar entry in a calendar of the database system.

5. The system as recited in claim 1, the database system further configurable to cause:
 providing an indication of one or more assumptions or features used to search the plurality of data sources;
 processing an indication of second user input pertaining to the one or more assumptions or features used to search the plurality of data sources; and
 searching a second plurality of data sources based, at least in part, on the indication of the second user input pertaining to the one or more assumptions or features used to search the plurality of data sources.

6. The system as recited in claim 1, wherein searching is further performed based, at least in part, on one or more additional user profiles, each of the additional user profiles pertaining to a corresponding additional user, the additional user being a member of the group or another user within the organization.

7. A computer program product comprising computer-readable program code capable of being executed by one or more processors when retrieved from a non-transitory computer-readable medium, the program code comprising instructions configurable to cause:
 providing a graphical user interface (GUI) including a search input interface element for display by a client device of a user;
 identifying, based at least in part on user input received via the search input interface element, a data source as being relevant to data of a digital calendar of the user;
 searching, using at least the user input and a user profile of the user, a plurality of data sources including the identified data source to identify a set of search results including one or more data objects relevant to the digital calendar data, the user profile indicating two or more of: a role of the user within an organization of users of a database system, membership of the user in a group of users within the organization of users of the database system, ownership of the user of one or more database records, a history of interaction of the user with one or more database records, a history of interaction of the user with one or more users within the organization of users of the database system, a history of interaction of the user with one or more groups of users within the organization of users of the database system, or a history of interaction of the user with one or more applications of the database system;

providing, for simultaneous display by the client device in proximity to the search input interface element, a plurality of different types of user interface objects representing respective search results, the different types of user interface objects including a query section identifying one or more suggested database queries as a first one or more user-selectable options, a customer record section identifying one or more customer records as a second one or more user-selectable options, a files section identifying one or more files as a third one or more user-selectable options, and an action section identifying one or more actions determined to be available in relation to one or more customer records as a fourth one or more user-selectable options; and executing, responsive to user selection of an available action in the action section, the available action in relation to a customer record, the available action including one or more of: following the customer record, editing the customer record, or creating a further customer record associated with the customer record.

8. The computer program product as recited in claim 7, the program code further comprising instructions configurable to cause:

resolving the user input based, at least in part, on the user profile;

wherein searching is performed based, at least in part, on a result of resolving the user input.

9. The computer program product as recited in claim 7, the program code further comprising instructions configurable to cause:

resolving the user input based, at least in part, on a context of the GUI;

wherein searching is performed based, at least in part, on a result of resolving the user input.

10. The computer program product as recited in claim 7, wherein a search result corresponds to at least one object of one of a plurality of object types, the plurality of object types including at least one of: an application of the database system, a database record of the database system, a database record of a particular record type, an action to be performed with respect to at least one database record of the database system, or a calendar entry in a calendar of the database system.

11. The computer program product as recited in claim 7, the program code further comprising instructions configurable to cause:

providing an indication of one or more assumptions or features used to search the plurality of data sources;

processing an indication of second user input pertaining to the one or more assumptions or features used to search the plurality of data sources; and searching a second plurality of data sources based, at least in part, on the indication of the second user input pertaining to the one or more assumptions or features used to search the plurality of data sources.

12. The computer program product as recited in claim 7, wherein searching is further performed based, at least in part, on one or more additional user profiles, each of the additional user profiles pertaining to a corresponding additional user, the additional user being a member of the group or another user within the organization.

13. A method, comprising:

providing a graphical user interface (GUI) including a search input interface element for display by a client device of a user;

identifying, based at least in part on user input received via the search input interface element, a data source as being relevant to data of a digital calendar of the user;

searching, using at least the user input and a user profile of the user, a plurality of data sources including the identified data source to identify a set of search results including one or more data objects relevant to the digital calendar data, the user profile indicating two or more of: a role of the user within an organization of users of a database system, membership of the user in a group of users within the organization of users of the database system, ownership of the user of one or more database records, a history of interaction of the user with one or more database records, a history of interaction of the user with one or more users within the organization of users of the database system, a history of interaction of the user with one or more groups of users within the organization of users of the database system, or a history of interaction of the user with one or more applications of the database system;

providing, for simultaneous display by the client device in proximity to the search input interface element, a plurality of different types of user interface objects representing respective search results, the different types of user interface objects including a query section identifying one or more suggested database queries as a first one or more user-selectable options, a customer record section identifying one or more customer records as a second one or more user-selectable options, a files section identifying one or more files as a third one or more user-selectable options, and an action section identifying one or more actions determined to be available in relation to one or more customer records as a fourth one or more user-selectable options; and executing, responsive to user selection of an available action in the action section, the available action in relation to a customer record, the available action including one or more of: following the customer record, editing the customer record, or creating a further customer record associated with the customer record.

14. The method as recited in claim 13, further comprising:

resolving the user input based, at least in part, on the user profile;

wherein searching is performed based, at least in part, on a result of resolving the user input.

15. The method as recited in claim 13, further comprising:

resolving the user input based, at least in part, on a context of the GUI;

wherein searching is performed based, at least in part, on a result of resolving the user input.

16. The method as recited in claim 13, wherein a search result corresponds to at least one object of one of a plurality of object types, the plurality of object types including at least one of: an application of the database system, a database record of the database system, a database record of a particular record type, an action to be performed with respect to at least one database record of the database system, or a calendar entry in a calendar of the database system.

17. The method as recited in claim 13, further comprising:
    providing an indication of one or more assumptions or features used to search the plurality of data sources;
    processing an indication of second user input pertaining to the one or more assumptions or features used to search the plurality of data sources; and
    searching a second plurality of data sources based, at least in part, on the indication of the second user input pertaining to the one or more assumptions or features used to search the plurality of data sources.

18. The method as recited in claim 13, wherein searching is further performed based, at least in part, on one or more additional user profiles, each of the additional user profiles pertaining to a corresponding additional user, the additional user being a member of the group or another user within the organization.

19. The method as recited in claim 13, the user input indicating a request for available actions within the database system.

20. The method as recited in claim 13, the user input comprising a particular set of characters indicating a request for available actions within the database system.

21. The method as recited in claim 13, the available action being executable in relation to one or more database records of the database system.

* * * * *